(12) United States Patent
Kurihara

(10) Patent No.: US 12,597,199 B2
(45) Date of Patent: Apr. 7, 2026

(54) STORAGE MEDIUM, INFORMATION PROCESSING SYSTEM, INFORMATION PROCESSING APPARATUS, AND GAME PROCESSING METHOD

(71) Applicant: NINTENDO CO., LTD., Kyoto (JP)

(72) Inventor: Tatsuya Kurihara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 19/255,011

(22) Filed: Jun. 30, 2025

(65) Prior Publication Data

US 2026/0004508 A1     Jan. 1, 2026

Related U.S. Application Data

(63) Continuation of application No. 19/005,876, filed on Dec. 30, 2024.

(30) Foreign Application Priority Data

Jun. 27, 2024     (JP) ................................ 2024-103661
Jun. 27, 2024     (JP) ................................ 2024-103662

(51) Int. Cl.
*G06T 15/08* (2011.01)
*A63F 13/52* (2014.01)
(Continued)

(52) U.S. Cl.
CPC .............. *G06T 15/08* (2013.01); *A63F 13/52* (2014.09); *G06T 15/04* (2013.01); *G06T 17/00* (2013.01);
(Continued)

(58) Field of Classification Search
CPC .... G06F 3/011; G06F 3/04815; G06T 19/006; G06T 19/20; G06T 2200/24; G06T 17/00;
(Continued)

(56) References Cited

U.S. PATENT DOCUMENTS

2006/0028468 A1     2/2006 Chen et al.
2018/0114368 A1*     4/2018 Marketsmueller ..........................
                                                                    G06F 3/04883

(Continued)

FOREIGN PATENT DOCUMENTS

JP          2006-053911          2/2006
JP          2021-124784          8/2021

(Continued)

OTHER PUBLICATIONS

Voxtool Documentation. "Voxtool Documentation." Google Docs, 2019, docs.google.com/document/d/1Lc7s6_sDIpWpW-YCmOON8OBqZykxtuEP7dgVrAv0V5ZA/. Accessed Sep. 12, 2025. (Year: 2019).*

(Continued)

*Primary Examiner* — Xiao M Wu
*Assistant Examiner* — Scott E Sonners
(74) *Attorney, Agent, or Firm* — Nixon & Vanderhye P.C.

(57)          ABSTRACT

An example of an information processing system generates a display mesh based on voxel data. The information processing system generates a voxel update range in a virtual space, based on game processing, and updates at least one of a density and a material ID, in the voxel data, for each of voxels corresponding to the voxel update range. The information processing system updates the display mesh corresponding to the updated voxel data. The information processing system, based on collision determination between a determination mesh and a determination shape corresponding to a determination target, generates an in-game behavior according to a material of the determination mesh at a collision position. The information processing system renders a virtual space including the display mesh, based on a texture corresponding to the material of the display mesh.

30 Claims, 31 Drawing Sheets

(51) Int. Cl.

| | |
|---|---|
| *G06T 11/00* | (2006.01) |
| *G06T 15/04* | (2011.01) |
| *G06T 17/00* | (2006.01) |
| *G06T 17/20* | (2006.01) |
| *G06T 19/00* | (2011.01) |
| *G06T 19/20* | (2011.01) |

(52) U.S. Cl.
CPC .............. *G06T 17/20* (2013.01); *G06T 19/00* (2013.01); *G06T 19/20* (2013.01); *G06T 11/001* (2013.01)

(58) Field of Classification Search
CPC ......... G06T 15/08; G06T 17/20; G06T 19/00; G06T 7/70; G06T 15/005; G06T 2219/2021; G06T 2219/2016; G06T 19/003; G06T 2210/21; G06T 2200/04; G06T 13/20; G06T 15/04; G06T 2219/2012; G06T 13/40; G06T 17/205; G06T 15/10; G06T 15/00; G06T 1/60; G06T 13/00; G06T 2207/10024; G06T 15/80; G06T 2207/20021; G06T 11/001; G06T 2200/08; G06T 2210/61; G06T 2200/28; G06T 7/40; G06T 3/04; G06T 2213/00; G06T 3/00; G06T 2213/08; H04L 67/131; A63F 2300/8082; A63F 13/52; A63F 13/577; A63F 13/45; A63F 2300/64; A63F 13/573; A63F 13/60; A63F 13/57; A63F 2300/643; A63F 2300/66; A63F 13/00; A63F 9/24; A63F 13/63; A63F 2300/6009; A63F 2300/8076; A63F 2300/6615; A63F 2300/6638; A63F 2003/00813
See application file for complete search history.

(56) References Cited

U.S. PATENT DOCUMENTS

| | | |
|---|---|---|
| 2020/0400429 A1 | 12/2020 | Satoh |
| 2021/0241525 A1 | 8/2021 | Tanaka et al. |
| 2024/0212284 A1 | 6/2024 | Gris et al. |

FOREIGN PATENT DOCUMENTS

| | | |
|---|---|---|
| JP | 2024-521128 | 5/2024 |
| WO | 2023/039422 | 3/2023 |

OTHER PUBLICATIONS

Knight, Aiden. Voxel Rendering for Destructible Models. Feb. 2025, gradex.staffs.ac.uk/wp-content/uploads/2025/05/5301_Aiden-Knight-Dissertation-pdf.pdf. Accessed Sep. 11, 2025. (Year: 2025).*
"Marching cubes: A high resolution 3D surface construction algorithm", Computer Graphics, vol. 21, No. 4, WE Lorensen, HE Cline, 1987, 7 pages.
T. Ju, F Losasso, S. Schaefer, and J. Warren, "Dual contouring of hermite data", ACM Transactions on Graphics, 21(3):339-346, Jul. 2002. ISSN 0730-0301 (Proceedings of ACM SIGGRAPH 2002).
U.S. Appl. No. 19/085,163, filed Mar. 20, 2025, Tatsuya Kurihara.
U.S. Appl. No. 19/005,876, filed Dec. 30, 2024, Tatsuya Kurihara.
"Ask the Developer-Donkey Kong Bananza", Parts 1-3—News, Nintendo Official Site, https://www.nintendo.com/us/whatsnew/ask-the-developer-vol-19-donkey-kong-bananza-part-2/>, vol. 19, 31 pages, Jul. 15, 2025, including pp. 11-18.
Office Action for U.S. Appl. No. 19/259,470, 21 pages, dated Sep. 25, 2025.
Voxel Tools: a C++ module for creating volumetric worlds in the Godot Engine, Zylann, Sep. 2023, https://voxel-tools.readthedocs.io/ (retrieved from wayback machine), pp. 1-99.

* cited by examiner

Fig.12

| MATERIAL ID | NAME | PROPERTY | RENDERING SETTING |
|---|---|---|---|
| 001 | SOIL | 001 | 001 |
| 002 | SAND | 002 | 002 |
| 003 | GRASS | 003 | 003 |
| ⋮ | ⋮ | ⋮ | ⋮ |

UPDATE RANGE

DENSITY: 255
SAND: 1 (MATERIAL DENSITY: 1)
WEIGHT: 0.12

DENSITY: 0
WEIGHT: 0.48

215    216    219

X : 0.8
Y : 0.6

217    218

DENSITY: 204
SAND: 0.7 (MATERIAL DENSITY: 0.56)
GRASS: 0.3 (MATERIAL DENSITY:0.24)
WEIGHT: 0.08

DENSITY: 153
SOIL: 0.6 (MATERIAL DENSITY: :0.36)
GRASS: 0.4 (MATERIAL DENSITY: 0.24)
WEIGHT: 0.32

EVALUATION VALUE OF SAND MATERIAL: 0.1648
EVALUATION VALUE OF GRASS MATERIAL: 0.096
EVALUATION VALUE OF SOIL MATERIAL: 0.1152
→(SAND, SOIL) ARE SELECTED IN DESCENDING ORDER (a) BEFORE SIMPLIFICATION

SIMPLIFICATION POSSIBLE (b) SIMPLIFICATION (FIRST STAGE)

SIMPLIFICATION POSSIBLE (c) SIMPLIFICATION (SECOND STAGE)

GRASS: 1.0
SAND: 0

241

GRASS: 0.5
SAND: 0.5

242

243

SAND: 1.0
GRASS: 0

HIT POINTS ARE DECREASED
DUE TO CONTACT WITH LAVA

Fig.30

| GAME PROGRAM |
| --- |
| VOXEL DATA |
| UPDATE RANGE DATA |
| MESH DATA |
| SVO DATA |
| DISPLAY MESH DATA |
| DETERMINATION MESH DATA |
| OBJECT DATA |
| ⋮ |

STORAGE MEDIUM, INFORMATION PROCESSING SYSTEM, INFORMATION PROCESSING APPARATUS, AND GAME PROCESSING METHOD

CROSS REFERENCE TO RELATED APPLICATION

This application is a continuation of U.S. application Ser. No. 19/005,876 filed Dec. 30, 2024, which claims priority to Japanese Patent Applications No. 2024-103661 and No. 2024-103662 filed on Jun. 27, 2024, the entire contents of which are incorporated herein by reference.

FIELD

The technique shown here relates to a storage medium, an information processing system, an information processing apparatus, and a game processing method for generating an object in a virtual space by using voxel data.

BACKGROUND AND SUMMARY

Conventionally, an object is managed using voxel data, and a mesh of the object is generated in a virtual space, based on the voxel data.

In a game, it is desired to show (e.g., reflect) a material in an appearance of an object and/or a behavior that occurs in the game.

Therefore, the present application discloses a storage medium, an information processing system, an information processing apparatus, and a game processing method capable of executing a game in which, for an object based on voxel data, a material is shown (e.g., reflected) in the appearance of the object and/or an effect that occurs in the game.

(1)

An example of one or more non-transitory computer-readable medium having stored therein instructions that, when executed, cause one or more processors of an information processing apparatus to execute information processing comprising: generating a display mesh, based on voxel data which is defined in a virtual space and in which at least a density and a material ID are set for each of a plurality of voxels, wherein the density indicates a degree of virtual occupation of a content in a space defined by the voxel, the material ID indicates a type of the content, and at most a first plural number of material IDs are settable, and wherein the display mesh corresponds to the voxel data and is rendered based on a virtual camera, vertex coordinates of the display mesh are determined based on at least the density included in the voxel data, and a material of the display mesh is determined based on at least a plurality of the material IDs included in the voxel data; generating a voxel update range in the virtual space, based on game processing; according to generation of the voxel update range, updating at least either of the density and the material ID, of the voxel data, for each of voxels corresponding to the voxel update range in the virtual space; updating the display mesh in association with the updated voxel data; generating, based on collision determination between a determination mesh and a determination shape corresponding to a determination target based on game processing, an in-game behavior according to a material of the determination mesh at a position of a collision, wherein the determination mesh is used for the collision determination in the virtual space, vertex coordinates of the determination mesh are determined based on at least the density included in the voxel data, a material of the determination mesh is determined based on at least a plurality of the material IDs included in the voxel data; and rendering the virtual space including the display mesh, based on the vertex coordinates of the display mesh and a texture corresponding to the material of the display mesh.

According to the configuration of the above (1), as for an object based on the voxel data, the material can be shown (e.g., reflected) in the appearance and/or the behavior that occurs in the game.

(2)

The material of the display mesh may be determined by setting at most a second plural number of material IDs to each of a plurality of polygons included in the display mesh. The material of the determination mesh may be determined by setting one material ID to each of a plurality of polygons included in the determination mesh. The information processing may comprise: based on material data including, for each of the types of the materials corresponding to the material IDs, at least rendering setting information that includes at least texture information set for the material, and property information indicating an in-game behavior set for the material, generating an in-game behavior based on the property information corresponding to the material ID that is set for a polygon for which a collision has been determined, among the polygons included in the determination mesh; and based on the material data, performing rendering of the virtual space including the display mesh by performing, based on the rendering setting information corresponding to the material ID set for each of the polygons included in the display mesh, rendering of the polygon based on a texture mapping with one texture or a blend of a plurality of textures.

According to the configuration of the above (2), the polygon of the display mesh can be displayed with a natural appearance by using at most two types of textures. Regarding the determination mesh, a process to be performed according to the result of collision determination using the determination mesh can be inhibited from being complicated.

(3)

The information processing may comprise: based on the voxel data, generating and updating vertices of the display mesh according to a method of setting a vertex at coordinates based on the densities and positions of a plurality of neighboring voxels, with respect to a portion in which a voxel having the density that is set to a value indicating existence and a voxel having the density that is set to a value indicating nonexistence are adjacent to each other; based on the voxel data, calculating, for each vertex, a priority parameter for each of the material IDs, included in the voxel data, of the plurality of neighboring voxels, selecting, based on the priority parameters, at most a third number of material IDs having higher priorities, and determining the selected material IDs as material IDs of the vertex; and based on the voxel data, selecting, for each polygon, at most the second number of material IDs among the material IDs set for the vertices included in the polygon, and determining the selected material IDs as the material IDs of the polygon, thereby generating and updating the material of the display mesh.

According to the configuration of the above (3), it is possible to perform a rendering process with the number of textures to be used being reduced, while showing (e.g., reflecting) the materials set for the vertices in the appearance of the display mesh.

US 12,597,199 B2

3

(4)

The information processing may further comprise: performing simplification to reduce the number of vertices on the vertices whose coordinates and material IDs have been determined based on the plurality of neighboring voxels, the simplification being performed by replacing a plurality of vertices with a new vertex whose coordinates and material ID are set based on the plurality of the vertices; and generating the polygon based on the vertex after the simplification.

According to the configuration of the above (4), the number of polygons forming the mesh can be reduced.

(5)

The information processing may comprise calculating the priority parameters such that the material ID, which is set for a voxel having a higher density, has a higher priority, based on the densities of the plurality of neighboring voxels.

According to the configuration of the above (5), a material of the vertex can be determined while indicating (e.g., reflecting) the levels of densities set for the voxels.

(6)

The information processing may comprise calculating the priority parameters such that the material ID, which is set for a voxel closer to the vertex, has a higher priority, based on distances from reference positions of the plurality of neighboring voxels to the vertex.

According to the configuration of the above (6), a material of the vertex can be determined while indicating (e.g., reflecting) the distances between the voxels and the vertex.

(7)

In the voxel data, for each voxel, an in-voxel proportion indicating a proportion of the material indicated by the material ID in the voxel may further set. The information processing may comprise calculating the priority parameters such that the material ID, which has a higher in-voxel proportion, has a higher priority, based on the in-voxel proportions of the plurality of neighboring voxels.

According to the configuration of the above (7), a material of the vertex can be determined while indicating (e.g., reflecting) a ratio of a plurality of materials set for a voxel (e.g., one voxel).

(8)

The information processing may comprise generating and updating a material of the display mesh by, based on the material IDs of all the vertices forming the polygon, when the number of the material IDs is equal to or less than the second number, setting the material IDs as material IDs of the polygon, and when the number of the material IDs exceeds the second number, selecting the second number of material IDs having higher priorities, based on the priority parameters of the vertices, and determining the selected material IDs as material IDs of the polygon.

According to the configuration of the above (8), even when materials exceeding a predetermined number are set for the vertices, the number of materials of the polygon can be made equal to or less than the predetermined number in consideration of the priority.

(9)

The information processing may comprise, based on the rendering setting information corresponding to each of the material IDs set for each of the polygons included in the display mesh, performing rendering of the polygon according to a mapping in which the plurality of textures are blended, at the position of each of the vertices, with a blending ratio according to the priority parameter of the vertex, and are blended, between the vertices, with an interpolated blending ratio obtained by interpolating the blending ratios at the vertices.

According to the configuration of the above (9), the appearance of a portion corresponding to a boundary of different materials in the display mesh can be made more natural.

(10)

The information processing may comprise: based on the voxel data, determining vertices of the determination mesh, according to a method of setting a vertex at coordinates based on the densities and positions of a plurality of neighboring voxels, with respect to a portion in which a voxel having the density that is set to a value indicating existence and a voxel having the density that is set to a value indicating nonexistence are adjacent to each other; based on the voxel data, calculating, for each vertex, a priority parameter for each of the material IDs, included in the voxel data, of the plurality of neighboring voxels, selecting, based on the priority parameters, at most a fourth number of material IDs having higher priorities, and determining the selected material IDs as material IDs of the vertex; and determining, as the material ID of the polygon, one material ID which is the greatest in number or has the highest priority based on the priority parameters, among the material IDs of the vertices forming the polygon, thereby determining a material of the determination mesh.

According to the configuration of the above (10), a material to be set for each polygon can be determined based on materials set for the neighboring voxels. In addition, a process of generating an in-game behavior, which is performed according to the result of collision determination using the determination mesh, can be inhibited from being complicated.

(11)

The first number may be 2. The second number may be 2.

According to the configuration of the above (11), information on the material set in the voxel data can be indicated (e.g., reflected) in the material of the display mesh, while suppressing the amount of the voxel data.

(12)

The first number may be 2. The second number may be 2. The third number may be 2.

According to the configuration of the above (12), information on the material set in the voxel data can be indicated (e.g., reflected) in the material of the display mesh, while suppressing the amount of the voxel data, without missing the information on the material during a process of obtaining the display mesh from the voxel data.

(13)

The first number may be 2. The second number may be 2. The fourth number may be 1 or 2.

According to the configuration of the above (13), information on the material set in the voxel data can be indicated (e.g., reflected) in the display mesh, and a process to be performed according to the result of collision determination using the determination mesh can be inhibited from being complicated.

Note that the present specification discloses examples of an information processing apparatus and an information processing system that execute the processes in the above (1) to (13). Furthermore, the present specification discloses an example of an information processing method that executes the processes in the above (1) to (13).

According to the storage medium, the information processing system, the information processing apparatus, or the game processing method described above, for an object based on voxel data, a material can be shown (e.g., reflected) in the appearance of the object, and a behavior that occurs in the game.

These and other features, aspects, and advantages of the subject matter described herein will become more apparent from the following detailed description when taken in conjunction with the accompanying drawings.

BRIEF DESCRIPTION OF THE DRAWINGS

FIG. 12 is a view showing an example of material data;

FIG. 30 is a view showing an example of various data used for information processing in the non-limiting game system.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
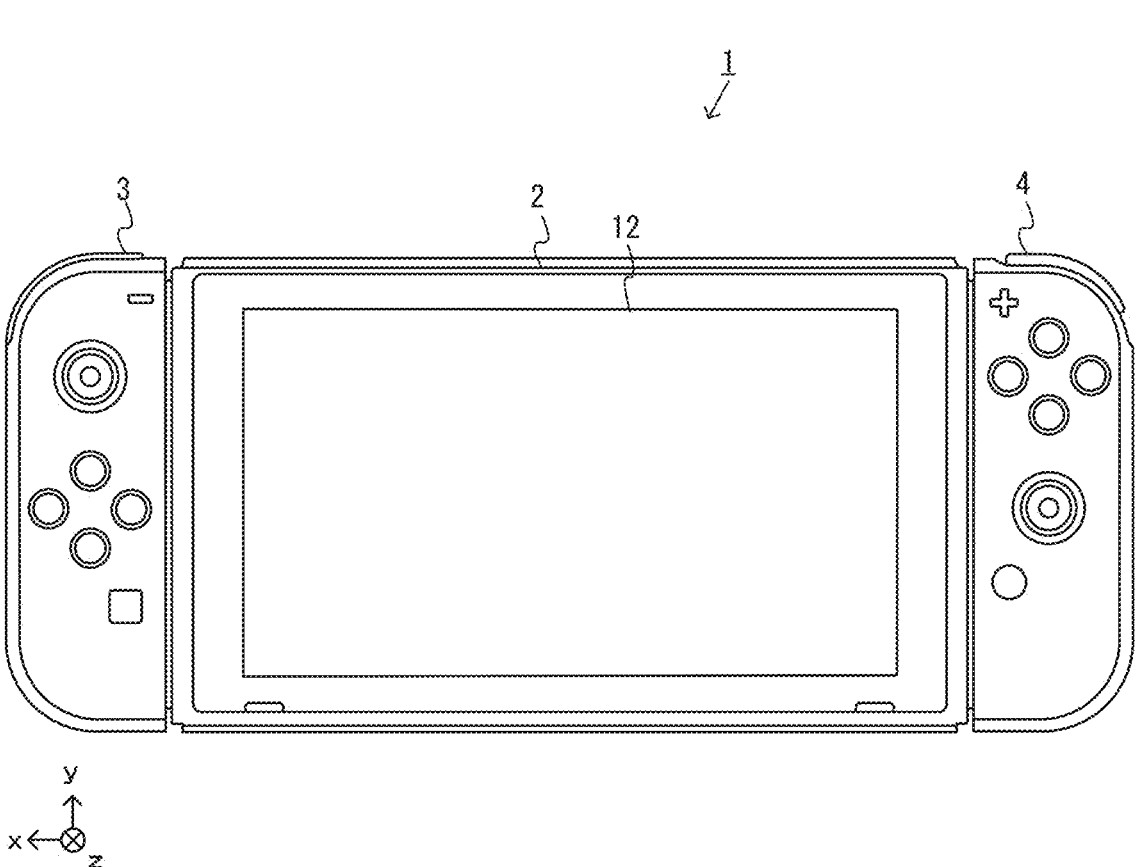
FIG. 1 is a view showing an example where a non-limiting left controller and a non-limiting right controller are attached to a non-limiting main body apparatus.

FIG. 1 is a diagram showing an example of the state in which the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
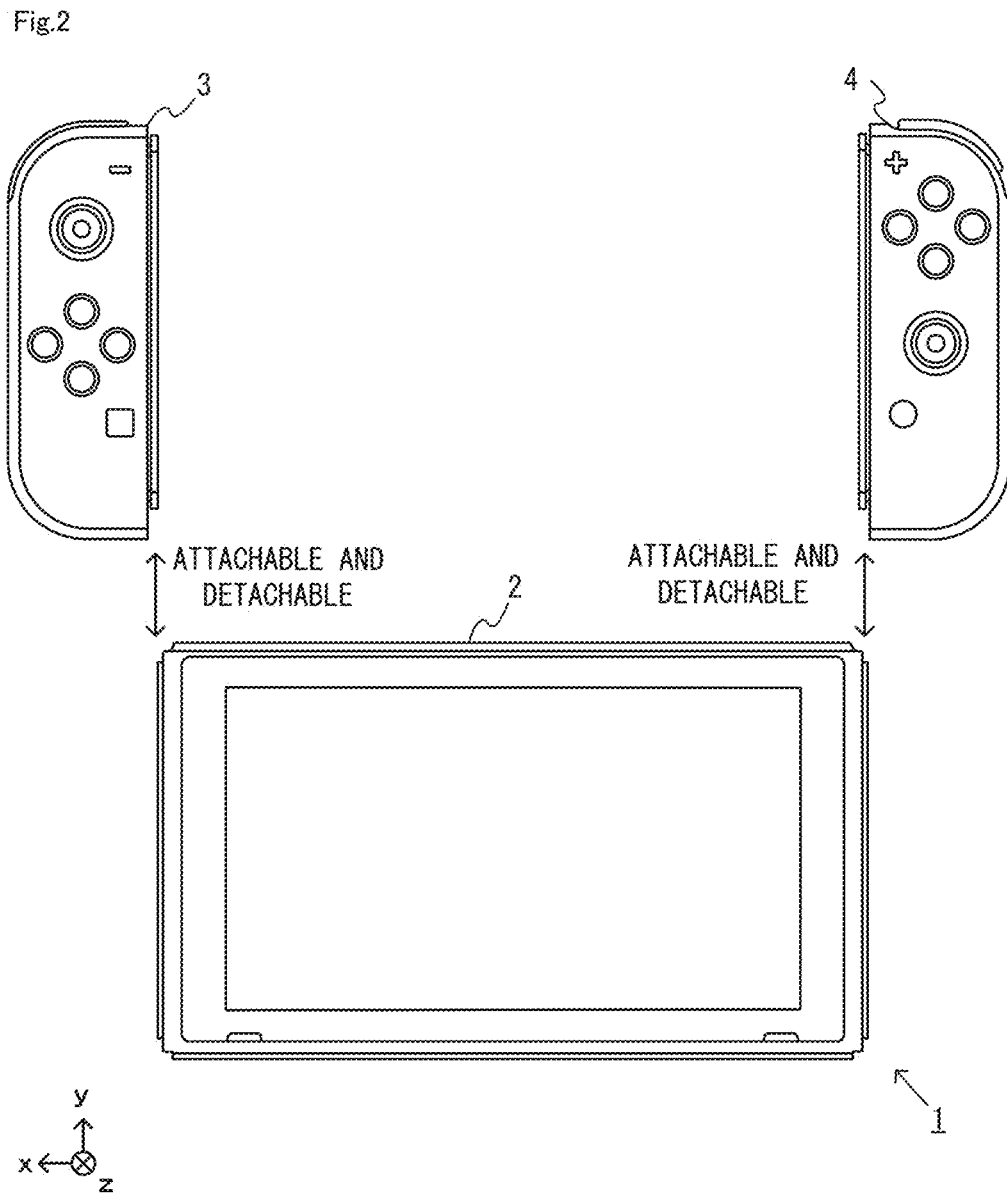
FIG. 2 is a view showing an example where a non-limiting left controller and a non-limiting right controller are removed from a non-limiting main body apparatus.

FIG. 2 is a diagram showing an example of the state in which each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
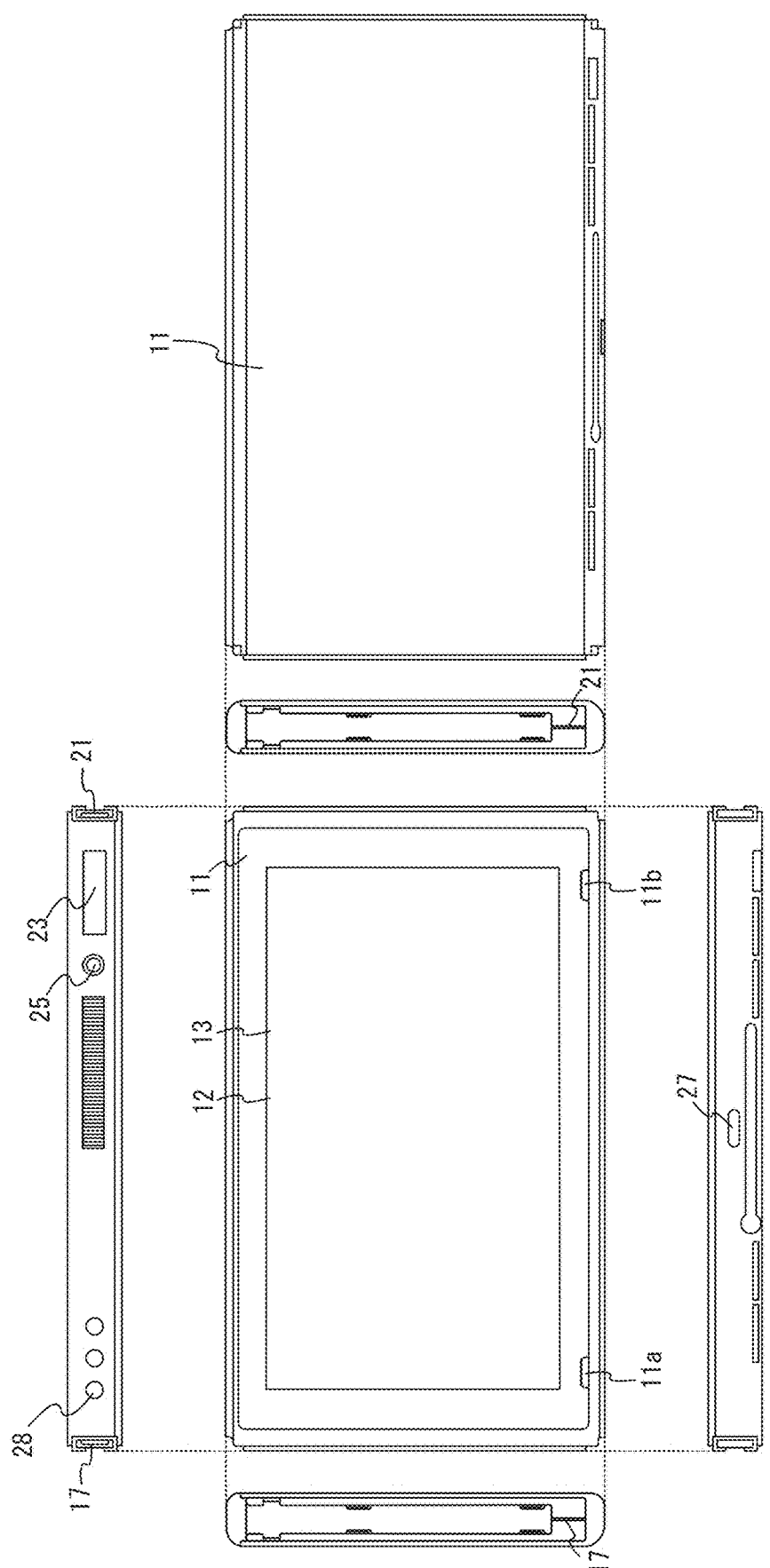
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (for example, a surface on a front side, such as a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multitouch input (e.g., a capacitive type). The touch panel 13, however, may be of any type. For example, the touch panel 13 may be of a type that allows a single-touch input (e.g., a resistive type).

The main body apparatus 2 includes speakers (e.g., speakers 88 shown in FIG. 6) within the housing 11. As shown in FIG. 3, speaker holes 11*a* and 11*b* are formed on the main surface of the housing 11. Then, sounds output from the speakers 88 are output through the speaker holes 11*a* and 11*b*.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a monitor an image generated by and output from the main body apparatus 2. The monitor may be stationary or may be movable. Further, in the exemplary embodiment, the cradle has the function of charging the unified apparatus or the main body apparatus 2 alone mounted on the cradle. Further, the cradle has the function of a hub device (specifically, a USB hub).

Figure 4:
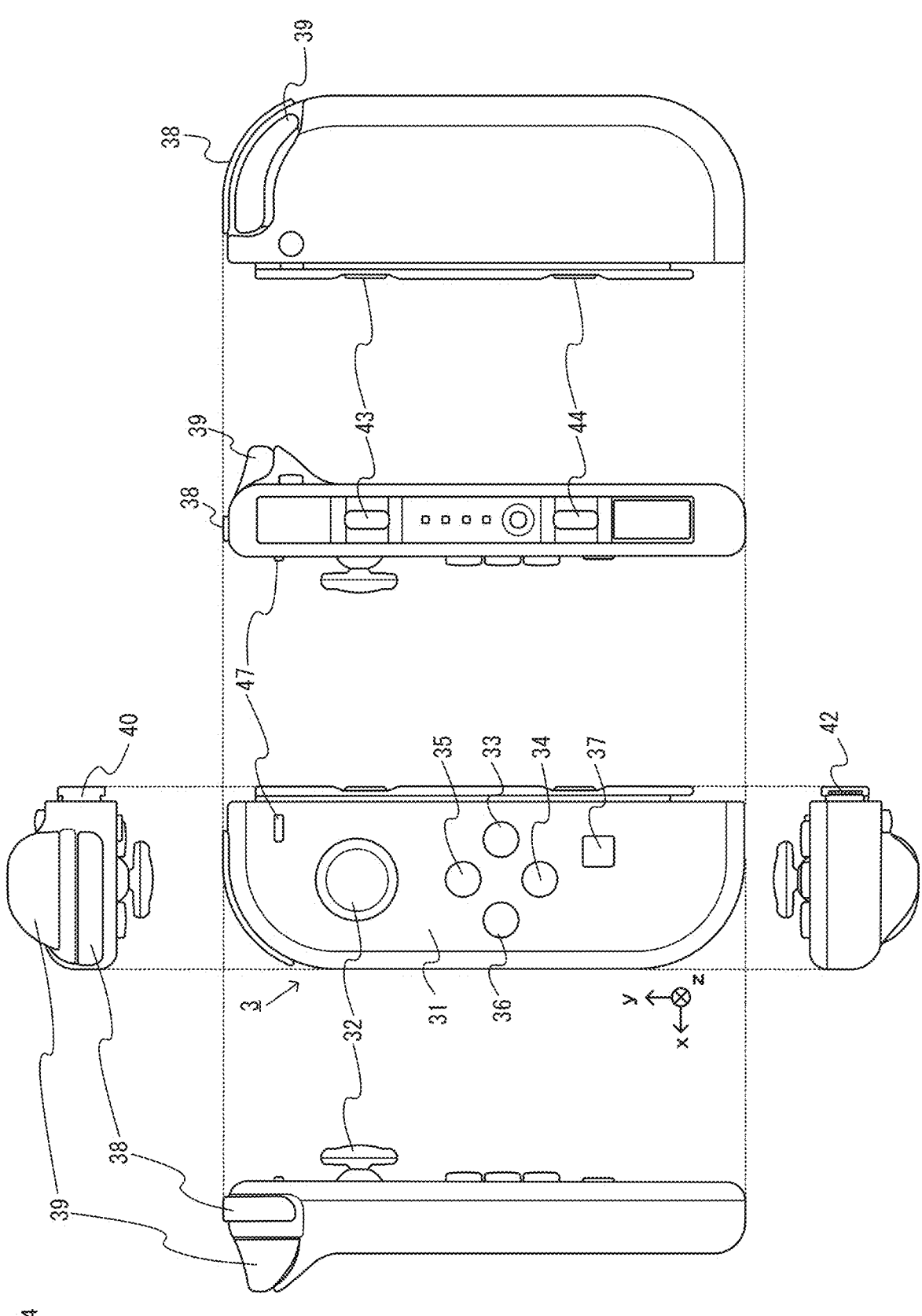
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape. The housing 31 may be shaped to be long in an up-down direction. For example, along the y-axis direction shown in FIGS. 1 and 4. In the state where the left controller 3 is detached from the main body apparatus 2, the left controller 3 can also be held in the orientation in which the left controller 3 is vertically long.

The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an operating system (OS) program and an application program) executed by the main body apparatus 2.

Further, the left controller 3 includes a terminal 42 for the left controller 3 to perform wired communication with the main body apparatus 2.

Figure 5:
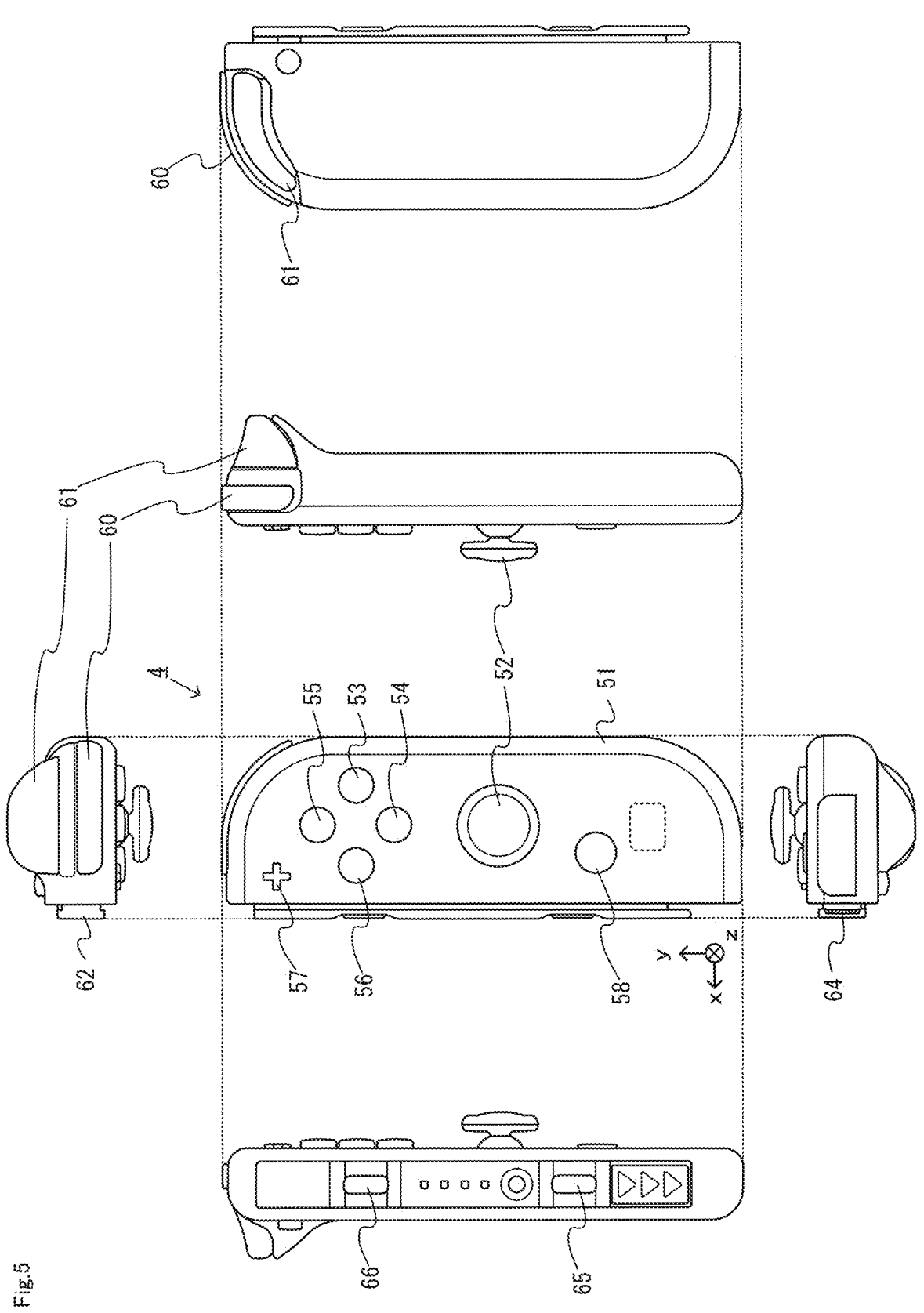
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape. For example, it may be shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
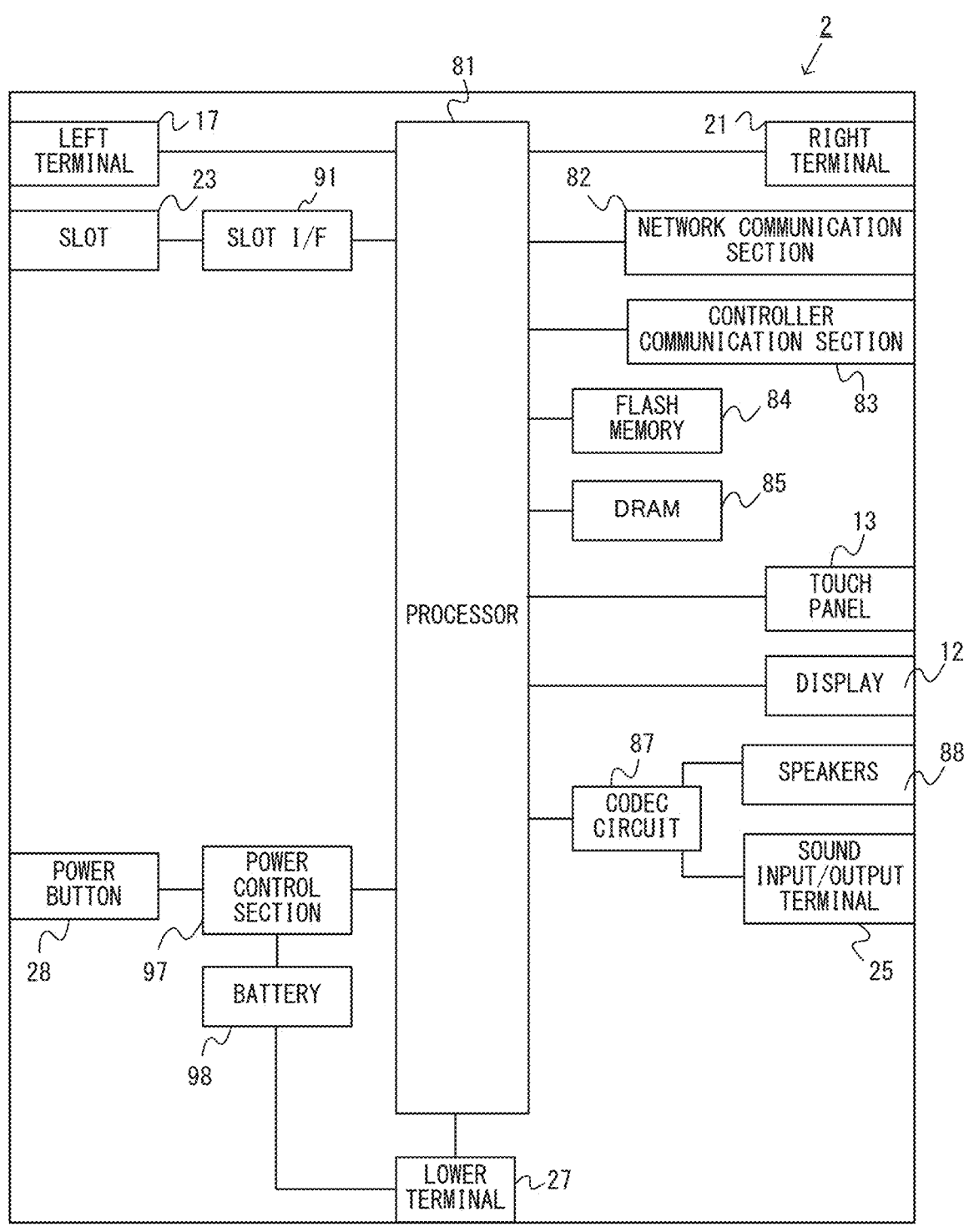
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 85, 87, 88, 91, 97, and 98 shown in FIG. 6 in addition to the components shown in FIG. 3. Some of the components 81 to 85, 87, 88, 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) or other instructions that are stored in storage. For example, in an internal non-transitory storage medium such as a flash memory 84, an external storage non-transitory medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing. The DRAM 85 and flash memory 84 are illustrative non-limiting examples of non-transitory computer-readable media.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
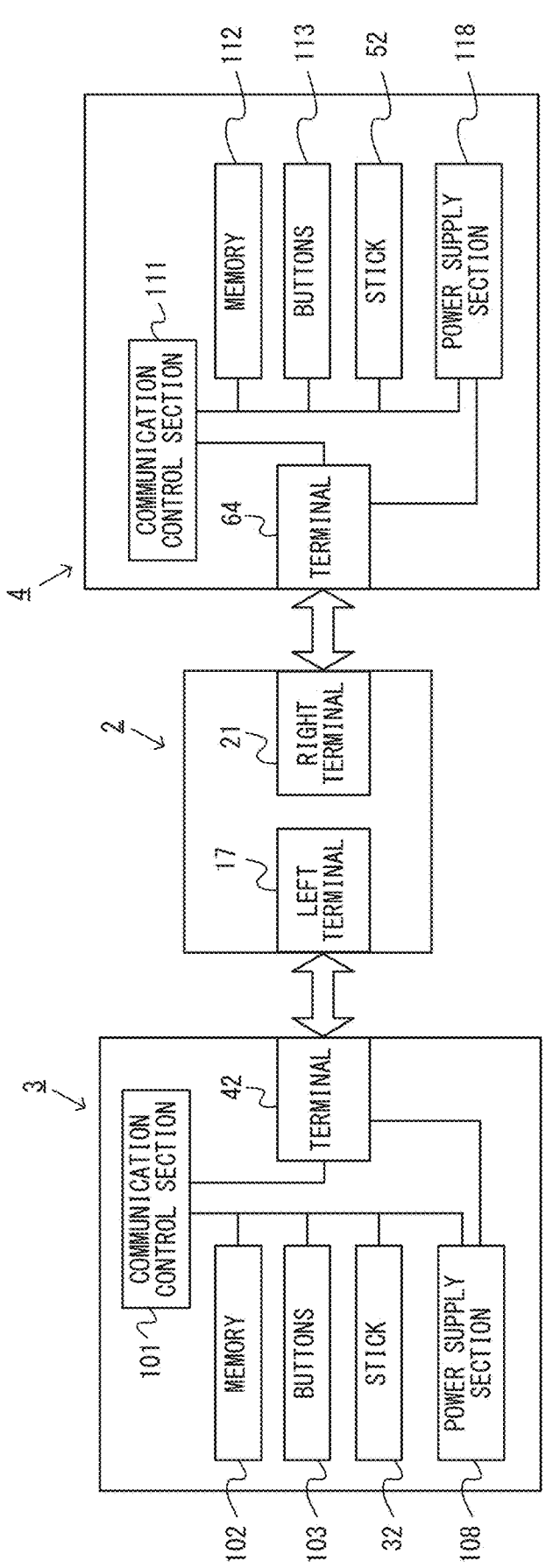
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103 and the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113 and the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Outline of Process on Game System]

Next, referring to FIG. 8 to FIG. 26, an outline of the process performed on the game system 1 will be described. In the present embodiment, the game system 1 generates a game image in which terrain objects and characters (e.g., the player character controlled by the player) are arranged in a game space, which is a three-dimensional virtual space, and displays the game image on a display device. Note that in the present embodiment, the display device on which the game image is displayed may be the display 12 described above, or may be a stationary monitor.

[2-1. Voxel]

In the present embodiment, for some objects in the game space, the shape is defined by voxel data. Here, voxels are rectangular parallelepiped (more specifically, cubic) regions arranged in a grid pattern in the game space, and voxel data is data indicating information regarding the voxels. Hereinafter, an object whose shape is defined by voxel data will be referred to as a "voxel object". In the present embodiment, the game system 1 stores voxel data for a plurality of voxels that are set in the game space as data for generating voxel objects in the game space.

Figure 8:
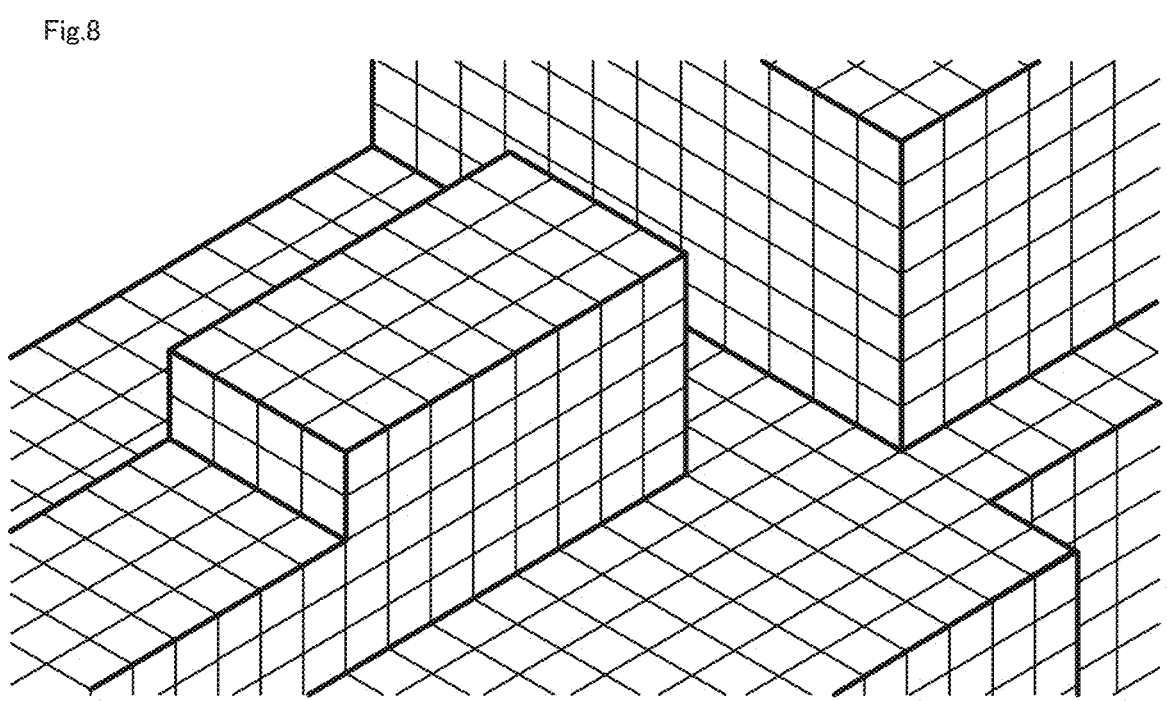
FIG. 8 is a view showing an example of a terrain object, which is a voxel object.

FIG. 8 is a view showing an example of a terrain object, which is a voxel object. As shown in FIG. 8, in the present embodiment, a terrain object representing a terrain such as a ground surface has its shape defined by voxel data. The cubes shown in FIG. 8 represent a terrain object. Note that in FIG. 8, edges of the terrain object are indicated by thick lines. However, these thick lines are added for the purpose of making the drawings easier to understand, and there is no need for edges of the terrain object to be drawn thick.

Figure 13:
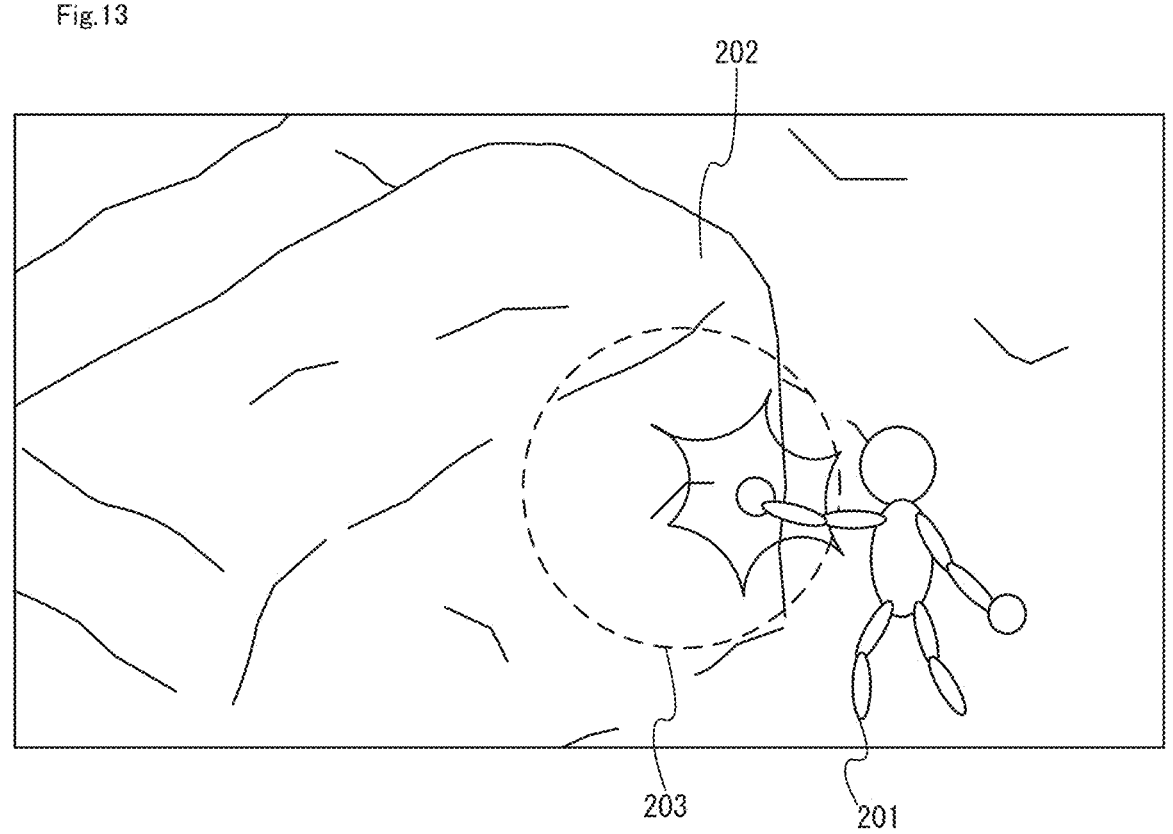
FIG. 13 is a view showing an example of a game space when an update event has occurred.

For example, the terrain object shown in FIG. 8 is generated by the following rule: "a cube is placed at the position of a voxel if a parameter included in the voxel data set for the voxel is greater than a predetermined value, and nothing is placed at the position of the voxel if the parameter is less than or equal to the predetermined value". A terrain object in FIG. 8 is shown for the purpose of illustrating the relationship between voxels and voxel objects in an easy-to-understand manner. Note that in the present embodiment, in practice, a voxel object is generated (e.g., based on voxel data) by such a rule that results in a terrain object having a complicated shape, such as a terrain object shown in FIG. 13 to be described below, for example. Note that there is no limitation on the rule for determining the shape of the voxel object based on the voxel data. In other embodiments, the game system 1 may generate a voxel object as shown in FIG. 8 based on the object data or may generate a voxel object as shown in FIG. 13 based on the object data.

Figure 9:
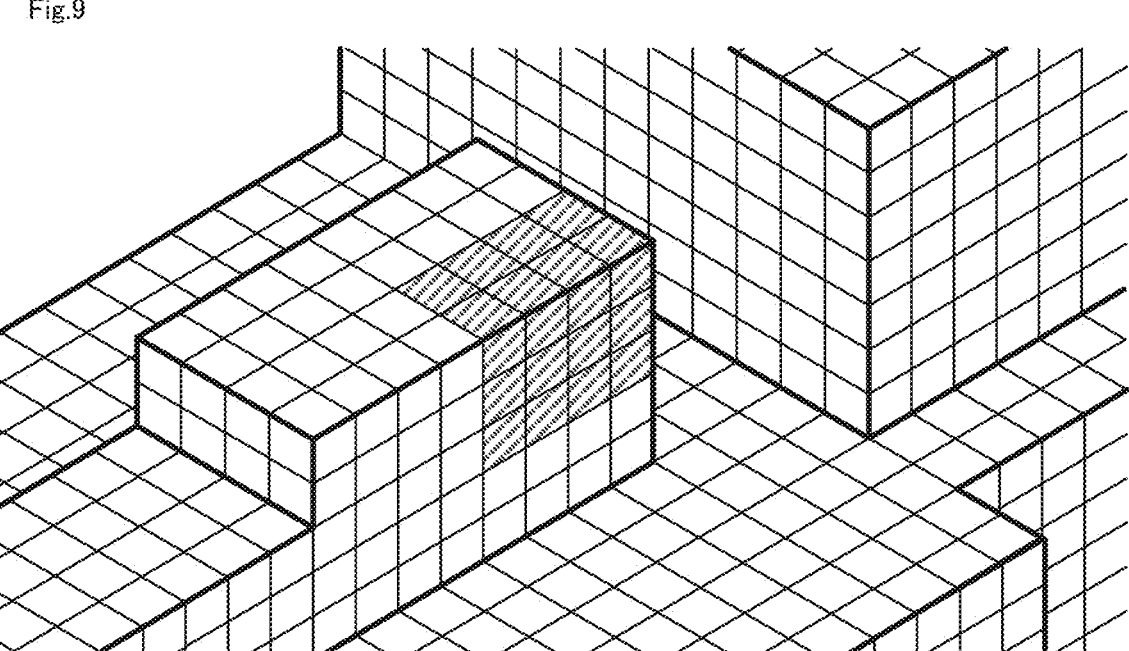
FIG. 9 is a view showing before and after the deletion of a portion of the terrain object shown in FIG. 8.
Figure 10:
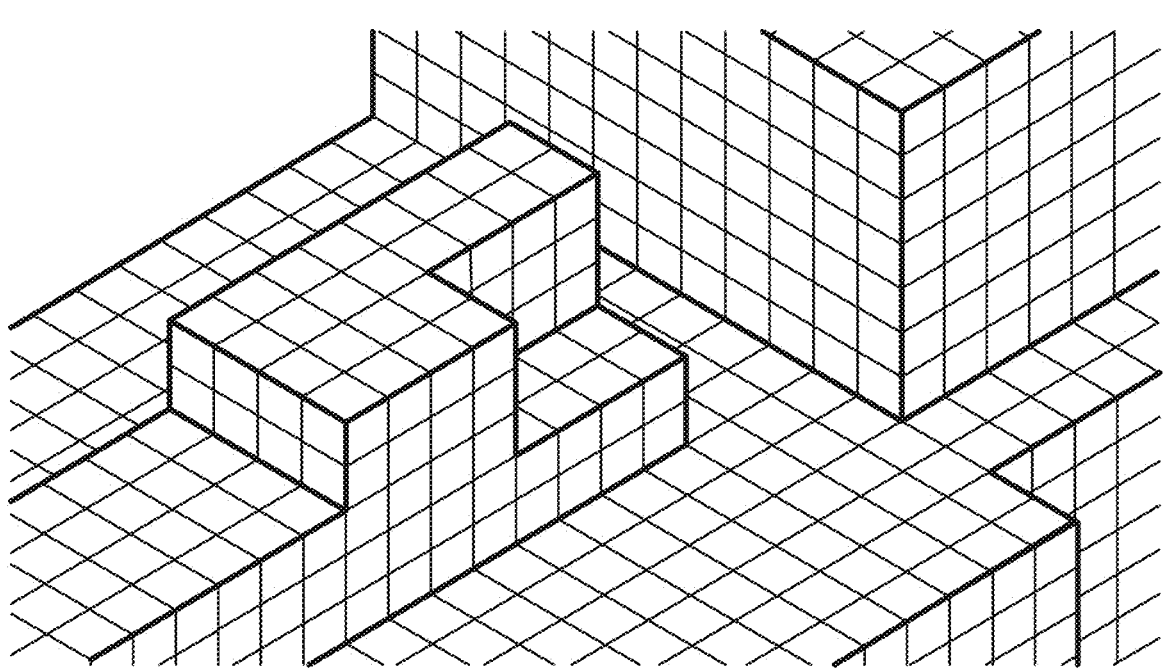
FIG. 10 is a view showing before and after the deletion of a portion of the terrain object shown in FIG. 8.

It is possible to change the shape of a voxel object by changing voxel data of voxels. FIG. 9 and FIG. 10 are views showing before and after the removal of a portion of the terrain object shown in FIG. 8. That is, when the hatched portion of the terrain object shown in FIG. 9 is broken, the terrain object changes to a shape as shown in FIG. 10. In such a case, the game system 1 can easily delete the terrain object by rewriting the voxel data described below so as to indicate that the terrain object is absent for voxels in the hatched portion. Note that also when making an addition to the terrain object, as when deleting the terrain object, the game system 1 can easily change the shape of the terrain object by changing the voxel data of voxels.

Thus, the game system 1 can freely change the shape of a voxel object by rewriting the voxel data. For example, the shape of a terrain object may be changed as a result of the terrain object in a game being broken for some reason (e.g., the player object striking the terrain object). In such a case, the game system 1 can freely change the shape of the terrain object by changing the voxel data used to generate the terrain object, rather than directly changing data representing the outer shape of the terrain object (e.g., the mesh to be described below).

In the exemplary embodiment, voxels are defined in the entire game space (e.g., a voxel space in which voxels are set corresponds to the entire game space). However, the voxel space may not necessarily be set over the entire game space, and may be set in a certain area in the game space. If the voxel space is set in a certain area in the game space, the shape of the voxel object is defined by voxel data regarding voxels in the voxel space, and the position of the voxel object in the game space is defined by the position of the voxel space in the game space. The game space may include a main voxel space that is set over the entire game space, and a sub voxel space that is set in a certain area in the game space. In this case, the game system 1 stores therein voxel data for each voxel space.

Figure 11:
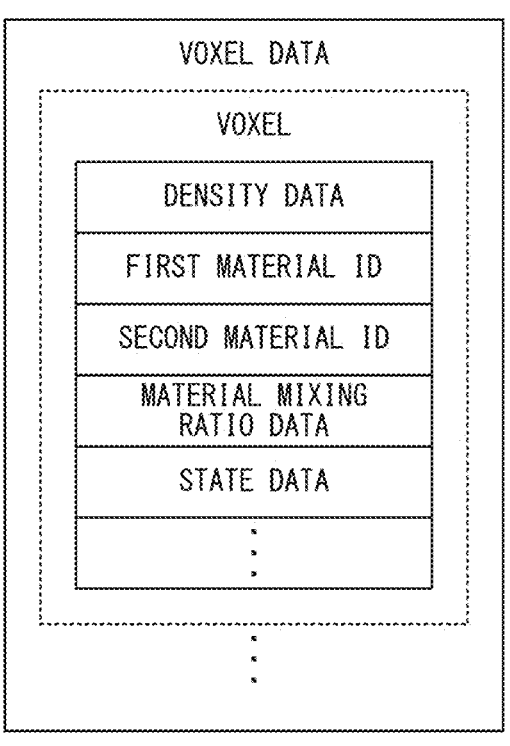
FIG. 11 is a view showing an example of voxel data.

FIG. 11 shows an example of voxel data. The voxel data includes density data, a first material ID, a second material ID, material mixing ratio data, and state data, for each voxel defined in the game space. In the voxel data according to the exemplary embodiment, these pieces of data are set for each voxel.

The density data indicates a density that is an index used for defining the shape of a voxel object based on the voxel (specifically, the shape defined by a mesh described below). As will be described in detail below, the position and shape of the surface of the voxel object (e.g., the mesh described below) are determined based on the density.

In the exemplary embodiment, the density can take an integer value in a range from a lower limit value (e.g., 0) to an upper limit value (e.g., 255). In the exemplary embodiment, the game system 1 determines a surface shape of the voxel object, based on the density such that the proportion of the volume that the area in the voxel object occupies in the voxel tends to be greater when the density value set for the voxel is higher, and the proportion tends to be smaller when the density value is lower. Thus, the density is an index that has an influence on the proportion of the volume that the area in the voxel object occupies in the voxel. The density can also be regarded as an index that indicates the degree of virtual occupation of the content (e.g., the virtual content of the voxel object) in the space of the voxel. For example, when the density is 0, the voxel is empty. When the density is 255, the entire space in the voxel is the content of the voxel object. When the density is a value between 0 and 255, the content of the voxel object occupies the space in the voxel based on (e.g., in a proportion according to) the value. The shape of the mesh, e.g., the surface shape of the voxel object, can be determined based on the density. The mesh can be regarded as the surface of a part, of a voxel, in which the content exists, or as a boundary between a part, of a voxel, in which the content exists and a part, of the voxel, in which the content does not exist. The volume that the area in the voxel object generated based on the density occupies may not necessarily be the volume that exactly matches the proportion indicated by the density. For example, the volume of the voxel object may differ between the method for generating a voxel object as shown in FIG. 8 and the method for generating a voxel object as shown in FIG. 13 even if these methods are based on the same density.

In other embodiments, the density may indicate either a state in which the volume of the area in the voxel object occupies the entire area in the voxel or a state in which the volume of the area in the voxel object is not included in the area in the voxel. For example, the density data may be data that can take only 0 or 1.

The first material ID and the second material ID are information indicating materials of the corresponding voxel. In the exemplary embodiment, a material such as sand, rock, or soil is set for a voxel. In the game system 1, multiple types of materials are prepared as materials that can be set for voxels (see material data shown in FIG. 12). In the exemplary embodiment, at most two materials out of the prepared multiple types of materials can be set for one voxel. The first material ID is an ID indicating a first material set for the voxel, and the second material ID is an ID indicating a second material set for the voxel. As will be described in detail below, a material of a voxel object (e.g., a material to be set for a polygon of the voxel object) is determined based on the materials set for voxels.

As described above, in the exemplary embodiment, the voxel data includes the ID indicating the material. However, in other embodiments, the voxel data may have a data structure that includes data directly indicating the details of the material (e.g., information on the name, property, and rendering setting described below).

The material mixing ratio data is an example of data indicating a ratio of materials in the voxel. In the exemplary embodiment, since at most two material IDs are set for one voxel, the material mixing ratio data, which indicates the ratio of one of the material indicated by the first material ID and the material indicated by the second material ID, can also indicate the ratio of the other material. In the exemplary embodiment, it is assumed that the material mixing ratio is a value indicating the ratio of the second material to the entire material consisting of the first material and the second material. The value is 0 or more and 1 or less. For example, if the material mixing ratio set for a certain voxel is 0.4, this indicates that the voxel is composed of the first material and the second material in the ratio of 0.6:0.4. As will be described in detail below, the appearance and property of the voxel object are determined based on the materials.

The material mixing ratio is used to determine the appearance and property of the voxel object. In other embodiments, the material mixing ratio may be a value indicating the proportion of the first material. The ratio of the materials in the voxel may be indicated by the values of the proportions of the materials. In particular, in other embodiments, if the number of settable types of materials is not limited to two at most and three or more types of materials can be set, the ratio of the materials in the voxel is indicated by a plurality of values respectively indicating the proportions of the materials.

In the exemplary embodiment, two types of materials may not necessarily be set for a voxel, and one type of material may be set. For example, if one type of material is set for a certain voxel, the first material ID indicates this material, and the material mixing ratio is set at 0.

The state data indicates a state that is set for the corresponding voxel. The specific content of state data and the number of types thereof are discretionary. In the exemplary embodiment, the state data includes data indicating the amount of damage set on the voxel. In other embodiments, the state data may include data indicating whether or not the voxel is wet (and its extent), for example.

As described above, in the exemplary embodiment, since the voxel data includes the material ID, the game system 1 stores therein material data that defines the content of the material indicated by the material ID. FIG. 12 shows an example of the material data. As shown in FIG. 12, in the material data according to the exemplary embodiment, for each material, a material ID is associated with information on a name, a property, and rendering setting that are set for the material.

The name included in the material data is a name (e.g., soil, sand, grass, etc.) set for the material. As will be described in detail below, during the game, the name of the material of the voxel object may sometimes be displayed (see FIG. 28). In order to perform such a display, the material data includes information on the name of the material.

The property included in the material data is a property set for the material. The property of the material is a property that the voxel object, on which the material is set, possesses in the game. The specific content of the property of the material, and the number of types of properties are discretionary. For example, at least one of the following pieces of information may be set as properties of a material.

Hardness
Weight
Slipperiness
Damage setting in the case where the player character comes into contact with the voxel object
Temperature
Whether another object can be bonded to the voxel object
Amount of hit points to be regained by the player character when the player character destroys or acquires the voxel object Amount of in-game currency to be gained by the player character when the player character destroys or acquires a voxel object In other embodiments, information different from those listed above may be set as information indicating a property of a material.

In the exemplary embodiment, the material data includes, as information that identifies a property of a material, an ID indicating the property (see FIG. 12). Although not shown in FIG. 12, the game system 1 stores, for each property to be prepared, property information in which the property ID is associated with the content of the property (e.g., a value indicating the aforementioned weight or slipperiness). By referring to the property information, the game system 1 can specify the specific content of the property set for the material.

The rendering setting included in the material data is information that indicates setting regarding rendering, such as a texture used for rendering of the voxel object for which the material is set. In the exemplary embodiment, the material data includes, as information on rendering setting, an ID of a texture to be used for rendering the voxel object for which the material is set (see FIG. 12). Although not shown in FIG. 12, the game system 1 stores, for each texture prepared, texture information in which the texture ID is associated with the texture indicated by the texture ID. By referring to the texture information, the game system 1 can specify the specific content of the texture set for the material. In other embodiments, as information on rendering setting, any information regarding setting of shading may be set in addition to the texture information. For example, information regarding reflectivity, normal, or the like may be set.

The material data may include data other than the data shown in FIG. 13. For example, the material data may include data regarding sound setting. For example, the data regarding the sound setting may be data that defines the sound of footsteps that is outputted when the player character walks on the voxel object based on the voxel.

The material data may be data of any form capable of specifying the property and/or rendering setting of the material. For example, in other embodiments, the material data may have a data structure including data that directly indicates the property and/or rendering setting of the material, instead of the data structure including the material ID and the texture ID.

[2-2. Update of Voxel Data]

During the game, the voxel object is deformed when the voxel data is updated. In the exemplary embodiment, when a game event for updating the voxel object (hereinafter referred to as "update event") has occurred, the game system 1 updates the voxel data. The update event may have any content. For example, the update event may be that a character that appears in the game has performed an action to deform the voxel object (e.g., the player character has punched the voxel object), or may be that an event that deforms the voxel object has occurred (e.g., contact of an object thrown by a character with the voxel object, or explosion of a bomb).

FIG. 13 shows an example of a game space when an update event has occurred. In the situation shown in FIG. 13, a player character 201 has performed a punching action to a terrain object 202 that is a voxel object. As will be described in detail below, in the example shown in FIG. 13, the voxel data is updated such that the terrain object 202 at and around a position hit by the punching action of the player character 201 is deleted. This represents how the terrain object 202 is destroyed by the punching action of the player character 201.

In the exemplary embodiment, when such an update event has occurred, the game system 1 sets, in the game space, an update range in which the voxel object is updated (in the example shown in FIG. 13, an update range 203). The position, shape, and size of the update range are discretionary. The position of the update range may be determined based on, for example, a position at which an object regarding the generated update event (e.g., the player character that has punched) comes into contact with the voxel object. In the example shown in FIG. 13, the position of the update range 203 may be determined based on a position that is hit by the punch of the player character 201. For example, the hit position, or a position a predetermined distance ahead of the hit position may be a center position of the update range 203. The shape and size of the update range may be determined in advance according to the type of the update event. For example, when an update event due to a punch of the player character 201 has occurred, the shape and size of the update range may be determined to be a sphere having a predetermined size as shown in FIG. 13. The size of the update range may be determined based on a value indicating the degree of influence of the generated update event (e.g., the intensity of the punch, or the magnitude of the explosion).

The game system 1 changes the density of a voxel corresponding to the set update range. The voxel corresponding to the update range is, for example, a voxel within the update range or a voxels overlapping the update range. As a result of the change in the density, the mesh of the voxel object is changed by a process described below, thereby changing the shape of the voxel object (the shape by appearance, and the shape used for contact determination). In other embodiments, in addition to changing the density of the voxel included in the update range, the game system 1 may change the material in the voxel (e.g., the first material, the second material, and the material mixing ratio), or may change the state in the voxel.

Figure 14:
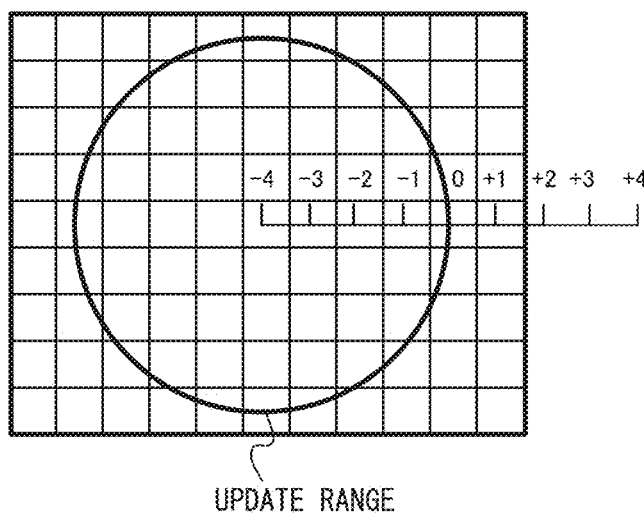
FIG. 14 is a view showing an example of an update range.

In the exemplary embodiment, the game system 1 determines whether or not a voxel is included in the update range, by using an SDF (Signed Distance Field). The game system 1 sets an SDF indicating an update range set in the game space, and performs the aforementioned determination based on the value of the SDF. The SDF represents distances, with signs, of any positions from a shape that the SDF defines. FIG. 14 shows an example of the update range. In the example shown in FIG. 14, a spherical update range is set in the game space. For example, in the example shown in FIG. 14, an SDF is set such that, among positions in the game space, positions inside the shape represented by the SDF have negative SDF values, and positions outside the shape represented by the SDF have positive SDF values. In this example, whether or not each position is included in the update range can be determined depending on whether or not the SDF value is positive or negative. In addition, using the SDF values allows not only simple inside/outside determination but also a process such as correction or interpolation.

In the example described above, a change in which the voxel object in the update range is deformed as if it is deleted, is applied to the voxel object. However, a change to be applied to the voxel object by using the update range is not limited thereto. For example, a change in which a voxel object is newly added in the update range (e.g., the volume that an area in the voxel object occupies is increased by the update range) may be applied to the voxel object (see FIG. 29 described below). A change in which only the voxel material in the update range is changed while the voxel density is not changed, may be applied to the voxel object. A change in the voxel density and a change in the voxel material may be integrally applied.

[2-3. Calculation of Vertices]

When the voxel density has been updated as described above, the game system 1 sets vertices based on the updated voxel data. The vertices can be vertices of a mesh of a voxel object. As will be described in detail below, in the exemplary embodiment, the vertices are simplified, and the simplified vertices become the vertices of the mesh of the voxel object.

Figure 15:
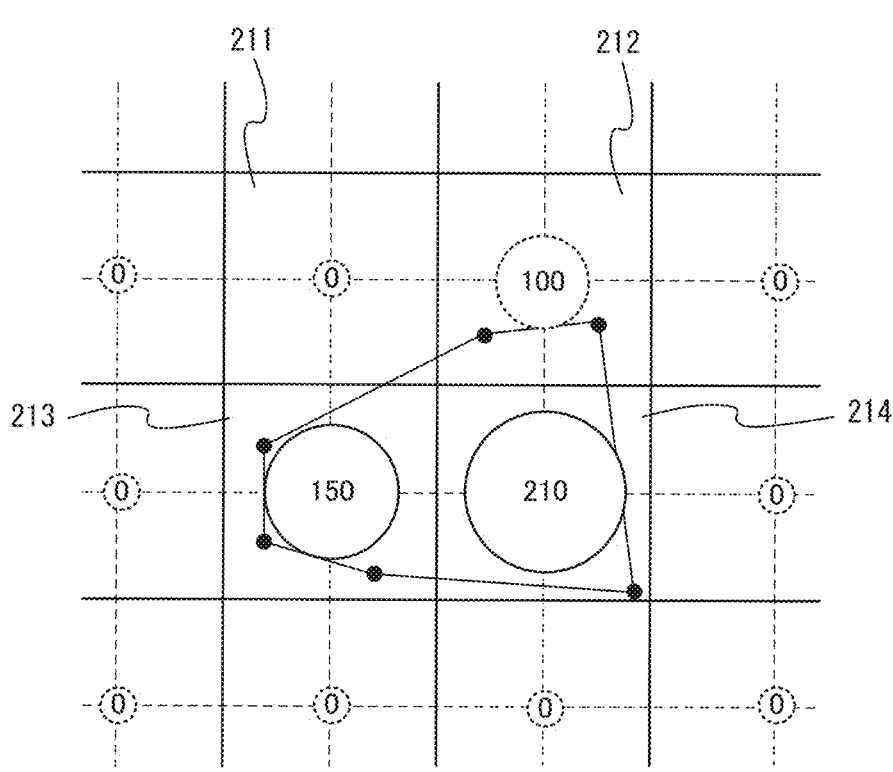
FIG. 15 is a view showing an example of a method for setting vertices.

FIG. 15 shows an example of a method for setting vertices. In FIGS. 15 to 24, voxels, vertices, meshes, etc., are represented in two dimensions for the purpose of making the drawings easily viewable, and the description easily understandable. However, in actuality, vertices and meshes are set in a three-dimensional space, based on voxels in the three-dimensional space. In the exemplary embodiment, the game system 1 executes a method in which, for a portion where a voxel having a density that is set to a value indicating "existence" (e.g., a density equal to or greater than a reference value described below) is adjacent to a voxel having a density that is set to a value indicating "nonexistence" (e.g., a density less than the reference value described below), a vertex is set at coordinates based on the positions and densities of a plurality of neighboring voxels around the portion. Hereinafter, this method will be described in detail.

As described above, in the exemplary embodiment, the density set for a voxel is in the range of 0 to 255. A voxel having a density of 0 is completely empty, and a voxel having a density of 255 is completely filled up. Densities between 0 and 255 are complementarily treated, and are used for determining a vertex. In the exemplary embodiment, voxels are virtually treated such that voxels whose densities are equal to or greater than a reference value are inside a voxel object, and voxels whose densities are less than the reference value are outside the voxel object. It is also possible to virtually treat voxels such that voxels whose densities are equal to or greater than the reference value are voxels indicating "existence", and voxels whose densities are less than the reference value are voxels indicating "nonexistence". It is not necessary to define only voxels having a density of 0 as being outside the voxel object (e.g., reference value=1), and the reference value may be set to, for example, 128. In the example shown in FIG. 15, a voxel 211 and the other outer voxels have a density of 0, a voxel 212 has a density of 100 which is less than the reference value (e.g., 128), and voxels 213, 214 respectively have densities of 150, 210 which are greater than the reference value. In the exemplary embodiment, the game system 1 generates vertices between the voxels whose densities are equal to or greater than the reference value and the voxels whose densities are less than the reference value. Specifically, for each region (region delimited by dotted lines) that straddles eight (four in the figure) adjacent voxels, it is determined whether or not to generate a vertex. That is, a vertex is generated in each region that straddles both a voxel whose density is equal to or greater than the reference value and a voxel whose density is less than the reference value. The coordinates of each vertex are determined by comparing the densities of adjacent voxels and performing interpolation based on the difference in density for each of the XYZ axes. Normal information that defines positions and directions of straight lines connecting the vertices may be set in advance, whereby the coordinates of each vertex can be calculated based on the normal information. The normal information may be stored in advance for at least some of the voxels, or if not stored, the normal information may also be calculated based on the densities between adjacent voxels. In FIG. 15, since the density of the voxel 212 is less than the reference value, the voxel 212 is treated as being outside the voxel object in the determination of presence/absence of a vertex, but the density value itself of the voxel 212 is used to calculate the coordinates of the vertices to be generated. If the reference value is set to a value lower than the density of the voxel 212, it would result in an increase in the vertices on the upper right side and the upper left side in the voxel 212 shown in FIG. 15.

By setting the vertices as described above, it is possible to generate a shape whose volume is based on (e.g., reflects) the density of each voxel to some extent, in generating a mesh connecting the set vertices (or vertices obtained by subjecting the set vertices to a simplification process described below). However, depending on the relationship with the neighboring voxels, a voxel having a density of 0 may partially include a region inside the voxel object, or a voxel having a density of 255 may partially include a region outside the voxel object. In the exemplary embodiment, since voxels having densities less than the reference value are treated as being outside the voxel object, there are fewer vertices as compared with a case where those voxels are treated as being inside the voxel object, and the volume will be smaller accordingly. That is, there is no need to calculate the polygon mesh so that the volume strictly corresponds to the density value.

[2-4. Determination of Material of Vertex]

The game system 1 determines a material for each of the vertices set as described above. The material of the vertex is determined based on materials regarding voxels around this vertex. The voxels around the vertex are, for example, voxels used for determining whether or not to generate the vertex (e.g., voxels overlapping the aforementioned region that straddles voxels). In other embodiments, the voxels used for determining the material of the vertex and the voxels used for determining generation of the vertex may not necessarily be the same, and may be different from each other.

Figure 16:
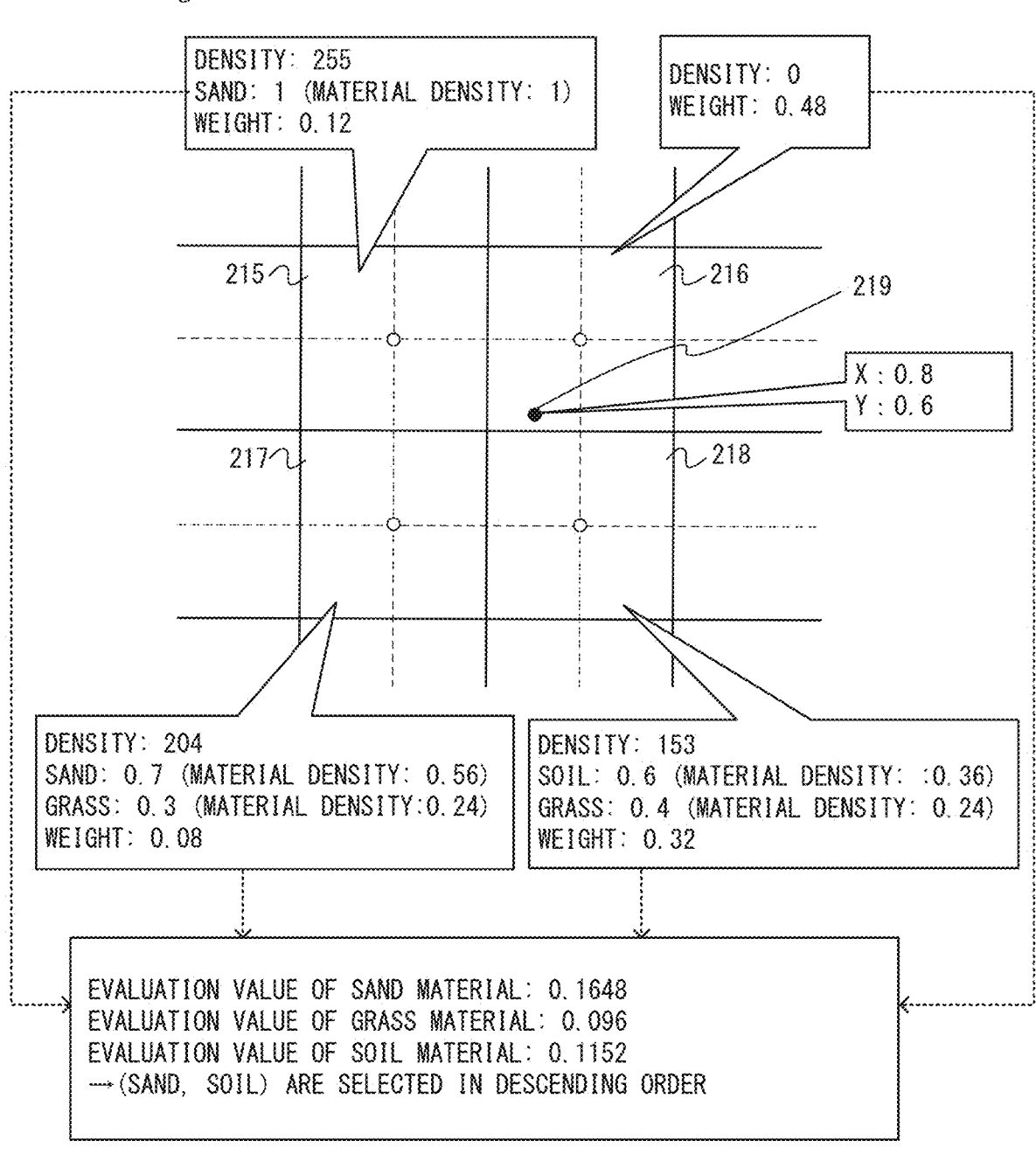
FIG. 16 is a view showing an example of a method for determining a material of a vertex.

FIG. 16 shows an example of a method for determining a material of a vertex. In the example shown in FIG. 16, a vertex 219 is set with respect to four voxels 215 to 218, and the four voxels 215 to 218 correspond to the aforementioned "voxels around the vertex". In an actual three-dimensional space, the number of voxels around the vertex is eight. In the example shown in FIG. 16, as for the voxel 215, a density of 255, a first material of "sand", and a material mixing ratio of 0 (e.g., first material:second material=1:0, or the second material may not necessarily be set) are set. As for the voxel 216, a density of 0 is set (the first and second materials may not necessarily be set). As for the voxel 217, a density of 204, a first material of "sand", a second material of "grass", and a material mixing ratio of 0.3 (e.g., first material:second material=0.7:0.3) are set. As for the voxel 218, a density of 153, a first material of "soil", a second material of "grass", and a material mixing ratio of 0.4 (e.g., first material:second material=0.6:0.4) are set. In addition, the coordinates indicating the position of the vertex 219 are (X, Y)=(0.8, 0.6). A coordinate system for the coordinates has an X coordinate in the left-right direction and a Y coordinate in the up-down direction, in FIG. 16. In the coordinate system, among center positions of the voxels 215 to 218 (positions of white circles in FIG. 16), the center position of the lower-left voxel 217 is (0, 0).

In determining a material of the vertex, the game system 1 calculates an evaluation value for each of the materials of the neighboring voxels, based on the density of the material, and a weight value based on the distance from the voxel to the vertex. First, the weight value is calculated for each voxel. The shorter the distance from the center position of the voxel to the vertex is, the greater the weight value is. In the exemplary embodiment, assuming that the center position of a certain voxel is (x1, y1) and the coordinates of the vertex are (x2, y2), a weight value for the voxel is calculated according to the following formula (1).

$$(\text{weight value})=|(1-x1)-x2|\cdot|(1-y1)-y2| \tag{1}$$

In the example shown in FIG. 16, the weight values of the voxels 215 to 218 calculated according to the formula (1) are as follows.

$$(\text{weight value of voxel } 215)=|(1-0)-0.8|\cdot|(1-1)-0.6|=0.12$$

$$(\text{weight value of voxel } 216)=|(1-1)-0.8|\cdot|(1-1)-0.6|=0.48$$

$$(\text{weight value of voxel } 217)=|(1-0)-0.8|\cdot|(1-0)-0.6|=0.08$$

$$(\text{weight value of voxel } 218)=|(1-1)-0.8|\cdot|(1-0)-0.6|=0.32$$

The game system 1 calculates a density of a material for each voxel. Here, the density of the material is a value obtained by multiplying the proportion of this material, among materials set for the voxel, by the density of the voxel. In the exemplary embodiment, for the densities of the voxels, values obtained by normalizing the aforementioned values from 0 to 255 to values from 0 to 1 are used. In the example shown in FIG. 16, as for the voxel 215, since the material set for this voxel is only sand, the proportion regarding the sand material is 1, and the density of the voxel is 1, and therefore, the density of the sand material is 1. As for the voxel 216, since the density is 0 and no material is set, a material density is not calculated. If any material is set, the density of this material is 0. As for the voxel 217, the proportions of the sand material and the grass material being set are 0.7 and 0.3, respectively, and the density of the voxel is 204/255=0.8. Therefore, the density of the sand material is 0.7·0.8=0.56, and the density of the grass material is 0.3·0.8=0.24. As for the voxel 218, the proportions of the soil material and the grass material being set are 0.6 and 0.4, respectively, and the density of the voxel is 153/255=0.6. Therefore, the density of the soil material is 0.6·0.6=0.36, and the density of the grass material is 0.4·0.6=0.24.

Then, the game system 1 calculates the evaluation value for each material, based on the weight value and the density of the material. In the exemplary embodiment, the evaluation value of the material is a value obtained by weighting the density of the material calculated for each voxel, according to the weight value of the voxel, and summing up the weighted densities of the neighboring voxels. In the example shown in FIG. 16, the evaluation value of the sand material is 1·0.12+0.56·0.08=0.1648 because the density of the material is 1 and the weight value is 0.12 for the voxel 215, and the density of the material is 0.56 and the weight value is 0.08 for the voxel 217. The evaluation value of the grass material is 0.24·0.08+0.24·0.32=0.096 because the density of the material is 0.24 and the weight value is 0.08 for the voxel 217, and the density of the material is 0.24 and the weight value is 0.32 for the voxel 218. The evaluation value of the soil material is 0.36·0.32=0.1152 because the density of the material is 0.36 and the weight value is 0.32 for the voxel 218.

The game system 1 determines a material of the vertex, based on the evaluation values of the respective materials. Specifically, a predetermined number of materials in order from one having the greater evaluation value are determined as materials of the vertex. In the exemplary embodiment, two materials having the first and second greatest evaluation values are determined as materials of the vertex. In the example shown in FIG. 16, since the evaluation values of the sand, grass, and soil materials are 0.1648, 0.096, and 0.1152, respectively, the sand material and the soil material are determined as the materials of the vertex. Furthermore, the game system 1 calculates the ratio of the determined two materials, based on the evaluation values described above. In the exemplary embodiment, the ratio of the two materials may be represented as a second material ratio that is a ratio of the second material to the whole, like the aforementioned material mixing ratio. In the example shown in FIG. 16, for example, if the first material and the second material are set to soil and sand, respectively, the second material ratio is represented as 0.1648/(0.1648+0.1152)≈0.59. In other embodiments, as a value representing the ratio of the two materials, a value representing the proportion of the first material may be used. Alternatively, values representing the proportions of the respective materials may be used.

In the exemplary embodiment, the game system 1 generates and stores therein vertex data indicating the position of a vertex, material IDs of the first and second materials set for the vertex, and the ratio of the materials. However, the method for managing materials set for a vertex is discretionary. In other embodiments, the vertex data may have a data structure including data that directly indicates the contents of the first and second materials.

As described above, in the exemplary embodiment, regarding material IDs included in voxel data of a plurality of neighboring voxels around each vertex, the game system 1 calculates a priority parameter (e.g., evaluation value) for each material ID, based on the voxel data. Then, based on the priority parameters, the game system 1 selects a predetermined number of (two in this embodiment) material IDs having the higher priorities, and determines the selected materials IDs as material IDs for the vertex. The specific parameter to be used as the priority parameter is not limited to the evaluation value. For example, in other embodiments, an evaluation value that is calculated using the density of the material without using the weight value may be used as a priority parameter.

In the exemplary embodiment, the evaluation value as an example of the priority parameter is calculated based on the densities of the plurality of neighboring voxels around the vertex such that the material set for the voxel having the higher density has the higher priority (e.g., the evaluation value of the material is increased and thereby the material is highly likely to be selected). Thus, the material of the vertex can be determined while also incorporating (e.g., reflecting) the magnitude of the density set for the voxel.

In the exemplary embodiment, the evaluation value as an example of the priority parameter is calculated based on the distances from reference positions (specifically, center positions) of a plurality of neighboring voxels around the vertex, to the vertex such that the material set for the voxel closer to the vertex has the higher priority. Thus, the material of the vertex can be determined while also incorporating (e.g., reflecting) the distances between the voxels and the vertex.

In the exemplary embodiment, it can also be said that the evaluation value as an example of the priority parameter is calculated based on the material mixing ratios of a plurality of neighboring voxels around the vertex such that the material having the higher material mixing ratio has the higher priority. Thus, in the case where a plurality of materials are set for one voxel, the material of the vertex can be determined while also incorporating (e.g., reflecting) the ratio of the materials.

[2-5. Simplification of Vertices]

In the exemplary embodiment, the game system 1 simplifies the vertices calculated as described above. That is, the game system 1 replaces some of the vertices calculated as described above with one vertex to decrease the number of vertices. As will be described in detail below, the coordinates (e.g., position) and the material of the replacing vertex are set based on a plurality of vertices before replacement. Such simplification can reduce the numbers of vertices and polygons that form a mesh of a voxel object, thereby reducing the amount of memory used for processing, and reducing the processing load.

Figure 17:
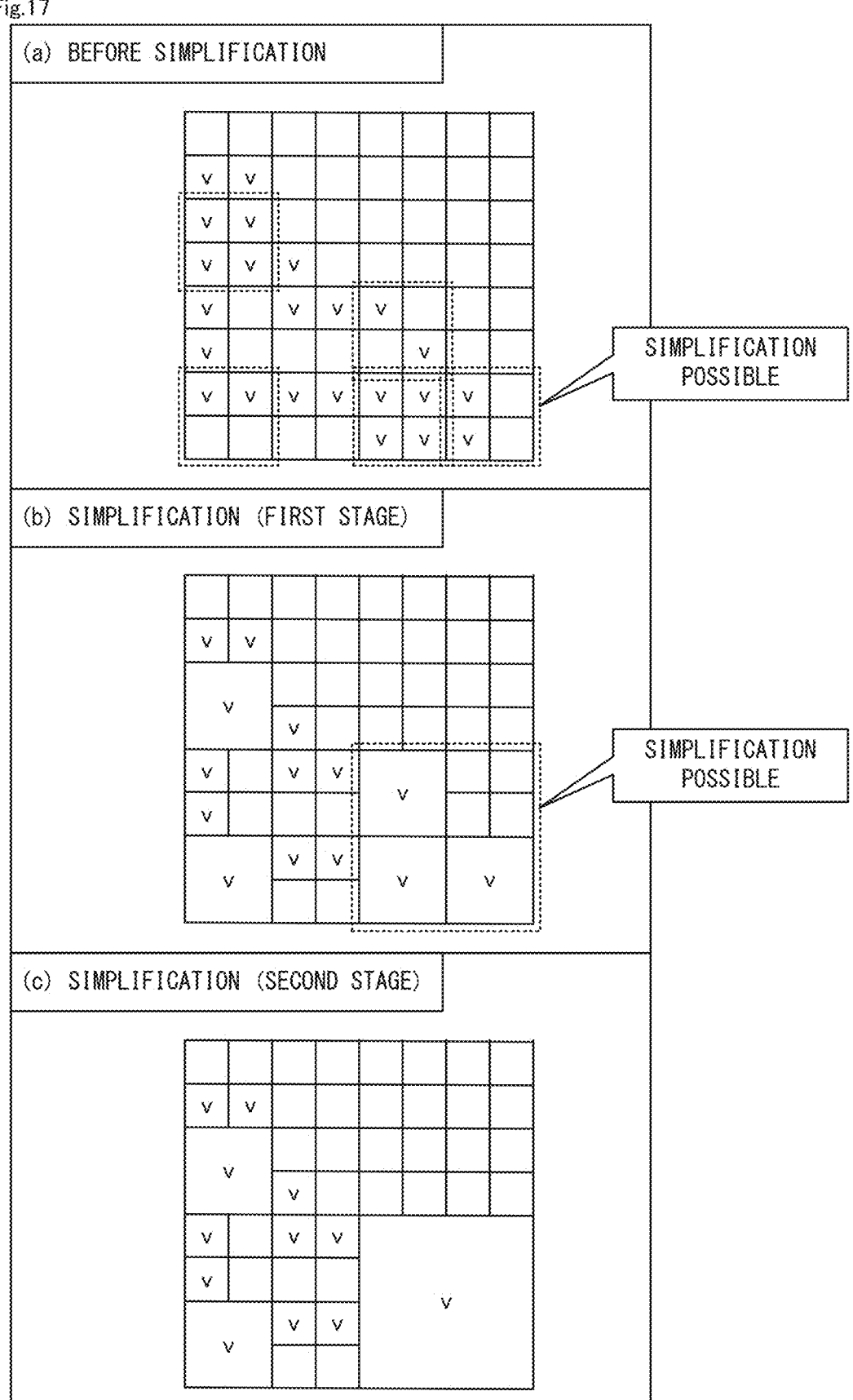
FIG. 17 is a view showing an example of vertex simplification.

In the exemplary embodiment, the game system 1 performs simplification by representing vertices using SVO (Sparse Voxel Octree). FIG. 17 shows an example of vertex simplification. In FIG. 17, one square delimited by solid lines in (a) represents one vertex division region. Here, the vertex division region is a square region with a center position of a voxel being a vertex (in an actual three-dimensional space, the vertex division region is a cube or a rectangular parallelepiped), and corresponds to a region with the dotted lines being sides shown in FIG. 15 and FIG. 16. In FIG. 17, each vertex division region having a character "v" inside is a vertex division region in which a vertex is set.

In the exemplary embodiment, the game system 1 determines whether or not simplification can be performed with respect to the vertices in a predetermined number of (four in FIG. 17, and eight in an actual three-dimensional space) vertex division regions adjacent to each other. If the determination result is that simplification can be performed, simplification is performed for the vertices in the predetermined number of vertex division regions.

In FIG. 17, (a) shows the state before simplification is performed. In the example shown in FIG. 17, it is determined that simplification can be performed for vertex division regions within a range surrounded by dotted lines. In this case, the game system 1 performs simplification such that the vertices in the predetermined number of vertex division regions determined to be simplified are replaced with one vertex (see (b) of FIG. 17). Thus, the vertices in the predetermined number of vertex division regions are simplified to one vertex.

In the exemplary embodiment, the game system 1 performs simplification in a plurality of stages. The number of the stages is discretionary. In FIG. 17, first and second stages are shown and described. In FIG. 17, (b) shows the state in which the first-stage simplification has been performed, and (c) shows the state in which the second-stage simplification has been performed. In the second-stage simplification, whether or not simplification can be performed is determined for vertices that are generated by the first-stage simplification. In the example shown in FIG. 17, when the determination result is that the vertex division regions within a range surrounded by dotted lines in (b) of FIG. 17 can be subjected to simplification, the vertices in the vertex division regions are simplified, resulting in the state shown in (c) of FIG. 17. The condition for determining whether or not the first-stage simplification can be performed and the condition for determining whether or not the second-stage simplification can be performed may be the same or different from each other.

The specific method for determining whether or not simplification can be performed is discretionary. In the exemplary embodiment, as conditions for the above determination, a condition regarding the shape of the voxel object and a condition regarding the material of the voxel object are used. In the exemplary embodiment, if both the condition regarding the shape of the voxel object and the condition regarding the material of the voxel object are satisfied, it is determined that simplification can be performed. If at least one of the condition regarding the shape of the voxel object and the condition regarding the material of the voxel object is not satisfied, it is determined that simplification cannot be performed.

The condition regarding the shape is, for example, that there is no significant change between the shape due to the vertices before the simplification and the shape due to the vertices after the simplification. For example, determination as to whether or not there is a significant change in the shape due to the vertices before and after the simplification may be performed by calculating an index indicating an error between the mesh before the simplification and the mesh after the simplification, and determining whether or not the index is equal to or smaller than a predetermined allowable value. Furthermore, for example, if the shape due to the vertices after the simplification is not a hollow shape while the shape due to the vertices before the simplification is a hollow shape (e.g., the simplification causes missing of information that the shape is hollow), it is determined that the condition regarding the shape is not satisfied. Whether or not the aforementioned case will occur can be determined based on, for example, the densities of voxels corresponding to the vertex division regions to be subjected to the determination. Moreover, for example, if the shape due to the vertices before the simplification can be represented only by two or more vertices, e.g. it cannot be represented by one vertex, it is determined that the condition regarding the shape is not satisfied. As the condition regarding the shape of the voxel object, the same condition as that used for the conventional method with the SVO may be used.

Figure 18:
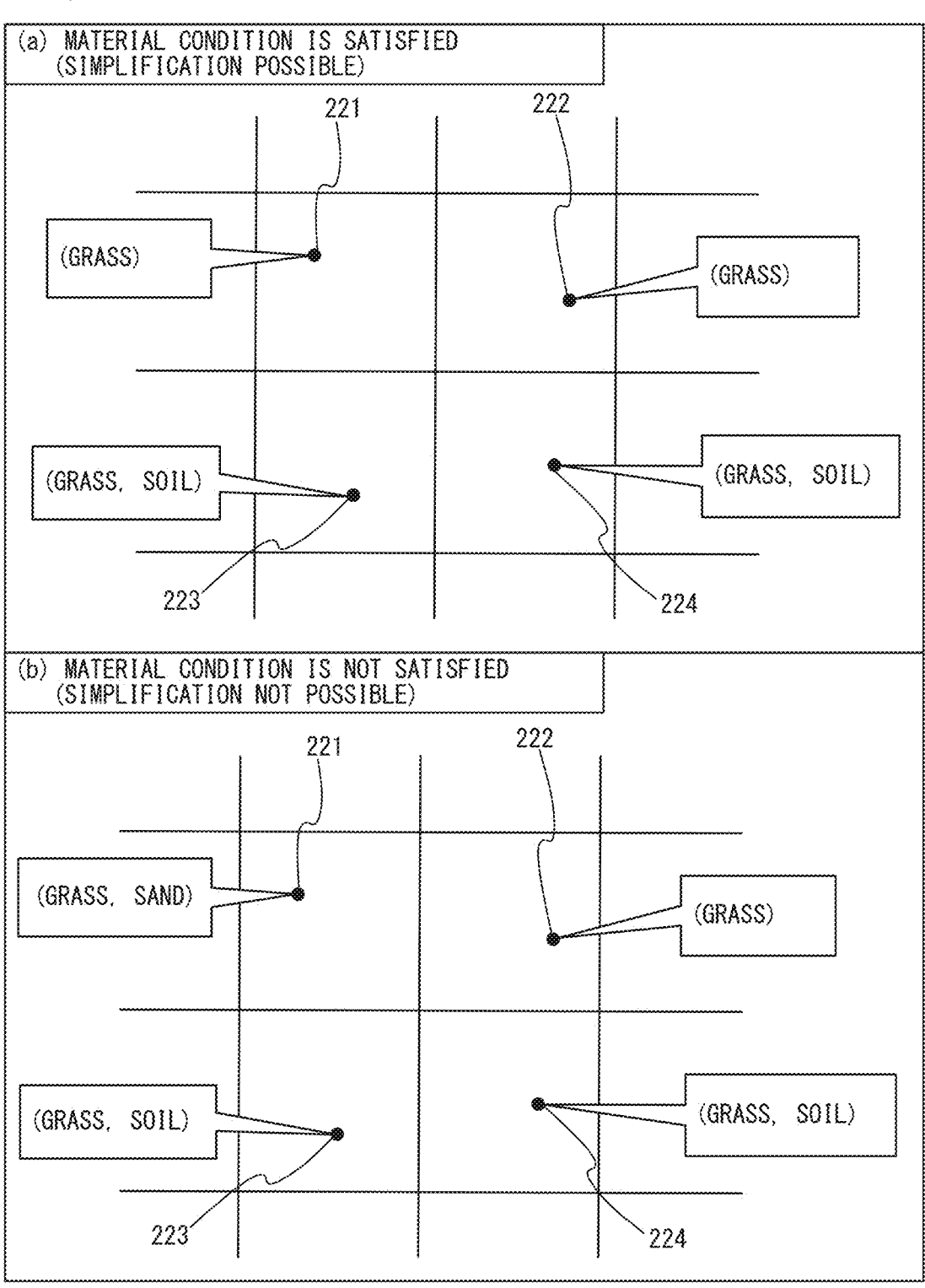
FIG. 18 is a view showing an example of conditions regarding materials.

In the exemplary embodiment, as the condition regarding the material, a condition regarding the number of types of materials to be set for the vertices in the predetermined number of vertex division regions to be subjected to simplification, is used. FIG. 18 shows an example of the condition regarding the material. In FIG. 18, (a) shows a case where the materials of vertices 221 to 224 are "grass", "grass", "grass and soil", and "grass and soil", respectively, and (b) shows a case where the materials of the vertices 221 to 224 are "grass and sand", "grass", "grass and soil", and "grass and soil", respectively. In the exemplary embodiment, the condition regarding the material is that the total number of the types of materials set for the vertices to be subjected to simplification is equal to or less than a predetermined number. For example, the condition regarding the material is that the total number is equal to or less than the number of materials that can be set for one vertex. In the exemplary embodiment, the predetermined number is 2. For example, in the case of (a) of FIG. 18, since the total number of the types of materials set for the vertices 221 to 224 to be subjected to simplification is 2 (e.g., grass and soil), the condition regarding the material is satisfied. In this case, it is determined that the vertices 221 to 224 can be subjected to simplification on the condition that the aforementioned condition regarding the shape of the object is satisfied. On the other hand, in the case of (b) of FIG. 18, since the total number of the types of materials set for the vertices 221 to 224 to be subjected to simplification is 3 (e.g., grass, soil, and sand), the condition regarding the material is not satisfied. In this case, it is determined that the vertices 221 to 224 cannot be subjected to simplification regardless of whether or not the condition regarding the shape of the object is satisfied.

In the game system 1, multiple types of materials to which the same property is set and which are different in appearance may be prepared even though these materials should strictly be classified into different types. Some of the multiple types of materials may be regarded as being of the same type in determining whether the condition regarding the material is satisfied. For example, multiple types of soil materials having the same property and similar appearances (e.g., texture colors or patterns) may be prepared. In this case, the game system 1 may determine whether the condition regarding the material is satisfied while regarding the multiple types of soils as being of the same type.

In the exemplary embodiment, at most two types of materials can be set for a vertex as in the case of a voxel. Meanwhile, in the exemplary embodiment, if the total number of the types of materials set for the vertices to be subjected to simplification is three or more, simplification is not performed. That is, if the total number of the types of materials exceeds the number of materials that can be set for one vertex, simplification is not performed. Therefore, even when the number of vertices is reduced through simplification, the simplification does not cause missing of information on the materials set for the vertices, thereby maintaining the information on the materials.

In the exemplary embodiment, a material of the vertex after the simplification is determined based on the materials of the vertices before the simplification. Specifically, the game system 1 sets the one or two types of materials set on the vertices before the simplification, as the first material and the second material of the vertex after the simplification. This allows the information on the materials to be maintained. The ratio of the materials after the simplification is determined based on the ratio of the materials of the vertices before the simplification. In the exemplary embodiment, the radio of the materials after the simplification is calculated similarly to the aforementioned method for calculating the ratio of materials of vertices by using the evaluation values. That is, the game system 1 calculates weight values based on the distances between the vertex after the simplification and the vertices before the simplification, and calculates an evaluation value for each material, based on the weight values and the densities of the materials of the vertices before the simplification (the evaluation values of the materials described in the above [2-4. Determination of material of vertex] can be used as the densities of the materials here). Then, the ratio of the materials is calculated based on the calculated evaluation values of the materials.

[2-6. Generation of Mesh]

Figure 19:
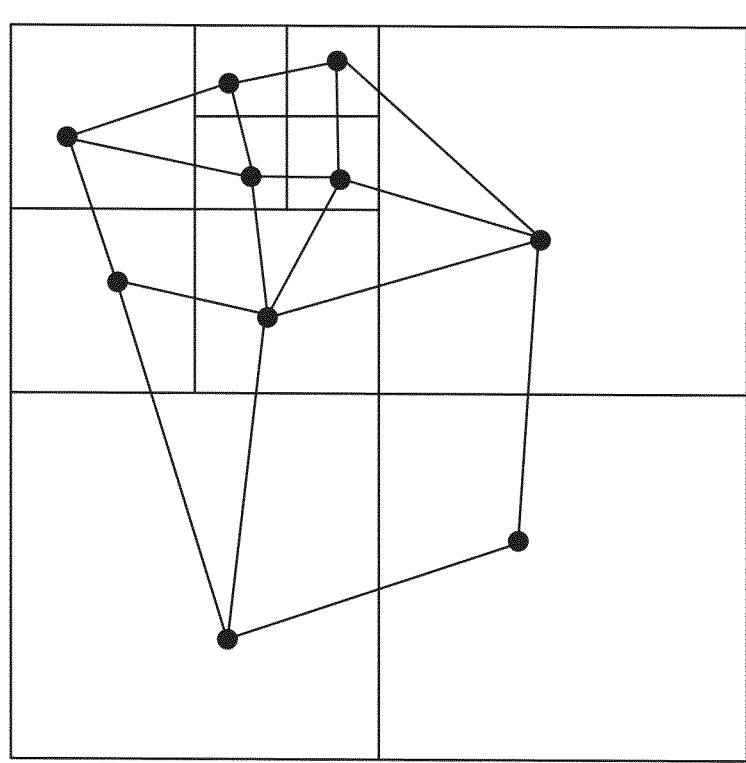
FIG. 19 is a view showing an example of a mesh generated based on vertices.

In the exemplary embodiment, a mesh of a voxel object is generated based on vertices having been simplified as described above. FIG. 19 shows an example of a mesh generated based on such vertices. Each of squares shown in FIG. 19 represents a vertex division region as described above, or a vertex division region obtained by integrating a plurality of vertex division regions through simplification. As shown in FIG. 19, the game system 1 generates a mesh that is composed of polygonal shapes each having, as one side, a straight line connecting vertices of adjacent vertex division regions. Each of the polygonal shapes forming the mesh is a triangle or a quadrangle.

In the exemplary embodiment, the game system 1 generates two types of meshes—e.g., a display mesh and a determination mesh. The display mesh is a mesh used for displaying a voxel object. The determination mesh is a mesh used for collision determination for a voxel object. As will be described in detail below, by using the two types of meshes, the game system 1 can perform processing with the meshes suitable for display of the voxel object and collision determination, respectively.

In the exemplary embodiment, the game system 1 generates the display mesh and the determination mesh, based on data of the SVO described above (e.g., based on the simplified vertices). Thus, sharing vertex data in generating the two types of meshes improves efficiency of processing. In other embodiments, the game system 1 may not necessarily perform simplification of vertices, and may generate a display mesh and/or a determination mesh, based on vertices that are not simplified.

In the exemplary embodiment, the game system 1 generates the determination mesh so as to be simpler in shape than the display mesh. Specifically, the game system 1 makes the number of vertices of the determination mesh less than the number of vertices of the display mesh. Here, in the exemplary embodiment, the data of the SVO holds, in an octree data structure, data of vertices before simplification and data of simplified vertices, and also includes data used for determining whether or not simplification can be performed. This data includes, for example, data of vertices (referred to as "provisional vertices") calculated as candidates for a vertex after simplification, and data of the aforementioned index indicating an error between the vertices before simplification and the provisional vertices. For example, the game system 1 may use, among the provisional vertices, a vertex the index of which is equal to or less than a predetermined threshold value (this threshold value is greater than the aforementioned allowable value), for generation of the determination mesh. This allows the number of vertices of the determination mesh to be less than the number of vertices of the display mesh. The number of vertices of the determination mesh being less than the number of vertices of the display mesh allows a reduction in processing load for collision determination. Moreover, since the number of vertices of the display mesh is not excessively reduced, the appearance of the voxel object can be represented in detail.

In other embodiments, the display mesh and the determination mesh may be generated based on the same data, or may be generated based on different data. The display mesh and the determination mesh may have the same shape (even in this case, materials set for these meshes may be different from each other). The number of vertices of the determination mesh may be equal to the number of vertices of the display mesh, or may be greater than the number of vertices of the display mesh.

[2-6-1. Determination of Material of Display Mesh]

Next, an example of a method for determining materials and an appearance of a display mesh will be described. In the exemplary embodiment, the game system 1 determines a material for each of the polygonal shapes forming the display mesh. As will be described in detail below, in the exemplary embodiment, a polygon corresponding to each polygonal shape is rendered using at most two types of textures corresponding to at most two types of materials. Therefore, the game system 1 determines materials for the polygonal shapes forming the mesh such that two or less types of materials are finally set for one polygonal shape. In other embodiments, three or more materials may be set. For example, in an embodiment in which three or more types of voxel materials and three or more types of vertex materials are set, the same number of materials may be set for the polygonal shapes.

In the exemplary embodiment, quadrangles may be formed as polygonal shapes forming the display mesh (see FIG. 19). In determining materials of the display mesh, the game system 1 firstly divides each of the quadrangles forming the display mesh into two triangles under certain conditions. Hereinafter, a process of dividing a quadrangle into two triangles will be described with reference to FIG. 20.

Figure 20:
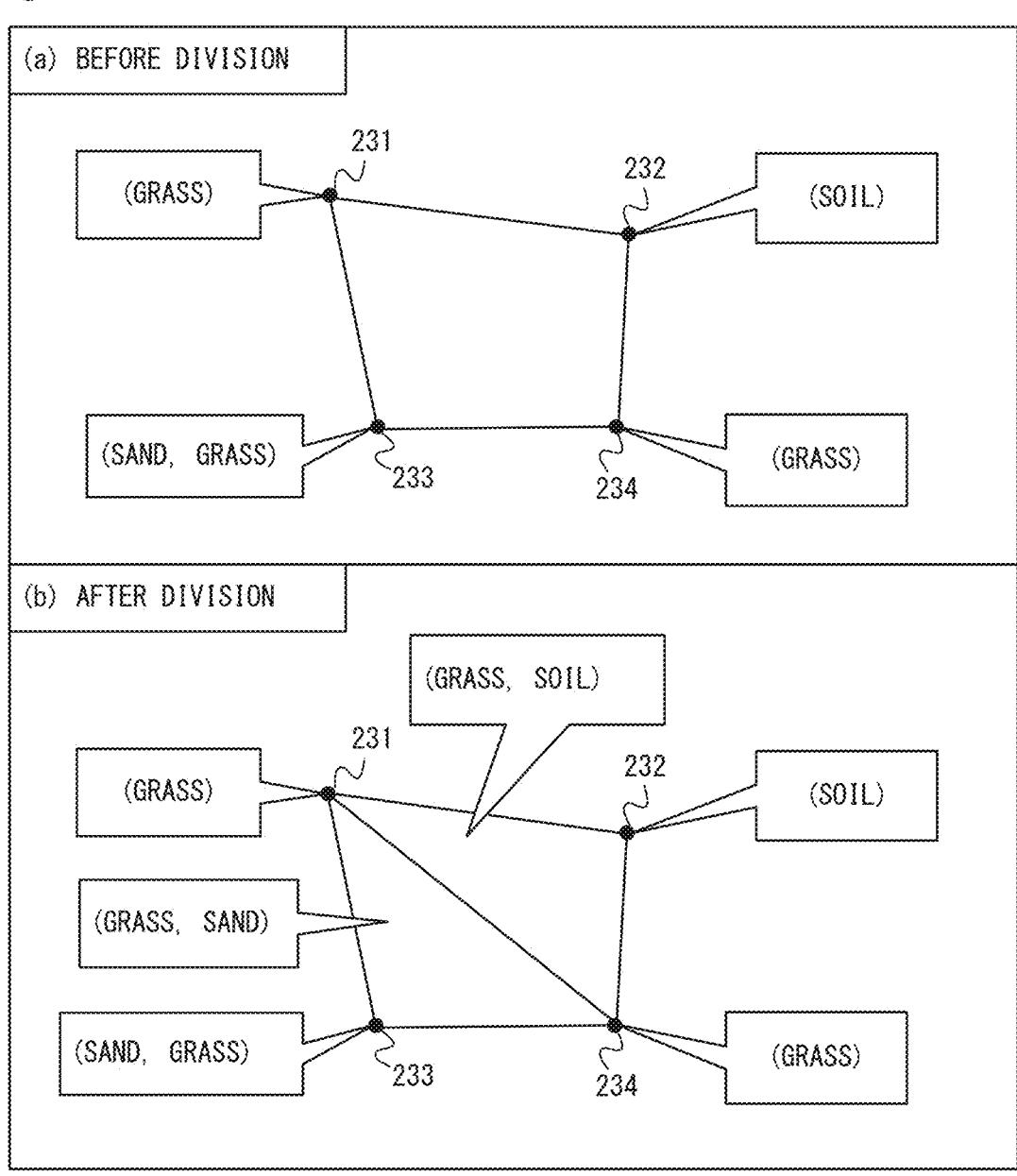
FIG. 20 is a view showing an example of division of a quadrangle forming a mesh into two triangles.

FIG. 20 shows an example of diving a quadrangle forming a mesh into two triangles. In FIG. 20, (a) shows a quadrangle before division, formed by vertices 231 to 234 included in the vertices of the mesh. In FIG. 20, (b) shows two triangles into which the quadrangle is divided. In the example shown in FIG. 20, "grass", "soil", "sand and grass", and "grass" are set as materials of the respective vertices 231 to 234.

In the exemplary embodiment, if the number of types of materials set for the vertices of the quadrangle is three or more in total, the game system 1 determines whether or not a division condition is satisfied. In the exemplary embodiment, the division condition is that dividing the quadrangle into two triangles allows the number of types of materials set for the vertices of each triangle to be two or less in total. If the division condition is satisfied, the game system 1 divides the quadrangle into two triangles each having two or less types of materials set for the vertices. In the example shown in FIG. 20, three types of example materials, grass, soil, and sand, are set for the vertices 231 to 234 forming the quadrangle. If the quadrangle is divided into a triangle formed by the vertices 231, 232, 234 and a triangle formed by the vertices 231, 233, 234, two types of materials, sand and grass, are set for the vertices of the former triangle, and two types of materials, grass and soil, are set for the vertices of the latter triangle (see (b) of FIG. 20). Since the division condition is satisfied for the quadrangle, the game system 1 divides the quadrangle into two triangles.

Since there are two methods for dividing a quadrangle into two triangles, if the division condition is satisfied for the triangles into which the quadrangle is divided by at least one of the two methods, the game system 1 performs the division by the method satisfying the division condition. Meanwhile, if the division condition is not satisfied for the triangles into which the quadrangle is divided by either of the two methods, the game system 1 performs the division by either method.

By performing the division as described above, the game system 1 can generate two triangles each having two or less types of materials set for the vertices, without missing information on three or more types of materials set for the vertices of the quadrangle as much as possible. Here, as described above, each of the polygons forming the mesh is rendered using at most two types of textures. Therefore, by performing the division, the game system 1 can render each polygon by using two types of textures without missing information on the materials set for the vertices as much as possible.

In the exemplary embodiment, the game system 1 sets polygons corresponding to the polygonal shapes obtained through the aforementioned division. That is, the vertices of the polygonal shapes obtained through the division become the vertices of the polygons of the display mesh.

Figure 21:
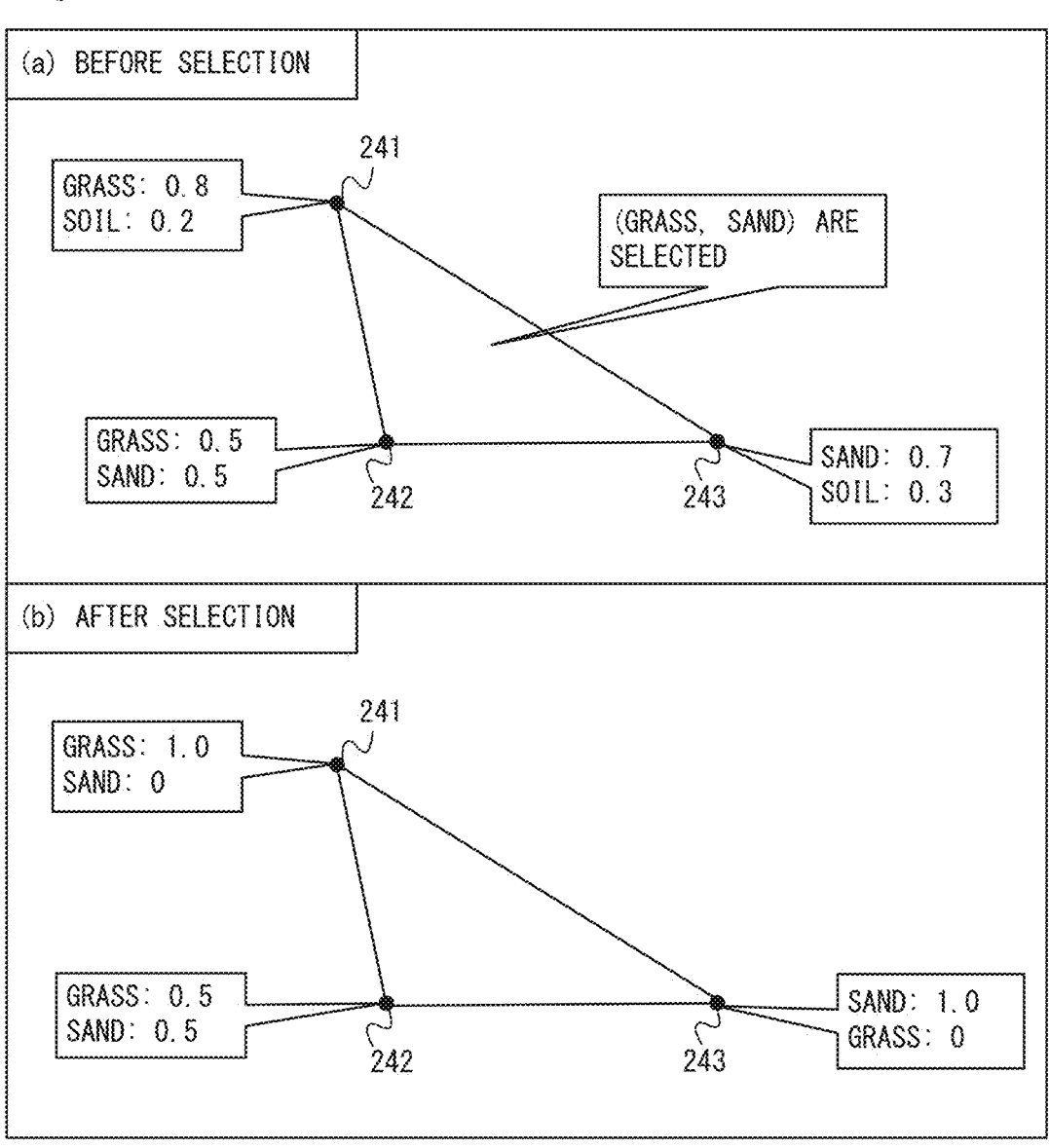
FIG. 21 is a view showing an example of a method for determining materials of polygons forming a display mesh.

In the exemplary embodiment, as for the polygons forming the display mesh, if the number of types of materials set for the vertices of one polygon is three or more in total, the game system 1 selects two types of materials to determine materials of this polygon. FIG. 21 shows an example of a method for determining materials of a polygon forming the display mesh. In the example shown in FIG. 21, as for a vertex 241 of a triangular polygon forming the display mesh, the first material is "grass", the second material is "soil", and the material ratio of the first material to the second material is 0.8:0.2. As for a vertex 242 of the polygon, the first material is "grass", the second material is "sand", and the material ratio of the first material to the second material is 0.5:0.5. As for a vertex 243 of the polygon, the first material is "sand", the second material is "soil", and the material ratio of the first material to the second material is 0.7:0.3.

If the number of types of materials set for the vertices of the polygon is three or more in total, the game system 1 calculates a determination value for each material. The determination value is calculated as a sum of the proportions of the material at the vertices on which the material is set. Then, the game system 1 selects two materials in order from one having the greatest determination value, as materials of the polygon. In the example shown in FIG. 21, the determination value of the grass material is 0.8+0.5=1.3, the determination value of the sand material is 0.5+0.7=1.2, and the determination value of the soil material is 0.2+0.3-0.5. Therefore, the grass material and the sand material are selected as materials of the polygon shown in FIG. 21 (see (a) of FIG. 21).

The specific method for selecting a material of a polygon of the display mesh is discretionary. In other embodiments, a material of a polygon of the display mesh may be selected by any method based on information set for the vertices of the polygon. For example, a material of a polygon of the display mesh may be selected as follows. That is, a material having the greatest proportion at one vertex is specified for each vertex, and a material that is most frequently specified for each vertex is selected as a material of the polygon.

In the exemplary embodiment, the selected materials of the polygon are indicated as materials set for the vertices of the polygon. That is, when the materials of the polygon have been selected, the game system 1 changes the materials being set for the vertices of the polygon (e.g., the material IDs included in the vertex data) to the selected materials. In the example shown in FIG. 21, as for the vertex 241 and the vertex 243, "grass and soil" and "sand and soil" are respectively set before the selection of materials of the polygon (see (a) of FIG. 21). When grass and sand have been selected as materials of the polygon as described above, the materials set for the vertex 241 and the vertex 243 are changed to "grass and sand" (see (b) of FIG. 21). Since the materials set for the vertex 242 before the selection are the same as the selected materials of the polygon, the materials are not changed. In the case where two types of materials are selected as materials of the polygon as described above, information on the third and subsequent types of materials set for the vertices of the polygon are deleted.

According to the change of the materials set for each vertex, the game system 1 changes the ratio of the materials set for the vertex. For example, as for the vertex 241, the content indicating that the first material is grass and the second material is soil is changed to the content indicating that the first material is grass and the second material is sand. Here, since the proportion of the sand material is 0, the material ratio of the first material to the second material becomes 1:0. Thus, the above change is formally changing the materials of the vertices of the polygon in order to represent the materials of the polygon by the materials of the vertices of the polygon.

According to the above, since the materials set for the vertices of one polygon are only the materials corresponding to the textures used for rendering described below, a rendering process using the textures can be easily performed.

There may be a case where the aforementioned change causes all the materials at a certain vertex to be changed (e.g., none of the materials after the change correspond to the materials before the change). For example, there is a case where the material set for the vertex before the change is soil, and the materials selected as materials of the polygon are grass and sand. In this case, the ratio of the materials at the certain vertex may be set based on the material ratios at the other vertices of the polygon. For example, in the above example, in the case where the first material set for one of the remaining two vertices of a triangular polygon is grass and the material ratio of grass to sand is 1:0 while the material set for the other vertex is sand and the material ratio of sand to grass is 1:0, the material ratio at the certain vertex may be set to grass:sand=0.5:0.5. The game system 1 may determine the material ratio at the certain vertex in consideration of the distance between this vertex and the other vertex (e.g., based on a weight value that increases as the distance is shorter).

As described above, in the exemplary embodiment, the game system 1 selects, for each polygon, at most a predetermined number of (two in this embodiment) material IDs from among the material IDs set for the vertices included in the polygon (e.g., material IDs set for the vertices of the polygonal shape corresponding to the polygon), and determines the selected material IDs as material IDs of the polygon. Thus, the game system 1 can perform the rendering process with the number of textures to be used being reduced, while incorporating (e.g., reflecting) the materials set for the vertices into the appearance of the polygon.

In the exemplary embodiment, regarding the materials of all the vertices forming a polygon, if the number of the materials is equal to or less than the predetermined number, the game system 1 determines the materials as materials of the polygon. Meanwhile, if the number of the materials exceeds the predetermined number, the game system 1 selects a predetermined number of materials having higher priorities, based on the priority parameters of the vertices (specifically, based on the determination values calculated based on the aforementioned evaluation values), and determines the selected materials as materials of the polygon. Thus, even if the number of the materials set for the vertices exceeds, in total, the predetermined number, the number of the materials of the polygon can be made equal to or less than the predetermined number in consideration of the priority.

As described above, in the exemplary embodiment, the first and second materials set for each of the vertices of one polygon are changed to the two types of materials to be set for the polygon. In performing such a change, as for a vertex shared by adjacent two polygons, there is a possibility of inconsistency in the first and second materials to be set.

Figure 22:
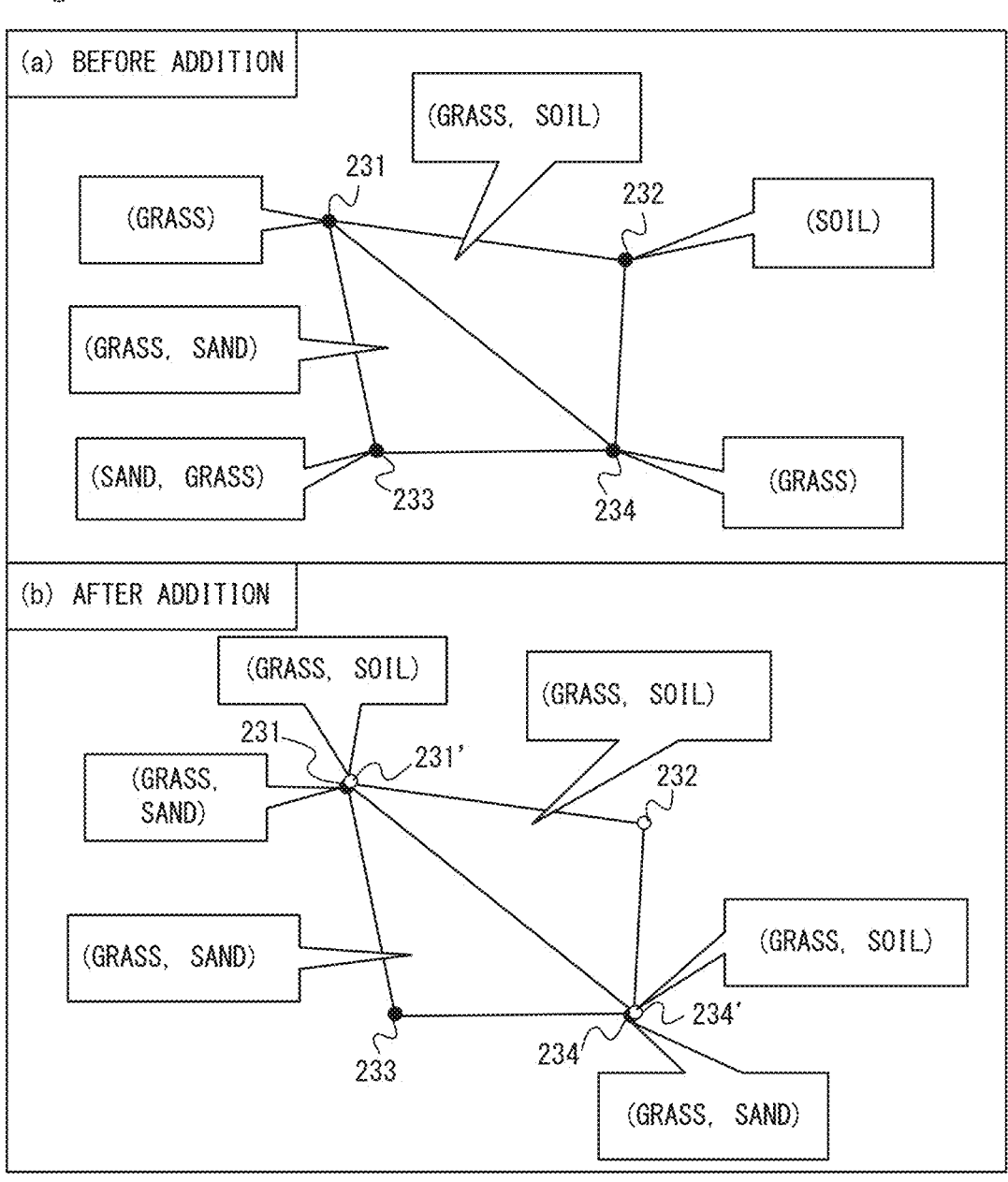
FIG. 22 is a view showing an example of materials set for vertices of adjacent two polygons.

FIG. 22 shows an example of materials set for vertices of adjacent two polygons. FIG. 22 shows a state in which two polygons are formed by the vertices 231 to 234 shown in FIG. 20 ((b) of FIG. 20). In the example shown in FIG. 22, since grass and sand are determined as materials of a first polygon formed by the vertices 231, 233, and 234, the first and second materials of these vertices should be set to grass and sand, respectively. Meanwhile, since grass and soil are determined as materials of a second polygon formed by the vertices 231, 232, and 234, the first and second materials of these vertices should be set to grass and soil, respectively. Therefore, in the example shown in FIG. 22, as for the vertices 231 and 234 shared by the two polygons, inconsistency occurs in the materials to be set.

In the exemplary embodiment, when inconsistency occurs in material to be set for a vertex shared by two polygons, the game system 1 adds another vertex at the position of the vertex. In FIG. 22, (b) shows an example of a state in which a vertex 231' is added for the vertex 231 and a vertex 234' is added for the vertex 234. In the example shown in FIG. 22, the game system 1 sets, for the vertices 231 and 234, grass and sand as the first and second materials according to the materials of the first polygon. In addition, the game system 1 sets, for the vertices 231' and 234', grass and soil as the first and second materials according to the materials of the second polygon. By formally setting two vertices as vertices to be shared by two polygons (e.g., by generating data of two vertices located at the same position and having different materials), it is possible to inhibit occurrence of inconsistency in materials to be set for the vertices.

The game system 1 generates a display mesh composed of the polygons whose vertices and materials are determined as described above. In addition, the game system 1 renders the polygons, based on information on the materials set for the vertices (e.g., the first material and the second material), thereby rendering a voxel object.

Figure 23:
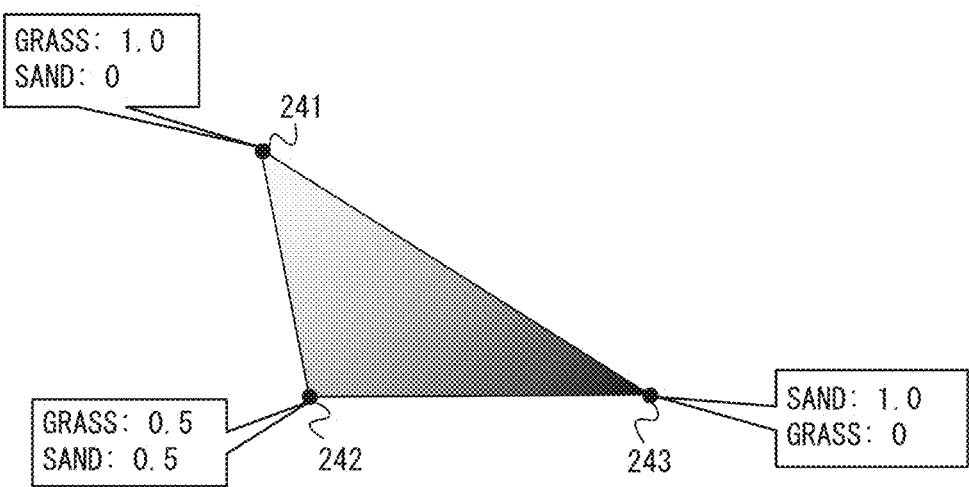
FIG. 23 is a view showing an example of application of textures to polygons.

FIG. 23 shows an example of applying a texture to a polygon. FIG. 23 shows a triangular polygon formed by the vertices 241 to 243 shown in FIG. 21. The materials set for the vertices 241 to 243 are those shown in (b) of FIG. 21.

As for the position of a vertex of a polygon, rendering is performed by a mapping in which a texture of a first material set for the vertex and a texture of a second material set for the vertex are blended at a ratio of the materials set for the vertex (e.g., using this ratio as a blending ratio). The textures of the first and second materials used for the rendering are textures indicated by information on rendering setting associated with the material ID that is associated with data of the vertex in the aforementioned material data (see FIG. 12). In the example shown in FIG. 23, as for the position of the vertex 241, since the material ratio of grass to sand is 1:0, rendering is performed by using only the texture of grass. As for the position of the vertex 243, since the first material is sand and the material ratio of sand to grass is 1:0, rendering is performed by using only the texture of sand. As for the position of the vertex 242, since the first material is grass, the second material is sand, and the material ratio of grass to sand is 0.5:0.5, rendering is performed such that the texture of grass and the texture of sand are blended at a blending ratio of 0.5:0.5.

As for positions other than the vertices of the polygon, the game system 1 determines a blending ratio by interpolating the blending ratios at the vertices. Then, rendering is performed by a mapping in which the textures of two materials set for each vertex are blended at the interpolated blending ratio. The specific method for interpolation is discretionary. As an example, a blending ratio between vertices is subjected to linear interpolation. In FIG. 23, a position at which the texture of grass material is applied at a high ratio is shown in white, and a position at which the texture of sand material is applied at a high ratio is shown in black. In the example shown in FIG. 23, the texture of grass is applied to the vertex 241, and the blending ratio of the texture of sand increases toward the vertex 243. At the position of the vertex 242, the blending ratio of grass to sand becomes 1:1, and only the texture of sand is applied at the position of the vertex 243. Thus, rendering is performed with the two textures set for the polygon (e.g., set for the vertices of the polygon) being blended with the blending ratio according to the material ratio, whereby the appearance at the boundary between different materials can be made natural in the display mesh. This makes the appearance of the display mesh, in which a plurality of types of materials are set, natural.

[2-6-2. Determination of Material of Determination Mesh]

Next, an example of a method for determining materials of a determination mesh will be described. As will be described in detail below, in the exemplary embodiment, there may be a case where collision determination is performed for a voxel object by using a determination mesh, and processing is performed according to a material of a voxel object for which a collision has been determined. Therefore, in the exemplary embodiment, materials are determined also for the determination mesh.

In the exemplary embodiment, the game system 1 sets polygons corresponding to the polygonal shapes forming the determination mesh such that one type of material is set for one polygon. Specifically, the game system 1 determines a material to be set for a polygon of the determination mesh, based on information on materials set for vertices of this polygon (e.g., information on first and second materials, and a material ratio).

Figure 24:
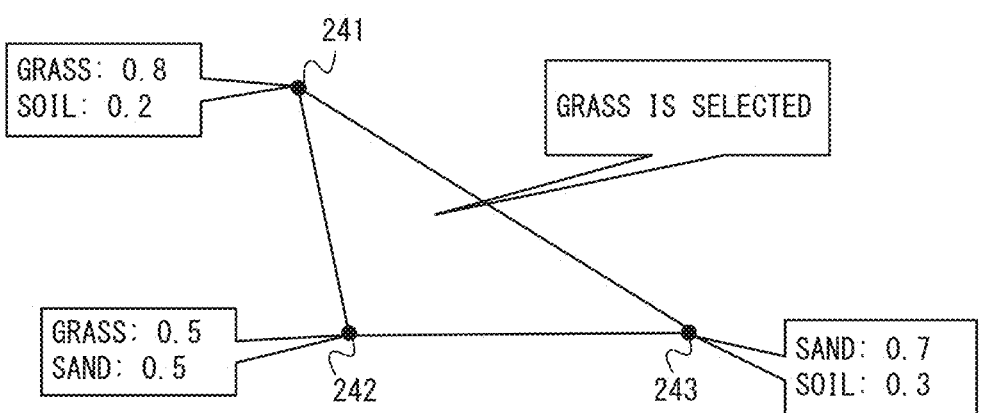
FIG. 24 is a view showing an example of a method for determining materials of polygons forming a determination mesh.

FIG. 24 shows an example of a method for determining a material of a polygon forming the determination mesh. FIG. 24 shows an example of determining a material for a triangular polygon formed by the vertices 241 to 243 shown in FIG. 21. The materials set for the vertices 241 to 243 are those shown in (a) of FIG. 21.

In determining a material of a polygon, the game system 1 calculates a determination value for each of materials set for the vertices of the polygon. In the exemplary embodiment, a calculation method for the determination value is identical to the calculation method for the determination value that is used for selection of the materials to be set for the polygonal shapes of the display mesh. The specific calculation method for the determination value is discretionary. In other embodiments, the determination value may be calculated in any method based on information set for the vertices of the polygon of the determination mesh.

In the example shown in FIG. 24, the determination value for each material is 1.3 for the grass material, 1.2 for the sand material, and 0.5 for the soil material as in the case shown in FIG. 21. Therefore, the grass material is selected as a material of the polygon shown in FIG. 24.

As described above, in the exemplary embodiment, the game system 1 selects, for each polygon, at most a predetermined number of (one in this embodiment) material IDs from among the material IDs set for the vertices included in the polygon (e.g., material IDs set for the vertices of the polygonal shape corresponding to the polygon), and determines the selected material ID as a material ID of the polygon. This allows the game system 1 to reduce the number of materials to be set for the determination mesh to the predetermined number or less. Thus, processing based on the material type, which is performed according to the result of collision determination using the determination mesh, is prevented from being complicated. The method for determining a material of a polygon of the determination mesh is discretionary, and is not limited to the above method. In other embodiments, a material of a polygon of the determination mesh may be determined by any method based on information set for the vertices of the polygon.

In the exemplary embodiment, one type of material is set for a polygon of the determination mesh while at most two types of materials are set for a polygon of the display mesh. Therefore, natural appearance can be achieved for the polygon of the display mesh by using two types of textures. In addition, as for the determination mesh, a process to be performed according to the result of collision determination using the determination mesh can be prevented from being complicated. In other embodiments, the types of materials settable for polygons of the display mesh and the determination mesh are discretionary. The number of materials settable for a polygon of the display mesh and the number of materials settable for a polygon of the determination mesh each may be plural, and may be the same or different from each other.

In the exemplary embodiment, the number of types of materials to be set for one voxel is two at most, and the number of types of materials to be set for one polygon in the display mesh is two at most. Thus, information on materials set in the voxel data can be used for (e.g., reflected in) the materials of the display mesh while reducing the data amount of the voxel data. Moreover, in the exemplary embodiment, the number of types of materials to be set for vertices based on the voxel data is also two at most (see FIG. 16). In this case, since two types of materials can be set also for vertices that are generated during the process to obtain the display mesh from the voxel data, the information on materials set in the voxel data used for (e.g., reflected in) the display mesh, without missing the information on materials during the process.

In other embodiments, the game system 1 may set materials such that, regarding vertices to be set based on the voxel data, materials set for vertices to be used for generation of the display mesh are different from materials set for vertices to be used for generation of the determination mesh. For example, the game system 1 may set at most two types of materials as described above for the vertices to be used for generation of the display mesh, and may set one type of material for the vertices to be used for generation of the determination mesh. Then, the game system 1 may set two types of materials as materials of a polygon of the display mesh, and may set one type of material as a material of a polygon of the determination mesh, based on one type of material that is set for each vertex of this polygon. In setting one type of material for the vertices to be used for generation of the determination mesh, a material having the greatest determination value, among the determination values calculated for each material, may be set as a material of the vertices. Also in this case, as in the exemplary embodiment, the number of types of materials to be set for one polygon in the display mesh may be two at most, and the number of types of materials to be set for one polygon in the determination mesh may be one. Therefore, the information on materials set in the voxel data can be used for (e.g., reflected in) the display mesh, and the process to be performed according to the result of collision determination using the determination mesh is prevented from being complicated.

As described above, in the exemplary embodiment, a display mesh and a determination mesh are set for one voxel object. However, depending on the game situation, both the display mesh and the determination mesh may not necessarily be set for one voxel object at the same time (e.g., both the meshes may not necessarily be set in processing one frame). For example, in the game space, the determination mesh may be generated in a range where collision determination is performed, and may not necessarily be generated in a range where collision determination is not performed. As an example, the game system 1 may generate the determination mesh for voxel objects within a predetermined range around the player character. For voxel objects outside the predetermined range, the game system 1 may generate only the display mesh without generating the determination mesh.

As for the display mesh, the game system 1 may store data regarding the generated mesh in a memory. In frames after generation of the mesh, the game system 1 may use the stored data without executing the mesh generating process again, except for a range where an update is performed. This can decrease the processing load for generating the display mesh. Meanwhile, as for the determination mesh, the game system 1 may not necessarily store data regarding the generated mesh in the memory, and may generate a mesh on an as-needed basis (e.g., each time collision determination is required). This saves memory use for generation of the mesh.

The method for, when voxel data has been changed from its initial state, generating meshes (e.g., a display mesh and a determination mesh) based on the changed voxel data, has been described above. This method can also be used for a case where the meshes are generated based on the voxel data in the initial state when a game is started, for example. However, the meshes based on the voxel data in the initial state may not necessarily be generated based on the voxel data in the initial state when the game is started, and may be prepared in advance of starting the game.

[2-7. Processing Using Mesh]

Next, an example of processing using a mesh generated for a voxel object as described above will be described. Hereinafter, a description will be given of a case where a terrain object such as the ground or a wall is a voxel object, a player character performs an action, and an in-game behavior is generated as a result of collision determination.

Figure 25:
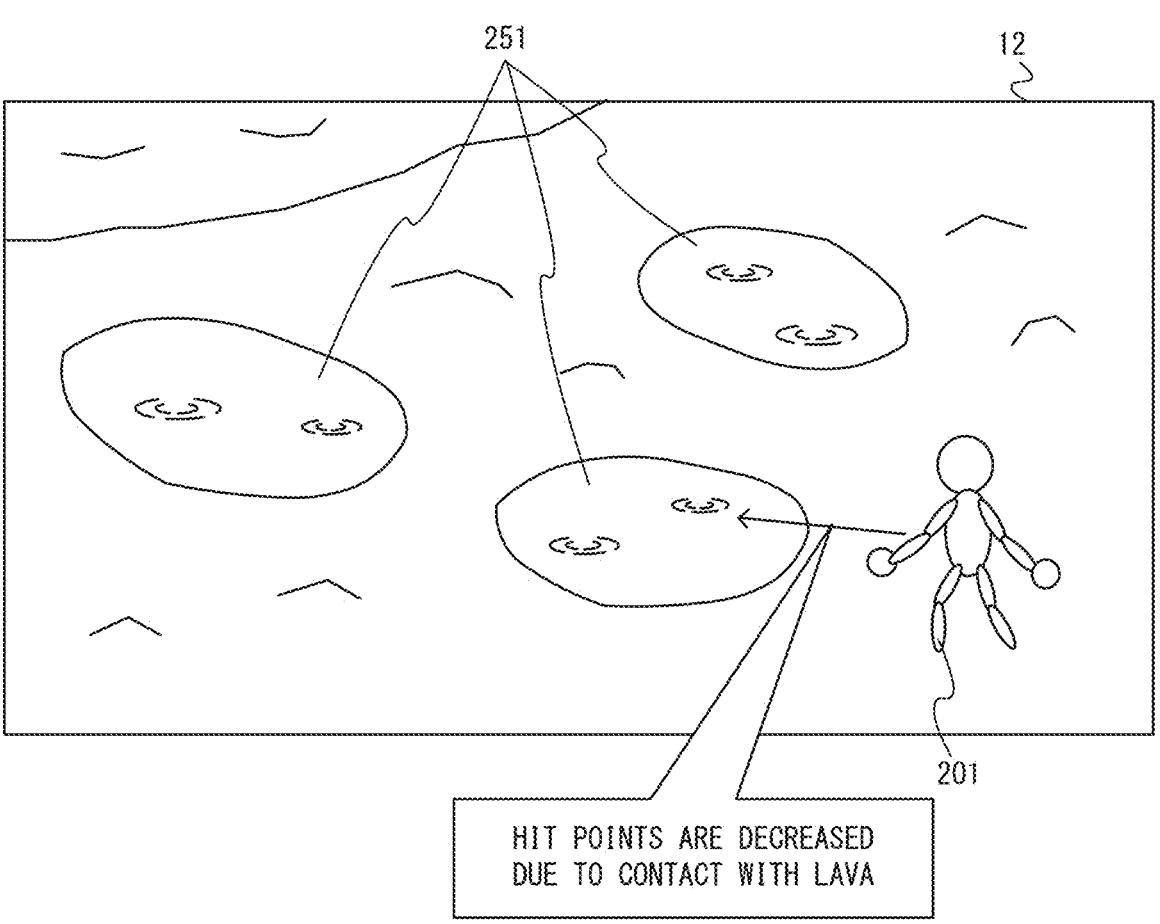
FIG. 25 is a view showing an example of a game image representing a state in which a player character moves on a terrain object.

FIG. 25 shows an example of a game image representing a state in which a player character moves on a terrain object. In the example shown in FIG. 25, a material of polygons in partial regions 251 in a determination mesh of the terrain object being the ground is set to "lava". Meanwhile, a material of polygons other than those in the regions 251 in the determination mesh of the terrain object is set to "rock". In the example shown in FIG. 25, the game system 1 performs collision determination between the terrain object and the player character 201 by using the determination mesh. That is, the game system 1 performs collision determination as to whether or not the determination mesh of the terrain object comes into contact with a determination region set for the player character (e.g., a region having a predetermined shape that is set based on the position of the player character). When a collision between the polygon whose material is lava and the player character 201 has been determined, a process of reducing the hit points of the player character 201 is performed as a process of generating an in-game behavior. Moreover, in the above case, a process of causing the player character 201 to perform a predetermined reaction is performed.

In the exemplary embodiment, regarding the lava material, a property of reducing the hit points of the player character that has come into contact with the material (e.g., a property of having a temperature equal to or higher than a predetermined value) is set as property information included in the aforementioned material data. The game system 1 generates an in-game behavior (in the above example, reduction in the hit points of the player character) based on the property information corresponding to the material set for the polygon in the determination mesh for which a collision has been determined through the collision determination.

When a collision between a polygon whose material is rock and the player character 201 has been determined, the process of reducing the hit points of the player character is not performed. Based on the collision, the player character 201 is controlled so as not to be able to enter the polygon. Therefore, the player character can stand and walk on the polygon. Thus, in the exemplary embodiment, by setting a material for each polygon, the game system 1 can perform different processes depending on which part of the voxel object another object has come into contact with. In addition, the content of a process to be performed can be matched to the type of the material. In the exemplary embodiment, the player character can change the terrain object (e.g., deform the terrain object, or change the material of the terrain object), and therefore, for example, can delete the lava part of the terrain object, or change the lava to another material. Therefore, by changing the terrain object, the player can avoid a reduction in the hit points of the player character due to contact with the lava.

The content of the process to be performed when a collision between the voxel object and another object has been determined, is discretionary. For example, if the other object is a moving object such as the player character or an enemy character, the process may be a process of outputting the sound of footsteps of the object, or displaying an effect (e.g., effect of representing dust or splash of water) on the contact part. In this case, the game system 1 can change the sound of footsteps or the effect according to the type of the material set for the polygon, in the contact part, of the voxel object.

Figure 26:
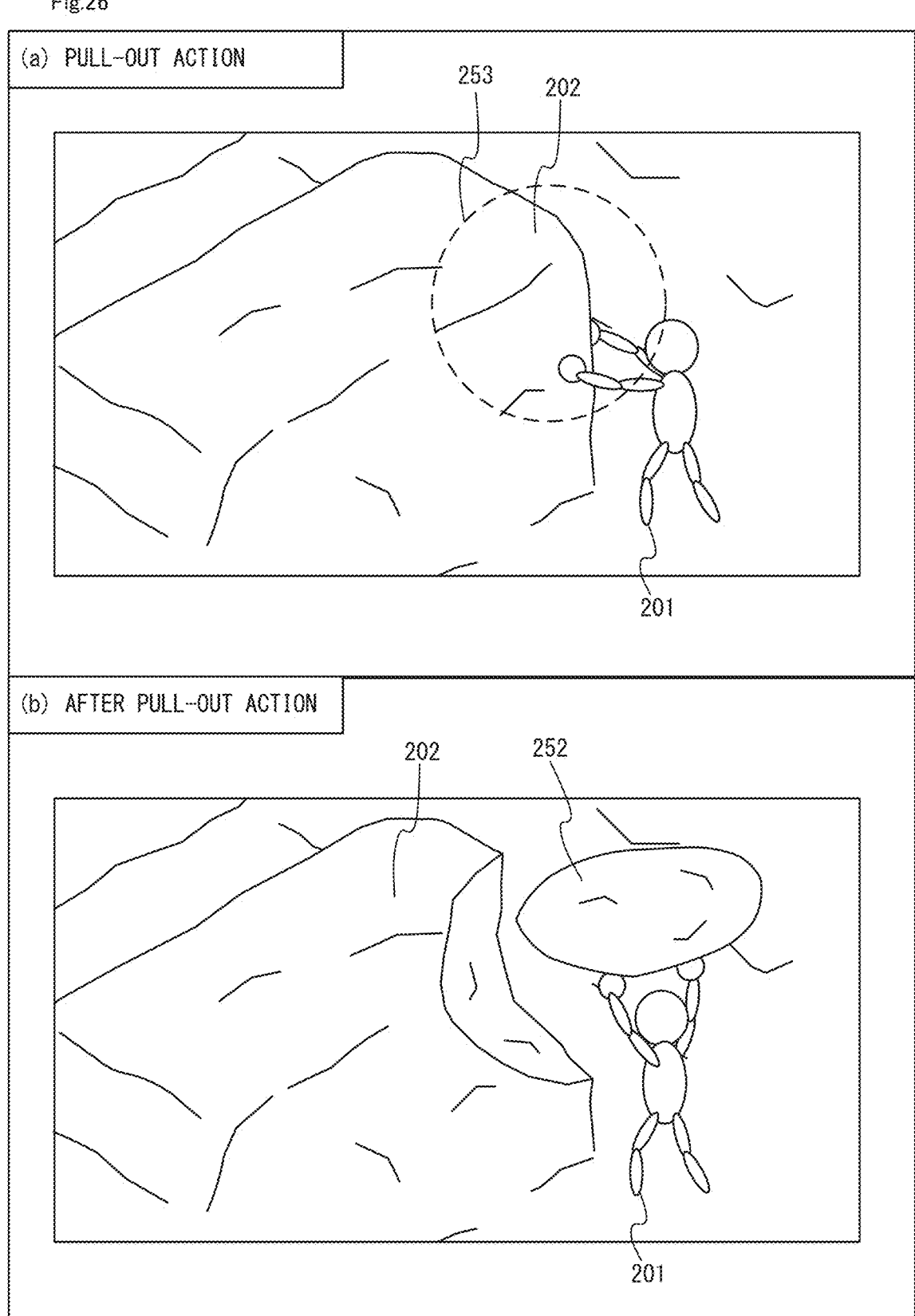
FIG. 26 is a view showing an example of a game image representing a state in which the player character pulls out a fragment object from the terrain object.

FIG. 26 shows an example of a game image representing a state in which the player character pulls out a fragment object from the terrain object. As shown in FIG. 26, in the exemplary embodiment, the player, through a predetermined operation input, can cause the player character 201 to perform an action of holding the terrain object 202, pulling out a part of the terrain object 202 as a fragment object 252, and grasping the fragment object 252 (hereinafter referred to as "pull-out action"). The game system 1 deletes the part of the terrain object 202 and generates the fragment object 252 as an in-game behavior caused by the pull-out action.

In performing the pull-out action, specifically, the game system 1 executes the following process. That is, when an operation input that causes the player character to perform the pull-out action has been performed by the player, the game system 1 causes the player character to perform an action of digging forward and holding, and performs collision determination. Then, when a collision between the player character performing the pull-out action and the terrain object has been determined, the game system 1 generates an update range 253 based on the position and direction of the player character. For example, the update range 253 is generated in a predetermined direction (e.g., forward) with reference to the player character. The shape and size of the update range may be determined in advance according to the type of the action of the player character. Furthermore, the game system 1 decreases the densities of voxels corresponding to the update range 253. Then, update of the mesh according to the decrease in densities of the voxels causes the terrain object 202 to be deformed such that the part inside the update range 253 is deleted (see (b) of FIG. 26). In the exemplary embodiment, the densities of the voxels corresponding to the update range 253 are decreased.

However, voxels whose densities are to be decreased may be at least part of the voxels corresponding to the update range 253.

In the exemplary embodiment, the voxel object corresponding to the update range 253 is unconditionally deformed due to the pull-out action. In other embodiments, the voxel object corresponding to the update range 253 may be deformed on the condition of the amount of damage set for the voxels. For example, instead of unconditionally deforming the voxel object corresponding to the update range 253, the game system 1 may increase the amount of damage set for the voxels corresponding to the update range 253, and decrease the densities of the voxels in response to the amount of damage having exceeded a predetermined value. In this case, the amount of increase in the damage may be determined according to the action performed to the voxel object.

The game system 1 generates the fragment object 252 representing the deleted part of the terrain object 202. That is, based on the pull-out action, the game system 1 generates the fragment object 252 in the state of being held by the player character. The fragment object 252 may be generated so as to have a shape corresponding to the deleted part of the terrain object 202, or a predetermined shape. The fragment object 252 may or may not be a voxel object. When the fragment object is a voxel object, a voxel space different from the voxel space of the voxels corresponding to the terrain object 202 or the like is defined for the fragment object 252.

The game system 1 determines a material of the fragment object 252. The material of the fragment object 252 is determined based on materials set for polygons in a determination mesh that comes into contact with the update range 253 among determination meshes of the terrain object 202. The material of the fragment object 252 is determined to be the same as at least one of the materials set for the polygons in the determination mesh that comes into contact with the update range 253. Thus, the material of the fragment object 252 can be made identical to the material of the deleted part of the terrain object. As is apparent from the above description, the fragment object 252 is actually not a part of the terrain object. However, since the fragment object 252 is generated simultaneously with deletion of a part of the terrain object and takes over the material of the deleted part of the terrain object, an impression that the player character 201 takes out a part of the terrain object 202 by a pull-out action can be given to the player.

In the exemplary embodiment, priorities are set for the types of materials prepared, and the game system 1 determines, as a material of the fragment object 252, a material having the highest priority among the materials set for the polygons of the determination mesh in the update range 253. Here, for example, a case where the determination mesh in the update range 253 includes a polygon whose material is rock and a polygon whose material is lava, is considered. In this case, if the material of the fragment object 252 is set to lava, there is a possibility of inconvenience that the hit points of the player character are reduced because the player character holds the fragment object 252 through the pull-out action (as described with reference to FIG. 25, the lava material has the property of reducing the hit points of the player character if the player character comes into contact with it). Furthermore, as described above, if the determination mesh in the update range 253 includes polygons for which different types of materials are set, it is difficult for the player to predict a material of the fragment object 252, and the above inconvenience may occur against the player's will. Meanwhile, in the exemplary embodiment, since the priorities are given to the materials to be set as a material of the fragment object, the risk of the above inconvenience can be reduced.

Figure 27:
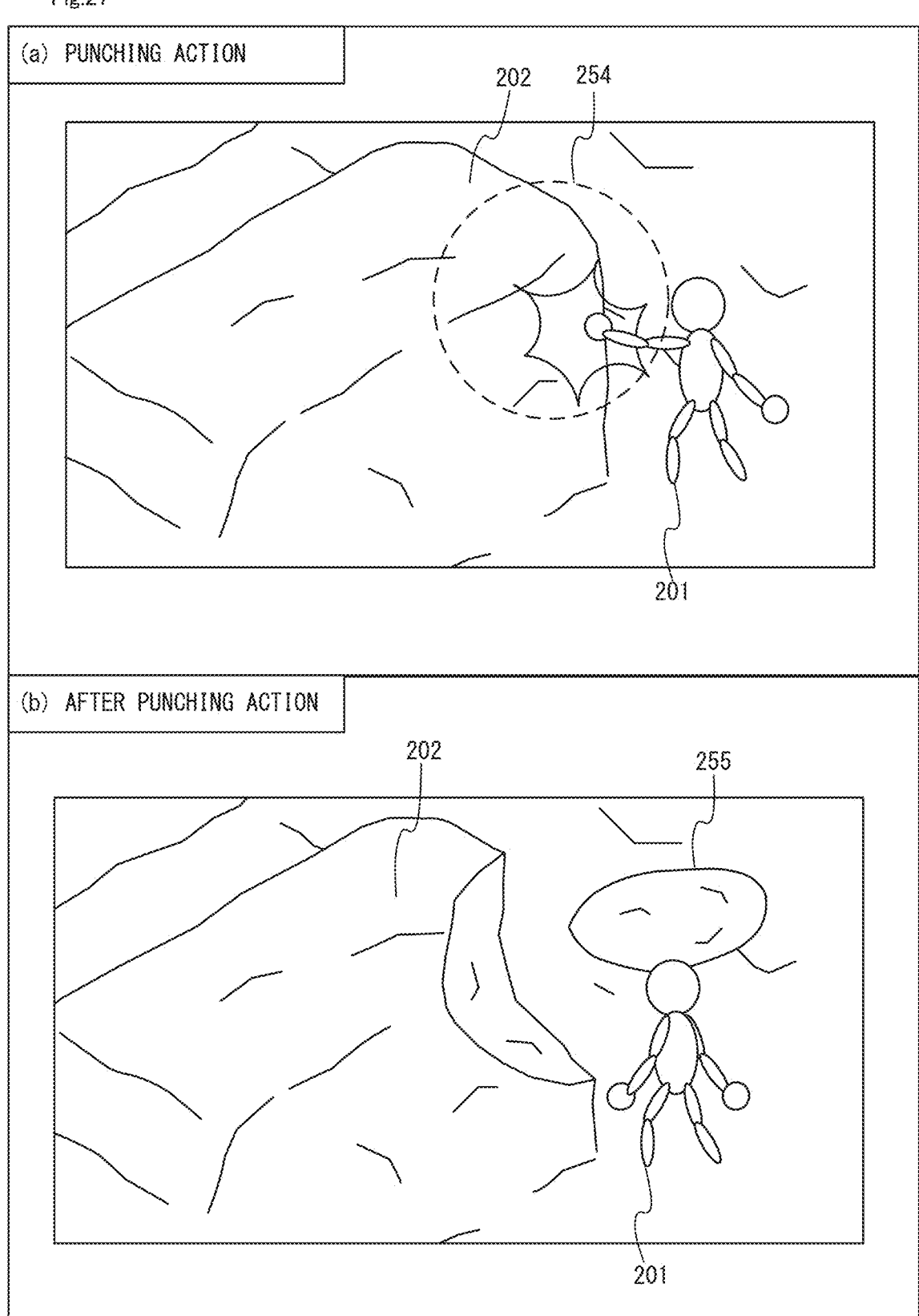
FIG. 27 is a view showing an example of a game image representing a state in which a fragment object is generated because the player character has destroyed the terrain object.

FIG. 27 shows an example of a game image representing a state in which a fragment object is generated because the player character has destroyed the terrain object. As shown in FIG. 27, in the exemplary embodiment, the player, through a predetermined operation input, can cause the player character 201 to perform a punching action. As in the case of the aforementioned pull-out action, the game system 1 deletes a part of the terrain object 202 and generates a fragment object 255, as an in-game behavior caused by the punching action. Specifically, the game system 1 deforms the terrain object 202 such that a part of the terrain object 202 is deleted. In the case of the punching action, unlike the aforementioned pull-out action, the fragment object 255 is not held by the player character 201 but is disposed near the position where the punching action has been performed (see (b) of FIG. 27). Such a fragment according to destruction of the terrain object 202 may not necessarily be generated.

In performing the punching action, specifically, the game system 1 executes the following process. That is, when an operation input to cause the player character to perform the punching action has been performed by the player, the game system 1 causes the player character to perform an action of punching forward, and performs collision determination. Then, when a collision between the player character performing the punching action and the terrain object has been determined, the game system 1 generates an update range 254 based on the position and direction of the player character. For example, the update range 254 is generated in a predetermined direction (e.g., forward) with reference to the player character. The position, shape, and size of the update range 254 due to the punching action may be the same as or different from those of the update range 253 due to the pull-out action. Then, the game system 1 decreases the densities of voxels corresponding to the update range 254. Thus, the terrain object 202 is deformed such that the part inside the update range 254 is deleted by the punching action, similarly to the pull-out action (see (b) of FIG. 27). In the case of the punching action, as in the case of the pull-out action, instead of unconditionally deforming the voxel object corresponding to the update range 254, the game system 1 may increase the amount of damage set for the voxels in the update range 254 according to the punching action, and decrease the densities of the voxels in response to the amount of damage having exceeded a predetermined value. In addition, the voxels whose densities are to be decreased by the punching action may be at least part of the voxels corresponding to the update range 254.

The game system 1 generates a fragment object 255 corresponding to the deleted part of the terrain object 202. That is, based on the punching action, the game system 1 generates the fragment object 255 in the state of not being held by the player character (e.g., in the state of being disposed near the position where the punching action has been performed). The fragment object 255 may be generated so as to have a shape corresponding to the deleted part of the terrain object 202, or a predetermined shape. The fragment object 255 may or may not be a voxel object.

The game system 1 determines a material of the fragment object 255. The material of the fragment object 255 is determined based on materials set for polygons in a determination mesh that comes into contact with the update range 254 among the determination meshes in the terrain object 202. The material of the fragment object 255 is determined to be the same as at least one of the materials set for the polygons in the determination mesh that comes into contact with the update range 254. Thus, the material of the fragment object 255 can be made identical to the material of the deleted part of the terrain object. Since the fragment object 255 is generated simultaneously with deletion of a part of the terrain object and takes over the material of the deleted part of the terrain object, an impression that a part of the terrain object destroyed due to a punching action of the player character is generated as a fragment object can be given to the player.

In the exemplary embodiment, the material of the fragment object 255 is set to a material having the greatest degree of decrease in voxel density among the materials set for the polygons in the determination mesh that comes into contact with the update range 254. This allows generation of a fragment object in which the material composition of the part, of the terrain object, deleted due to the punching action is more accurately shown (e.g., reflected).

The method for determining a material of a fragment object to be generated due to the pull-out action or the punching action is discretionary. For example, the method for determining a material of a fragment object may be the same between the pull-out action and the punching action. Moreover, for example, among the materials set for the polygons of the determination mesh in the update range, a material that is set for the largest number of polygons may be determined as a material of the fragment object. Alternatively, for example, a material that is set for a polygon satisfying a predetermined condition (e.g., a polygon in a position that comes into contact with a hand of the player character performing the pull-out action or the punching action) among the polygons of the determination mesh in the update range, may be determined as a material of the fragment object. In other embodiments, a plurality of types of materials may be set for the fragment object.

In the exemplary embodiment, the player can cause the player character to perform an action of throwing the fragment object 252 or 255 generated as described above (hereinafter referred to as "throwing action"). The player, through a predetermined operation input, can cause the player character to perform an action of holding a fragment object that is generated according to the punching action and placed on the ground. The pull-out action or the action of holding the fragment object after the punching action causes the player character to be in the state of holding the fragment object. In this state, the game system 1 causes the player character to perform an action of throwing the fragment object in a predetermined direction, as the throwing action according to the operation input performed by the player.

Figure 28:
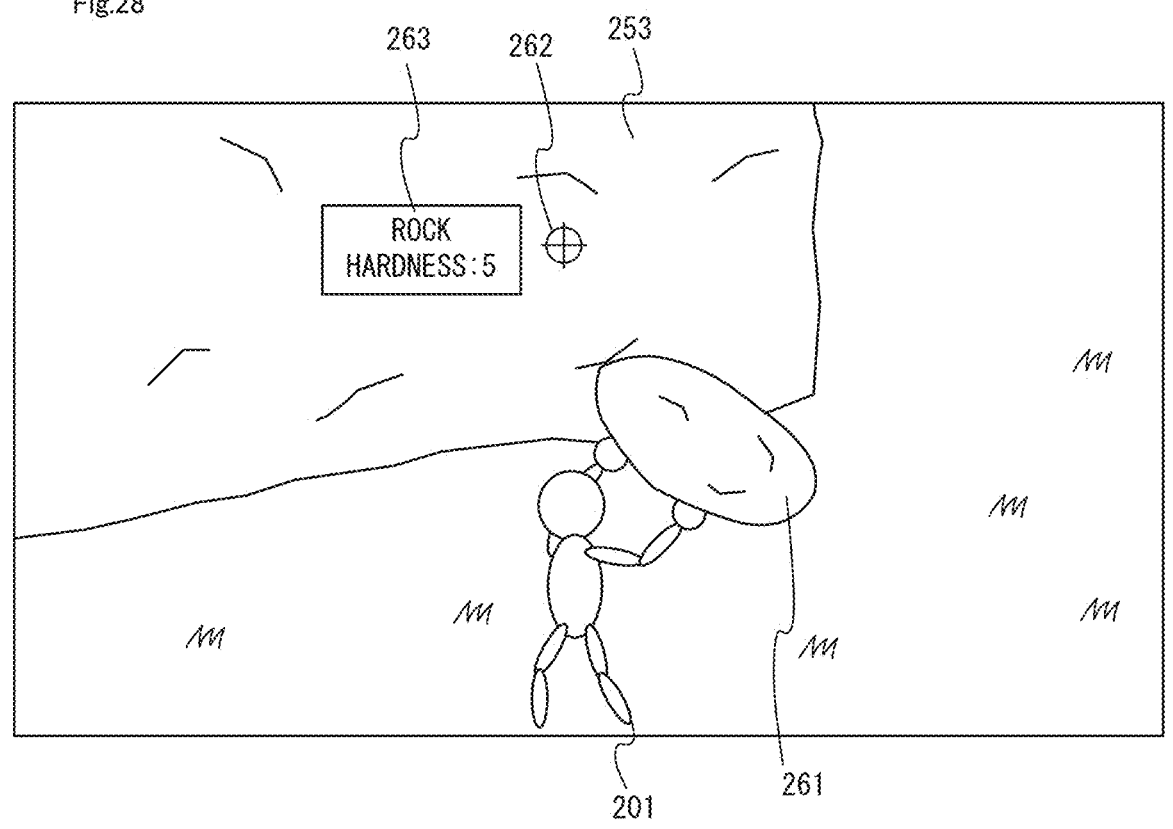
FIG. 28 is a view showing an example of a game image in a state where the player character can perform a throwing action.

FIG. 28 shows an example of a game image of a scene in which a throwing direction is determined while the player character takes a throwing posture, in the state where a throwing action by the player character is possible. As shown in FIG. 28, in the state where the player character 201 is holding a fragment object 261, the player character 201 can perform a throwing action. In this state, as shown in FIG. 28, the game system 1 displays an aim image 262 (e.g., a reticle) and an object information image 263 on the image showing the game space, as a process of generating an in-game behavior.

The aim image 262 indicates a direction (or aim direction) in which the fragment object is thrown due to the throwing action. That is, in response to an operation input performed by the player for the throwing action, the game system 1 moves the fragment object 261 from the position of the player character 201 toward a position, in the virtual space, indicated by the aim image 262. The aim direction is controlled based on an operation input performed by the player. For example, the game system 1 may change the aim direction in response to an operation input for changing the direction of a virtual camera. Specifically, the game system 1 may control the virtual camera according to the operation input such that the virtual camera rotates and moves around the player character while maintaining a state in which the player character is within a field-of-view range, and may control the aim direction to be a direction according to the field-of-view direction of the virtual camera. In this case, the aim image 262 pointing a position where a terrain object 253 intersects a straight line extending in the aim direction from the position of the player character, is displayed. Specifically, the game system 1 performs collision determination between the aim direction (e.g., the straight line extending in the aim direction) and the determination mesh of the terrain object 253, and displays the aim image 262 when a collision has been determined. The aim image 262 is arranged so as to point the position of a polygon, in the determination mesh, which intersects the straight line extending in the aim direction.

The aim image 262 allows the position at which the fragment object comes into contact with the voxel object due to the throwing action of the player character to be presented to the player. This allows the player to easily perform the operation for the throwing action. The specific control method for the aim direction and the aim image 262 is discretionary, and a conventional method may be used. For example, in other embodiments, in the state where the aim image 262 is displayed, the aim image 262 may be displayed in a game image in a first-person viewpoint in which the player character is not displayed.

In the state where the player character takes a posture to throw the fragment object, an action of throwing the fragment object to the aim direction is performed in response to a predetermined operation input performed by the player.

The object information image 263 indicates information regarding the terrain object 253 at the position pointed by the aim image 262. In the exemplary embodiment, the object information image 263 indicates the name of the material ("rock" in the example shown in FIG. 28) set for the polygon of the determination mesh at the position pointed by the aim image 262. Thus, the material of the voxel object with which the fragment object thrown by the throwing action comes into contact can be presented to the player. In addition, the object information image 263 indicates information regarding the property (here, hardness) of the material. Thus, the property of the voxel object with which the fragment object thrown by the throwing action comes into contact can be presented to the player. The object information image 263 may have any content. For example, in other embodiments, the object information image 263 may indicate any property regarding the material that is set for the polygon at the position pointed by the aim image 262, or may indicate the state of the polygon (e.g., the amount of damage described above). In the exemplary embodiment, since one type of material is set for the polygon of the determination mesh, the material corresponding to the aim position is specified to one material. This is suitable for displaying the information regarding the material.

Figure 29:
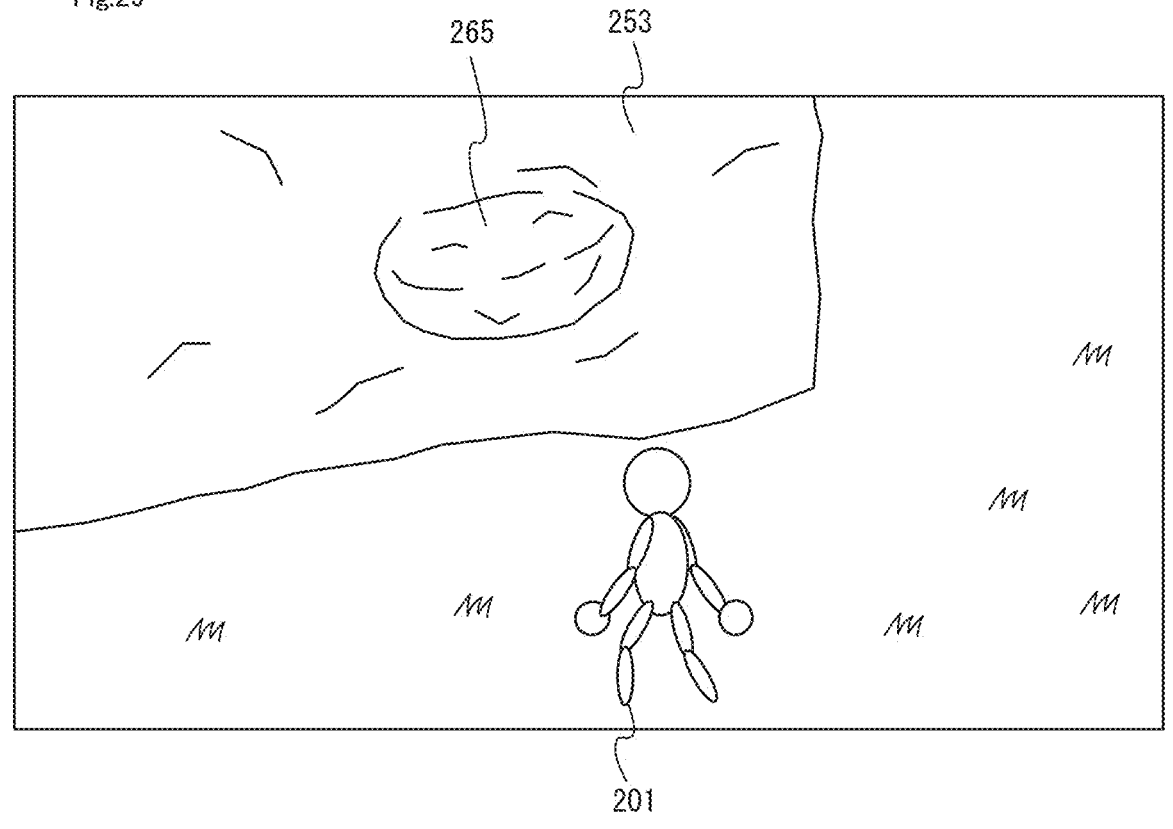
FIG. 29 is a view showing an example of a game image after a change is added to the terrain object because a fragment object has come into contact with the terrain object shown in FIG. 28.

In the exemplary embodiment, in response to the result of the collision determination indicating that the fragment object thrown by the throwing action has come into contact with the voxel object, the game system 1 adds a change to the voxel object as an in-game behavior. FIG. 29 shows an example of a game image after a change is added to the terrain object 253 because the fragment object 261 has come into contact with the terrain object 253 shown in FIG. 28. In the example shown in FIG. 29, the terrain object 253 is deformed such that the fragment object is attached to the contact position between the fragment object and the terrain object 253. Specifically, the game system 1 generates an update range that includes the contact position, and increases the densities of voxels in the update range to deform the terrain object 253 to the aforementioned shape. For example, the update range may be set to a shape corresponding to the shape of the fragment object, and the terrain object 253 may be deformed such that the update range is inside the terrain object 253. As described above, in the example shown in FIG. 29, an additional part 265 is added to the terrain object before deformation. In the example shown in FIG. 29, the fragment object is deleted in response to that it comes into contact with the terrain object 253.

A material of a polygon in the additional part 265 is determined based on the material of the fragment object that has come into contact with the terrain object 253. Specifically, the game system 1 sets the material of voxels in the update range to be the material of the fragment object. Then, materials of the display mesh and the determination mesh are determined based on the material of the voxels. In this case, since the appearance of the attached additional part 265 can be made identical to the appearance of the fragment object, an impression that the fragment object is attached to the terrain object 253 (although the terrain object 253 is deformed in actuality) can be more easily given to the player.

In the example shown in FIG. 29, the change added to the voxel object in response to contact of the fragment object with the voxel object is deformation to add the additional part to the voxel object. However, the change to be added to the voxel object is not limited thereto. The change may be a change in voxel density, or a change in material. For example, if the fragment object has a property of explosion, the fragment object may be exploded in response to contact with the voxel object, and in this case, the voxel object may be deformed as if a part of the voxel object is deleted. Specifically, the game system 1 sets an update range so as to include the contact position, and decreases the voxel density in the update range. In addition, for example, when the material of the voxel object is lava and the material of the fragment object is ice, the material of the voxel object may be changed in response to contact with the fragment object. Specifically, the game system 1 may set an update range including the contact position, and change the material being lava, among the materials of voxels in the update range, to obsidian or rock. This allows representation of a state in which the object of lava is cooled by the object of ice and turns into obsidian or rock.

The content of the change may be determined based on the material of the voxel object, the material of the fragment object, or a combination of the material of the voxel object and the material of the fragment object. This allows occurrence of various changes to the voxel object.

The game system 1 may determine whether or not to perform the above change, based on the material of the voxel object, the material of the fragment object, or a combination of the material of the voxel object and the material of the fragment object. For example, the game system 1 may perform the change as shown in FIG. 29 in the case where the fragment object whose material is rock comes into contact with the voxel object whose material is rock, and may not necessarily perform the change as shown in FIG. 29 when the fragment object whose material is rock comes into contact with the voxel object whose material is iron.

In the exemplary embodiment, one type of material is set for each of the polygons of the determination mesh and for the fragment object. If a plurality of types of materials are set for at least either the polygon of the determination mesh or the fragment object, it is difficult to determine the content of a change to be added to the voxel object according to the types of materials of the determination mesh and the fragment object when they come into contact with each other. Meanwhile, in the exemplary embodiment, since one type of material is set for each of the determination mesh and the fragment object that have been determined to be in contact with each other by the collision determination, it is easy to determine the content of a change to be added to the voxel object.

[3. Specific Example of Processing in Game System]

Next, a specific example of information processing in the game system 1 will be described with reference to FIG. 30 and FIG. 31.

Figure 30:
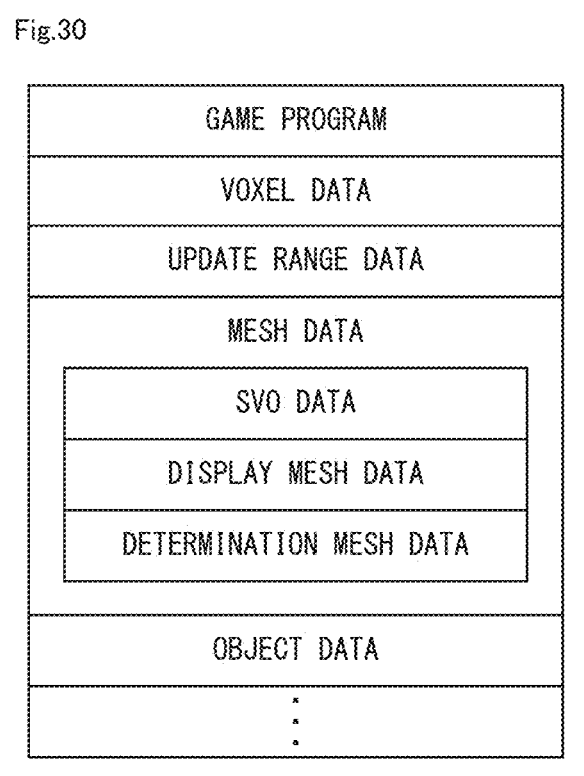

FIG. 30 shows an example of various data used for information processing in the game system 1. The data shown in FIG. 30 are stored in a memory (e.g., the flash memory 84, the DRAM 85, and/or a memory card attached to the slot 23) that is accessible by the main body apparatus 2. As shown in FIG. 30, the game system 1 stores a game program therein. The game program is a program for executing game processing (specifically, game processing shown in FIG. 31) in the exemplary embodiment. The game program includes the aforementioned material data (see FIG. 12). In the memory, the aforementioned voxel data (see FIG. 11), update range data, mesh data, object data, and the like (see FIG. 30).

The update range data is data indicating the aforementioned update range. In the exemplary embodiment, the update range is represented by the aforementioned SDF.

The mesh data includes various data regarding meshes of a voxel object. As shown in FIG. 30, in the exemplary embodiment, the mesh data includes SVO data, display mesh data, and determination mesh data. The SVO data is data in which vertices calculated from the voxel data are held by the aforementioned SVO structure. In the exemplary embodiment, the SVO data includes data indicating materials set for the vertices (e.g., data indicating IDs of the materials) in addition to data indicating the positions of the vertices. The display mesh data includes various data regarding a display mesh. Specifically, the display mesh data includes data indicating vertices of the display mesh, and data indicating materials set for the vertices (e.g., data indicating IDs of the materials). The determination mesh data includes various data regarding a determination mesh. Specifically, the determination mesh data includes data indicating vertices of the determination mesh, and data indicating materials set for the vertices (data indicating IDs of the materials).

The object data includes various data regarding objects (e.g., the player character, the fragment object, etc.) other than the voxel object. The object data is stored for each object that appears in the game space. The object data includes data indicating, for example, the position, speed, state, etc., of the object.

Figure 31:
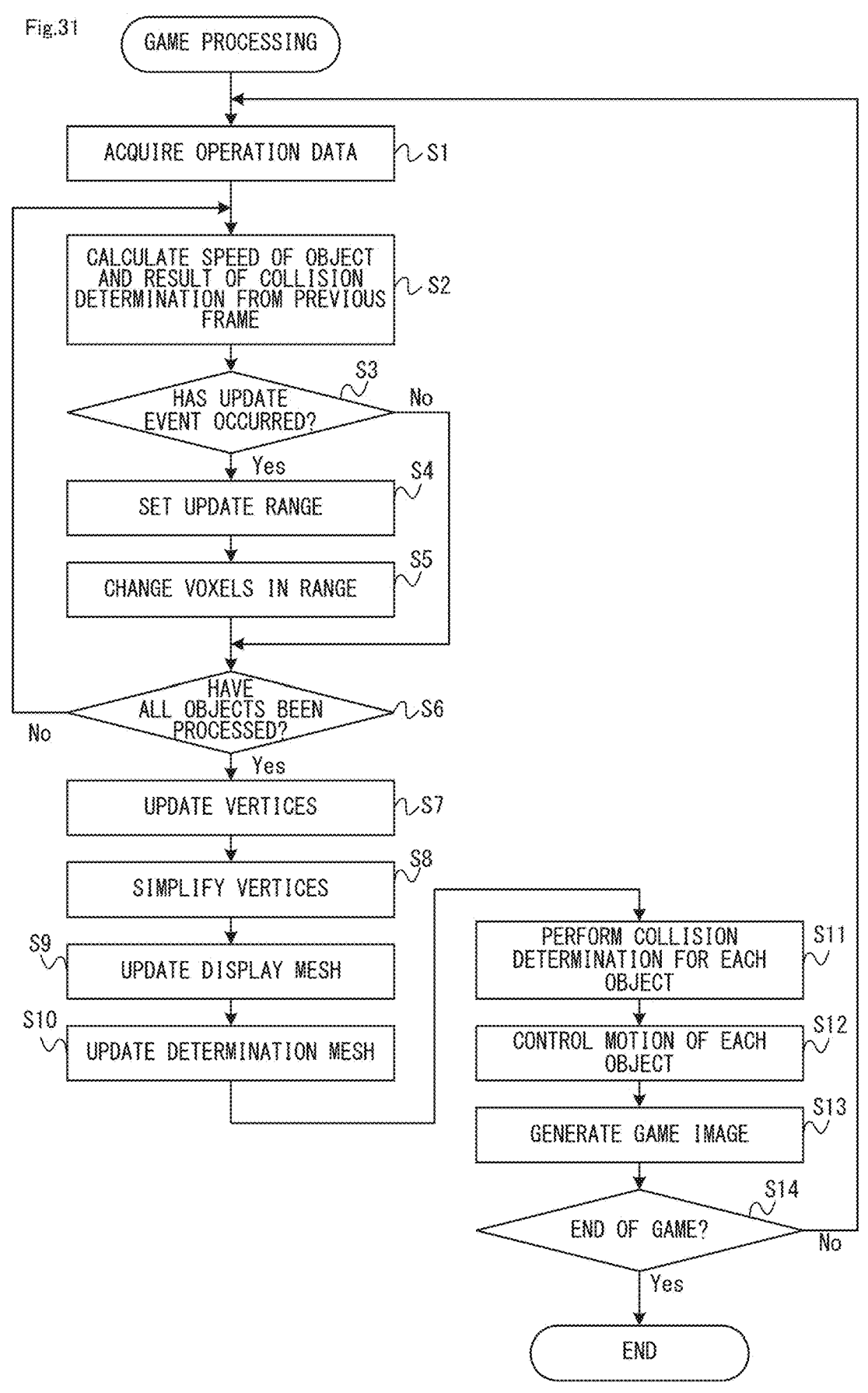
FIG. 31 is a flowchart showing an example of a flow of game processing executed by the non-limiting game system.

FIG. 31 is a flowchart showing an example of a flow of game processing executed by the game system 1. Execution of the game processing is started in response to the game having been started according to an instruction of the player, during execution of the game program, for example. A processing loop composed of a series of processes in steps S1 to S14 is performed in a cycle of once for each frame.

In the exemplary embodiment, the processor 81 of the main body apparatus 2 executes the game program stored in the game system 1 to execute processes in steps shown in FIG. 31. However, in other embodiments, a part of the processes in the steps may be executed by a processor (e.g., a dedicated circuit or the like) other than the processor 81. Further, if the game system 1 is communicable with another information processing apparatus (e.g., a server), a part of the processes in the steps shown in FIG. 31 may be executed by the other information processing apparatus. The processes in the steps shown in FIG. 31 are merely examples, and the processing order of the steps may be changed, or another process may be executed in addition to (or instead of) the processes in the steps as long as similar results can be obtained.

The processor 81 executes the processes in the steps shown in FIG. 31 by using a memory (e.g., the DRAM 85). That is, the processor 81 stores information (in other words, data) obtained in each process step, into the memory, and reads out the information from the memory when using the information for the subsequent process steps.

In step S1 shown in FIG. 31, the processor 81 acquires the operation data indicating an operation input performed by the player. That is, the processor 81 acquires the operation data received from the respective controllers via the controller communication section 83 and/or the terminals 17 and 21. Next to step S1, the process in step S2 is executed.

In step S2, the processor 81 designates, as a processing target, an object for which processing has not yet been completed among objects to be processed in the game space, and executes, for the designated object, a process of calculating a speed, and a process of providing (e.g., reflecting) a result of contact between objects in a previous frame. The speed of the object is used for calculating the position of the object in the current frame, in the process of step S12 described below. For example, if the designated object is a player character, the speed of the player character is calculated based on the operation data acquired in step S1. If the designated object is an object (e.g., a fragment object) that is not operated by the player, the speed of the object is calculated based on a rule prescribed in the game program. For example, the speed of the fragment object is set to 0 if the fragment object is disposed on the terrain object and does not move, is set to the same speed as the player character if the fragment object is held by the player character, and is set to a speed at which the fragment object moves in the aim direction with a size determined in the rule if the fragment object has been thrown by a throwing action of the player character. Specifically, the speed of the object is calculated based on a virtual physical calculation including interaction between objects. For example, repulsion due to collision between objects, interaction such as friction due to contact, falling due to virtual gravity, deceleration due to virtual air resistance, or the like is provided in determination of the speed.

The process of providing the result of contact between objects in the previous frame includes a process of, upon determining in the collision determination (step S11) that objects have come into contact with each other, giving an influence due to the contact, to the objects. Examples of this process are as follows.

A process of reducing the hit points of the player character upon determining that the player character has come into contact with the terrain object of lava in the previous frame.

A process of generating a fragment object upon determining that the player character has come into contact with the terrain object due to a pull-out action or a punching action in the previous frame.

A process of causing the fragment object to disappear upon determining that the fragment object has come into contact with the terrain object of rock.

When the state regarding an object has been changed in the process in step S2, the processor 81 updates the corresponding object data stored in the memory regarding the object such that the object data indicates the changed content. Next to step S2, the process in step S3 is executed.

In step S3, the processor 81 determines whether or not an update event that updates the voxel object has been caused by the object designated in step S2. For example, the determination in step S3 is performed based on the result of collision determination (step S11) in the previous frame. For example, when the result of the collision determination is that the player character has come into contact with the terrain object due to a pull-out action or a punching action in the previous frame, it is determined that an update event that deletes a part of the terrain object (see FIG. 26 and FIG. 27) has occurred. For example, when the result of the collision determination is that the fragment object has come into contact with the terrain object of rock in the previous frame, it is determined that an update event that increases the volume of the terrain object (see FIG. 29) has occurred. When the determination result in step S3 is positive, the process in step S4 is executed. When the determination result in step S3 is negative, the process in step S6 is executed.

In step S4, the processor 81 sets, in the game space, an update range in which update of the voxel object is performed. For example, the specific content (e.g., position, shape, and size) of the update range is associated with each of the types of update events in the game program. In step S4, the update range is set so as to have the content associated with the type of the update event that has been determined in step S3 to occur. The processor 81 stores data indicating the set update range, as update range data in the memory. Next to step S4, the process in step S5 is executed.

In step S5, the processor 81 changes the voxels corresponding to the update range set in step S4, according to the update event. For example, in performing deformation such that a voxel object in the update range is deleted or a voxel object is added in the update range, the processor 81 updates the voxel data stored in the memory so as to change the densities of the voxels corresponding to the update range (see the above [2-2. Update of voxel data]). For example, in changing the material of the voxel object in the update range, the processor 81 updates the voxel data stored in memory so as to update the first and second material IDs and the material mixing ratio of the voxels corresponding to the update range. Next to step S5, the process in step S6 is executed.

In step S6, the processor 81 determines whether or not all the objects to be processed have been subjected to the processes in step S2 to S5. When the determination result in step S6 is positive, the process in step S7 is executed. When the determination result in step S6 is negative, the process in step S2 is again executed.

In step S7, the processor 81 updates the vertices of the voxel object in the game space. That is, when the voxel data has been updated in the process in step S5, new vertices are calculated based on the updated voxel data. The positions of the new vertices are calculated according to the method described in the above [2-3. Calculation of vertices]. In addition, materials of the new vertices are calculated according to the method described in the above [2-4. Determination of material of vertex]. Next to step S7, the process in step S8 is executed.

In step S8, the processor 81 performs simplification for the vertices. That is, the processor 81 performs simplification for the vertices updated in the process in step S7, according to the method described in the above [2-5. Simplification of vertices]. The SVO data stored in the memory is updated so as to indicate the vertices obtained through the processes in steps S7 and S8. Therefore, update of the SVO data is performed through the processes in steps S7 and S8. The processes in steps S7 and S8 may not necessarily calculate new vertices for the entirety of the voxel data, and may be performed only for the part in which the content of the voxels has been changed in the process in step S5. Next to step S8, the process in step S9 is executed.

In step S9, the processor 81 updates the display mesh of the voxel object, based on the SVO data stored in the memory. The positions of the vertices of the display mesh and the materials of the polygons in the display mesh (e.g., the materials set for the vertices of the polygons) are calculated according to the method described in the above [2-6. Generation of mesh] and [2-6-1. Determination of material of display mesh]. The processor 81 updates the display mesh data stored in the memory so as to indicate the positions and materials of the vertices of the updated display mesh. Next to step S9, the process in step S10 is executed. The processor 81 may start the process in step S10 and subsequent steps without waiting for completion of step S9 to execute these steps in parallel with step S9. In this case, step S9 needs to be completed before start of step S13.

In step S10, the processor 81 updates the determination mesh of the voxel object, based on the SVO data stored in the memory. The positions of the vertices of the determination mesh and the materials of the polygons in the determination mesh (e.g., the materials set for the vertices of the polygons) are calculated according to the method described in the above [2-6. Generation of mesh] and [2-6-2. Determination of material of determination mesh]. The processor 81 updates the determination mesh data stored in the memory so as to indicate the positions and materials of the vertices of the updated determination mesh. Next to step S10, the process in step S11 is executed.

In the example shown in FIG. 31, the determination mesh generation process (step S10) is executed for each frame, but the determination mesh generation process may not necessarily be executed for each frame. For example, in the case where the collision determination process in step S11 is executed only for a frame that satisfies a predetermined condition, the processor 81 may execute the determination mesh generation process in the frame in which the collision determination in step S11 is performed. In addition, the processor 81 may execute the determination mesh generation process for voxels in a region, in the game space, where the collision determination in step S11 is performed. For example, in a situation where, in the game space, an object to be subjected to collision determination does not exist around the player character, except for a voxel object (e.g., a situation where only collision determination between the player character and the neighboring voxel object needs to be performed), the processor 81 may execute the determination mesh generation process for voxels within a predetermined range based on the player character.

In step S11, the processor 81 performs collision determination for each object in the game space, based on the determination mesh data and the object data stored in the memory. That is, the processor 81 performs collision determination by using a determination mesh for a voxel object, and using, for an object that is not a voxel object, a determination region having a predetermined shape, which is set for the object. In the exemplary embodiment, the collision determination in step S11 is performed in consideration of the speed calculated in step S2. That is, the processor 81 performs collision determination by using, as the position of each object, the position to which the object moves at the speed.

In the exemplary embodiment, presence/absence of the following contacts is determined by the collision determination in step S11.

Contact of the player character that moves or performs a punching action or a pull-out action, with the terrain object.

Contact of a character that perform an action of lifting (a fragment object) with the fragment object.

Contact of a straight line extending in the aim direction from the position of the player character, with the terrain object.

Contact of a fragment object thrown by a throwing action of the player character, with the terrain object.

When the result of the collision determination in step S11 is that the objects have come into contact with each other, a process of determining (e.g., generating) the result of the contact of the objects is performed in step S2 in the next frame, or it is determined in step S3 in the next frame that an update event has occurred. Next to step S11, the process in step S12 is executed.

In step S12, the processor 81 controls the motion of each object in the game space. For example, as for the player character, the processor 81 performs a control that causes the player character to move or perform various actions, based on the operation data acquired in step S1. When a predetermined action has occurred, a region for collision determination according to the action is generated in the game space. For example, a fragment object is controlled to move in the aim direction in response to a throwing action of the player character that throws the fragment object. In a single process in step S12, as for a motion (e.g., an action of the player character) that is performed over a plurality of frames, the processor 81 controls each object so as to progress the motion for one frame. By the process in step S12 being repeatedly executed over a plurality of frames, each object performs a series of motions regarding movement and various actions. The position of each object is basically determined to be the position after the object has moved with the speed calculated in step S2. However, in the case where an object is determined to come into contact with another object by the collision determination in step S11 and movement of this object is prevented by the other object, the position of the object is determined not to be changed. The object data stored in the memory is updated so as to have the content indicating the object after the control in step S12. Next to step S12, the process in step S13 is executed.

In step S13, the processor 81 generates a game image. That is, the processor 81 generates a game image by performing rendering, based on the virtual camera, for the polygons of the display mesh of the voxel object, and the polygons of objects other than the voxel object. The polygons of the display mesh are rendered by using rendering setting such as textures corresponding to materials set for the polygons, according to the method described in the above [2-6-1. Determination of material of display mesh]. In the exemplary embodiment, if the player character is capable of performing a throwing action, the processor 81 generates a game image so as to include the aforementioned aim image and object information image (see FIG. 28). The game image generated in step S13 is outputted to the display device and displayed in a cycle of once for each frame.

In step S14, the processor 81 determines whether or not to end the game. For example, the processor 81 determines to end the game when a predetermined operation input to end the game has been performed by the player. When the determination result in step S14 is negative, the process in step S1 is executed again. Thereafter, a series of processes in steps S1 to S14 is repeated until the processor 81 determines to end the game in step S14. When the determination result in step S14 is positive, the processor 81 ends the game processing shown in FIG. 31.

[4. Functions and effects of exemplary embodiment, and modifications]

As described above, in the exemplary embodiment, the game program causes the computer of the information processing apparatus to execute the following processes.

A process of generating a display mesh based on voxel data (the voxel data includes at least: a density that is defined in a virtual space and indicates, for each of a plurality of voxels, a degree of virtual occupation of a content in a space defined by the voxel; and a material ID indicating the type of the content, at most a first plural number (e.g., 2) of material IDs being settable. In addition, the display mesh corresponds to the voxel data, and is rendered based on a virtual camera. Vertex coordinates of the display mesh are determined based on at least the density included in the voxel data, and a material of the display mesh is determined based on at least a plurality of material IDs included in the voxel data).

A process of generating a voxel update range in the virtual space, based on game processing.

A process of, according to generation of the voxel update range, updating at least either of the density and the material ID, of the voxel data, for each of the voxels corresponding to the voxel update range in the virtual space.

A process of updating the display mesh in association with the updated voxel data.

A process of, based on collision determination between a determination mesh and a determination shape corresponding to a determination target based on the game processing, generating an in-game behavior corresponding to a material of the determination mesh at a collision position (the determination mesh is used for collision determination in the virtual space. The vertex coordinates of the determination mesh are determined based on at least the density included in the voxel data. The material of the determination mesh is determined based on at least a plurality of material IDs included in the voxel data).

A process of rendering the virtual space including the display mesh, based on the vertex coordinates of the display mesh, and a texture corresponding to the material of the display mesh.

According to the above configuration, the appearance of an object based on voxels can be the appearance based on the material of voxels updated during the game, and a behavior based on the material can be generated in the game. That is, as for the object based on the voxel data, the material can be shown (e.g., reflected) in the appearance and/or the in-game behavior.

The "in-game behavior" can include any change that occurs in the game. For example, in the above embodiment, it is a change that occurs due to a "process of reflecting a result of contact between objects". In the above embodiment, displaying an object information image based on collision determination between the terrain object and a straight line extending in the aim direction, is also an example of the "in-game behavior". In the above configuration, the "in-game behavior" may be any behavior as long as it is based on collision determination between the determination mesh and a determination shape corresponding to a determination target based on the game processing (e.g., a determination region set for an object such as the player character, or a straight line extending in the aim direction). The behavior may occur in an object corresponding to the determination mesh, or may occur in an object corresponding to the determination target. As in the above embodiment, the content of the in-game behavior may be associated with a material set for a polygon on which a collision has been determined in collision determination that causes occurrence of the behavior (in other words, the content of the behavior may be determined based on the material).

In the exemplary embodiment, when a process is executed by using data (including a program) in a certain information processing apparatus, a part of the data required for the process may be transmitted from another information processing apparatus different from the certain information processing apparatus. In this case, the certain information processing apparatus may execute the process by using the data received from the other information processing apparatus and the data stored therein.

In other embodiments, the information processing system may not include some of the components in the above embodiment, and may not execute some of the processes executed in the above embodiment. For example, in order to achieve a specific effect of a part of the above embodiment, the information processing system includes a configuration for achieving the effect and executes a process for achieving the effect, and need not include other configurations and need not execute other processes.

The exemplary embodiment can be used as, for example, a game system and a game program for the purpose of, for example, showing (e.g., reflecting) a material in an appearance or a behavior that occurs in a game, regarding an object based on voxel data.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. One or more non-transitory computer-readable medium having stored therein instructions that, when executed, cause one or more processors of an information processing apparatus to execute information processing comprising:

generating a display mesh based on voxel data which is defined in a virtual space and in which at least a density and at least one material ID are set for each of a plurality of voxels, wherein the density indicates a degree of occupation of a content in a space defined by the voxel and each of the at least one material ID indicates a type of a plurality of different types of content, at most a first number of material IDs are settable, and the first number is greater than 1 and wherein the display mesh is based on the voxel data and is rendered based on a virtual camera, wherein vertex coordinates of the display mesh are determined based on at least the density included in the voxel data, and a material associated with the display mesh is determined based on at least a plurality of the material IDs included in the voxel data;

generating a voxel update range in the virtual space, based on game processing;

based on generation of the voxel update range, updating at least either of the density and the material ID, of the voxel data, for each of voxels corresponding to the voxel update range in the virtual space;

updating the display mesh in association with the updated voxel data;

generating, based on collision determination between a determination mesh and a determination shape corresponding to a determination target based on game processing, an in-game behavior based on a material of the determination mesh at a position of a collision, wherein vertex coordinates of the determination mesh are based on at least the density included in the voxel data, wherein a material of the determination mesh is based on at least a plurality of the material IDs included in the voxel data; and rendering the virtual space including the display mesh, based on the vertex coordinates of the display mesh and a texture corresponding to the material of the display mesh.

2. The non-transitory computer-readable medium according to claim 1, wherein the material of the display mesh is determined by setting at most a second number of material IDs to each of a plurality of polygons included in the display mesh, the second number is greater than 1, the material of the determination mesh is determined by setting one material ID to each of a plurality of polygons included in the determination mesh, and the information processing comprises:

based on material data that includes, for each of the types of the materials corresponding to the material IDs, at least rendering setting information that includes at least texture information set for the material, and property information indicating an in-game behavior set for the material, generating an in-game behavior based on the property information corresponding to the material ID that is set for a polygon for which a collision has been determined, among the polygons included in the determination mesh; and based on the material data, performing rendering of the virtual space including the display mesh by performing, based on the rendering setting information corresponding to the material ID set for each of the polygons included in the display mesh, rendering of the polygon based on a texture mapping with one texture or a blend of a plurality of textures.

3. The non-transitory computer-readable medium according to claim 2, wherein the information processing comprises:

based on the voxel data, generating and updating vertices of the display mesh based on setting a vertex at coordinates based on the densities and positions of a plurality of neighboring voxels, with respect to a portion in which a voxel having the density that is set to a value indicating existence and a voxel having the density that is set to a value indicating nonexistence are adjacent to each other;

based on the voxel data, calculating, for each vertex, a priority parameter for each of the material IDs included in the voxel data, of the plurality of neighboring voxels, selecting, based on the priority parameters, at most a third number of material IDs having higher priorities;

determining the selected material IDs as material IDs of the vertex;

based on the voxel data, selecting, for each polygon, at most the second number of material IDs among the material IDs set for the vertices included in the polygon; and determining the selected material IDs as the material IDs of the polygon, thereby generating and updating the material of the display mesh.

4. The non-transitory computer-readable medium according to claim 3, wherein the information processing further comprises:

performing simplification to reduce the number of vertices on the vertices whose coordinates and material IDs have been determined based on the plurality of neighboring voxels, the simplification being performed by replacing a plurality of vertices with a new vertex whose coordinates and material ID are set based on the plurality of the vertices; and generating the polygon based on the vertex after the simplification.

5. The non-transitory computer-readable medium according to claim 3, wherein the information processing comprises calculating the priority parameters such that the material ID, which is set for a voxel having a higher density, has a higher priority, based on the densities of the plurality of neighboring voxels.

6. The non-transitory computer-readable medium according to claim 3, wherein the information processing comprises calculating the priority parameters such that the material ID, which is set for a voxel closer to the vertex, has a higher priority, based on distances from reference positions of the plurality of neighboring voxels to the vertex.

7. The non-transitory computer-readable medium according to claim 3, wherein in the voxel data, for each voxel, an in-voxel proportion indicating a proportion of the material indicated by the material ID in the voxel is further set, and the information processing comprises calculating the priority parameters such that the material ID, which has a higher in-voxel proportion, has a higher priority, based on the in-voxel proportions of the plurality of neighboring voxels.

8. The non-transitory computer-readable medium according to claim 3, wherein the information processing comprises generating and updating a material of the display mesh by, based on the material IDs of all the vertices forming the polygon, when the number of the material IDs is equal to or less than the second number, setting the material IDs as material IDs of the polygon, and when the number of the material IDs exceeds the second number, selecting the second number of material IDs having higher priorities, based on the priority parameters of the vertices, and determining the selected material IDs as material IDs of the polygon.

9. The non-transitory computer-readable medium according to claim 8, wherein the information processing comprises:

based on the rendering setting information corresponding to each of the material IDs set for each of the polygons included in the display mesh, performing rendering of the polygon according to a mapping in which the plurality of textures are blended, at the position of each of the vertices, with a blending ratio according to the priority parameter of the vertex, and are blended, between the vertices, with an interpolated blending ratio obtained by interpolating the blending ratios at the vertices.

10. The non-transitory computer-readable medium according to claim 2, wherein the information processing comprises:

based on the voxel data, determining vertices of the determination mesh based onsetting a vertex at coordinates based on the densities and positions of a plurality of neighboring voxels, with respect to a portion in which a voxel having the density that is set to a value indicating existence and a voxel having the density that is set to a value indicating nonexistence are adjacent to each other;

based on the voxel data, calculating, for each vertex, a priority parameter for each of the material IDs, included in the voxel data, of the plurality of neighboring voxels, selecting, based on the priority parameters, at most a fourth number of material IDs having higher priorities, and determining the selected material IDs as material IDs of the vertex; and determining, as the material ID of the polygon, one material ID which is the greatest in number or has the highest priority based on the priority parameters, among the material IDs of the vertices forming the polygon, thereby determining a material of the determination mesh.

11. An information processing system comprising:

one or more processors that are configured to execute information processing comprising:

generating a display mesh, based on voxel data which is defined in a virtual space and in which at least a density and a material ID are set for each of a plurality of voxels, wherein the density indicates a degree of virtual occupation of a content in a space defined by the voxel, the material ID indicates a type of the content, and at most a first plural number of material IDs are settable, and wherein the display mesh corresponds to the voxel data and is rendered based on a virtual camera, vertex coordinates of the display mesh are determined based on at least the density included in the voxel data, and a material of the display mesh is determined based on at least a plurality of the material IDs included in the voxel data;

generating a voxel update range in the virtual space, based on game processing;

according to generation of the voxel update range, updating at least either of the density and the material ID, of the voxel data, for each of voxels corresponding to the voxel update range in the virtual space;

updating the display mesh in association with the updated voxel data;

generating, based on collision determination between a determination mesh and a determination shape corresponding to a determination target based on game processing, an in-game behavior according to a material of the determination mesh at a position of a collision, wherein the determination mesh is used for the collision determination in the virtual space, vertex coordinates of the determination mesh are determined based on at least the density included in the voxel data, a material of the determination mesh is determined based on at least a plurality of the material IDs included in the voxel data; and rendering the virtual space including the display mesh, based on the vertex coordinates of the display mesh and a texture corresponding to the material of the display mesh.

12. The information processing system according to claim 11, wherein the material of the display mesh is determined by setting at most a second plural number of material IDs to each of a plurality of polygons included in the display mesh, the material of the determination mesh is determined by setting one material ID to each of a plurality of polygons included in the determination mesh, and the information processing comprises:

based on material data including, for each of the types of the materials corresponding to the material IDs, at least rendering setting information that includes at least texture information set for the material, and property information indicating an in-game behavior set for the material, generating an in-game behavior based on the property information corresponding to the material ID that is set for a polygon for which a collision has been determined, among the polygons included in the determination mesh; and based on the material data, performing rendering of the virtual space including the display mesh by performing, based on the rendering setting information corresponding to the material ID set for each of the polygons included in the display mesh, rendering of the polygon based on a texture mapping with one texture or a blend of a plurality of textures.

13. The information processing system according to claim 12, wherein the information processing comprises:

based on the voxel data, generating and updating vertices of the display mesh according to a method of setting a vertex at coordinates based on the densities and positions of a plurality of neighboring voxels, with respect to a portion in which a voxel having the density that is set to a value indicating existence and a voxel having the density that is set to a value indicating nonexistence are adjacent to each other;

based on the voxel data, calculating, for each vertex, a priority parameter for each of the material IDs, included in the voxel data, of the plurality of neighboring voxels, selecting, based on the priority parameters, at most a third number of material IDs having higher priorities, and determining the selected material IDs as material IDs of the vertex; and based on the voxel data, selecting, for each polygon, at most the second number of material IDs among the material IDs set for the vertices included in the polygon, and determining the selected material IDs as the material IDs of the polygon, thereby generating and updating the material of the display mesh.

14. The information processing system according to claim 13, wherein the information processing further comprises:

performing simplification to reduce the number of vertices on the vertices whose coordinates and material IDs have been determined based on the plurality of neighboring voxels, the simplification being performed by replacing a plurality of vertices with a new vertex whose coordinates and material ID are set based on the plurality of the vertices; and generating the polygon based on the vertex after the simplification.

15. The information processing system according to claim 13, wherein the information processing comprises calculating the priority parameters such that the material ID, which is set for a voxel having a higher density, has a higher priority, based on the densities of the plurality of neighboring voxels.

16. The information processing system according to claim 13, wherein the information processing comprises calculating the priority parameters such that the material ID, which is set for a voxel closer to the vertex, has a higher priority, based on distances from reference positions of the plurality of neighboring voxels to the vertex.

17. The information processing system according to claim 13, wherein in the voxel data, for each voxel, an in-voxel proportion indicating a proportion of the material indicated by the material ID in the voxel is further set, and the information processing comprises calculating the priority parameters such that the material ID, which has a higher in-voxel proportion, has a higher priority, based on the in-voxel proportions of the plurality of neighboring voxels.

18. The information processing system according to claim 13, wherein the information processing comprises generating and updating a material of the display mesh by, based on the material IDs of all the vertices forming the polygon, when the number of the material IDs is equal to or less than the second number, setting the material IDs as material IDs of the polygon, and when the number of the material IDs exceeds the second number, selecting the second number of material IDs having higher priorities, based on the priority parameters of the vertices, and determining the selected material IDs as material IDs of the polygon.

19. The information processing system according to claim 18, wherein the information processing comprises, based on the rendering setting information corresponding to each of the material IDs set for each of the polygons included in the display mesh, performing rendering of the polygon according to a mapping in which the plurality of textures are blended, at the position of each of the vertices, with a blending ratio according to the priority parameter of the vertex, and are blended, between the vertices, with an interpolated blending ratio obtained by interpolating the blending ratios at the vertices.

20. The information processing system according to claim 12, wherein the information processing comprises:

based on the voxel data, determining vertices of the determination mesh, according to a method of setting a vertex at coordinates based on the densities and positions of a plurality of neighboring voxels, with respect to a portion in which a voxel having the density that is set to a value indicating existence and a voxel having the density that is set to a value indicating nonexistence are adjacent to each other;

based on the voxel data, calculating, for each vertex, a priority parameter for each of the material IDs, included in the voxel data, of the plurality of neighboring voxels, selecting, based on the priority parameters, at most a fourth number of material IDs having higher priorities, and determining the selected material IDs as material IDs of the vertex; and determining, as the material ID of the polygon, one material ID which is the greatest in number or has the highest priority based on the priority parameters, among the material IDs of the vertices forming the polygon, thereby determining a material of the determination mesh.

21. A game processing method performed on an information processing system, the game processing method comprising:

generating a display mesh, based on voxel data which is defined in a virtual space and in which at least a density and a material ID are set for each of a plurality of voxels, wherein the density indicates a degree of virtual occupation of a content in a space defined by the voxel, the material ID indicates a type of the content, and at most a first plural number of material IDs are settable, and wherein the display mesh corresponds to the voxel data and is rendered based on a virtual camera, vertex coordinates of the display mesh are determined based on at least the density included in the voxel data, and a material of the display mesh is determined based on at least a plurality of the material IDs included in the voxel data;

generating a voxel update range in the virtual space, based on game processing;

according to generation of the voxel update range, updating at least either of the density and the material ID, of the voxel data, for each of voxels corresponding to the voxel update range in the virtual space;

updating the display mesh in association with the updated voxel data; generating, based on collision determination between a determination mesh and a determination shape corresponding to a determination target based on game processing, an in-game behavior according to a material of the determination mesh at a position of a collision, wherein the determination mesh is used for the collision determination in the virtual space, vertex coordinates of the determination mesh are determined based on at least the density included in the voxel data, a material of the determination mesh is determined based on at least a plurality of the material IDs included in the voxel data; and rendering the virtual space including the display mesh, based on the vertex coordinates of the display mesh and a texture corresponding to the material of the display mesh.

22. The game processing method according to claim 21, wherein the material of the display mesh is determined by setting at most a second plural number of material IDs to each of a plurality of polygons included in the display mesh, the material of the determination mesh is determined by setting one material ID to each of a plurality of polygons included in the determination mesh, and the method causes the information processing system to execute:

based on material data including, for each of the types of the materials corresponding to the material IDs, at least rendering setting information that includes at least texture information set for the material, and property information indicating an in-game behavior set for the material, generating an in-game behavior based on the property information corresponding to the material ID that is set for a polygon for which a collision has been determined, among the polygons included in the determination mesh; and based on the material data, performing rendering of the virtual space including the display mesh by performing, based on the rendering setting information corresponding to the material ID set for each of the polygons included in the display mesh, rendering of the polygon based on a texture mapping with one texture or a blend of a plurality of textures.

23. The game processing method according to claim 22, causing the information processing system to execute:

based on the voxel data, generating and updating vertices of the display mesh according to a method of setting a vertex at coordinates based on the densities and positions of a plurality of neighboring voxels, with respect to a portion in which a voxel having the density that is set to a value indicating existence and a voxel having the density that is set to a value indicating nonexistence are adjacent to each other;

based on the voxel data, calculating, for each vertex, a priority parameter for each of the material IDs, included in the voxel data, of the plurality of neighboring voxels, selecting, based on the priority parameters, at most a third number of material IDs having higher priorities, and determining the selected material IDs as material IDs of the vertex; and based on the voxel data, selecting, for each polygon, at most the second number of material IDs among the material IDs set for the vertices included in the polygon, and determining the selected material IDs as the material IDs of the polygon, thereby generating and updating the material of the display mesh.

24. The game processing method according to claim 23, further causing the information processing system to execute:

performing simplification to reduce the number of vertices on the vertices whose coordinates and material IDs have been determined based on the plurality of neighboring voxels, the simplification being performed by replacing a plurality of vertices with a new vertex whose coordinates and material ID are set based on the plurality of the vertices; and generating the polygon based on the vertex after the simplification.

25. The game processing method according to claim 23, causing the information processing system to execute calculating the priority parameters such that the material ID, which is set for a voxel having a higher density, has a higher priority, based on the densities of the plurality of neighboring voxels.

26. The game processing method according to claim 23, causing the information processing system to execute calculating the priority parameters such that the material ID, which is set for a voxel closer to the vertex, has a higher priority, based on distances from reference positions of the plurality of neighboring voxels to the vertex.

27. The game processing method according to claim 23, wherein in the voxel data, for each voxel, an in-voxel proportion indicating a proportion of the material indicated by the material ID in the voxel is further set, and the method causes the information processing system to execute calculating the priority parameters such that the material ID, which has a higher in-voxel proportion, has a higher priority, based on the in-voxel proportions of the plurality of neighboring voxels.

28. The game processing method according to claim 23, causing the information processing system to execute generating and updating a material of the display mesh by, based on the material IDs of all the vertices forming the polygon, when the number of the material IDs is equal to or less than the second number, setting the material IDs as material IDs of the polygon, and when the number of the material IDs exceeds the second number, selecting the second number of material IDs having higher priorities, based on the priority parameters of the vertices, and determining the selected material IDs as material IDs of the polygon.

29. The game processing method according to claim 28, causing the information processing system to execute, based on the rendering setting information corresponding to each of the material IDs set for each of the polygons included in the display mesh, performing rendering of the polygon according to a mapping in which the plurality of textures are blended, at the position of each of the vertices, with a blending ratio according to the priority parameter of the vertex, and are blended, between the vertices, with an interpolated blending ratio obtained by interpolating the blending ratios at the vertices.

30. The game processing method according to claim 22, causing the information processing system to execute:

based on the voxel data, determining vertices of the determination mesh, according to a method of setting a vertex at coordinates based on the densities and positions of a plurality of neighboring voxels, with respect to a portion in which a voxel having the density that is set to a value indicating existence and a voxel having the density that is set to a value indicating nonexistence are adjacent to each other;

based on the voxel data, calculating, for each vertex, a priority parameter for each of the material IDs, included in the voxel data, of the plurality of neighboring voxels, selecting, based on the priority parameters, at most a fourth number of material IDs having higher priorities, and determining the selected material IDs as material IDs of the vertex; and determining, as the material ID of the polygon, one material ID which is the greatest in number or has the highest priority based on the priority parameters, among the material IDs of the vertices forming the polygon, thereby determining a material of the determination mesh.

* * * * *